(12) United States Patent
Sevindik et al.

(10) Patent No.: US 11,844,057 B2
(45) Date of Patent: Dec. 12, 2023

(54) METHODS AND APPARATUS FOR WIRELESS DATA TRAFFIC MANAGEMENT IN WIRELINE BACKHAUL SYSTEMS

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 87 days.

(21) Appl. No.: 17/015,769

(22) Filed: Sep. 9, 2020

(65) Prior Publication Data
US 2022/0078806 A1  Mar. 10, 2022

(51) Int. Cl.
*H04W 72/12* (2023.01)
(52) U.S. Cl.
CPC .................. *H04W 72/12* (2013.01)
(58) Field of Classification Search
CPC ............... H04W 4/70; H04W 72/1263; H04W 72/1226; H04W 72/005; H04W 72/1205; H04W 72/0453
See application file for complete search history.

(56) References Cited

U.S. PATENT DOCUMENTS

| | | | |
|---|---|---|---|
| 3,629,862 A | 12/1971 | Chow | |
| 6,177,963 B1 | 1/2001 | Foye et al. | |
| 7,656,890 B2 | 2/2010 | Chapman et al. | |
| 8,005,083 B1 | 8/2011 | Diep | |
| 8,040,807 B2 | 10/2011 | Pai et al. | |
| 8,041,335 B2 | 10/2011 | Khetawat et al. | |
| 8,180,355 B2 | 5/2012 | Matsuzawa | |
| 9,203,639 B2 | 12/2015 | Thibeault et al. | |
| 9,231,748 B1 | 1/2016 | Wurtenberger et al. | |
| 9,467,867 B1 | 10/2016 | Hasegawa et al. | |
| 9,655,127 B1 | 5/2017 | Srinivas et al. | |
| 9,814,044 B1 | 11/2017 | Sevindik | |
| 10,045,070 B2 | 8/2018 | Markley et al. | |
| 10,575,232 B2 | 2/2020 | Tsuda et al. | |

(Continued)

OTHER PUBLICATIONS

CableLabs Technical Report CM-TR-MHA-V02-081209.

(Continued)

*Primary Examiner* — Romani Ohri
(74) *Attorney, Agent, or Firm* — Patent Beach PC

(57) ABSTRACT

Methods and apparatus for enhancing performance of a wireline communication network backhaul for wireless nodes based on data traffic and node characterization. In one embodiment, the node comprises a small-cell or other wireless base station (e.g., one utilizing unlicensed or quasi-licensed spectrum such as CBRS or C-Band) that is backhauled by a DOCSIS system within a managed HFC network, and the methods and apparatus utilize such factors as traffic load, geographic or topological location, node technology type, and user device profile for each node to determine scheduling of traffic over the wireline transmission medium used for the delivery of services. In another embodiment, the foregoing factors can be weighted for further determination related to an assignment of the time slots or other resources for the delivery of services.

20 Claims, 29 Drawing Sheets

(56) References Cited

U.S. PATENT DOCUMENTS

| | | | |
|---|---|---|---|
| 11,051,312 B1 | 6/2021 | Marupaduga et al. | |
| 2003/0027577 A1 | 2/2003 | Brown et al. | |
| 2005/0163196 A1 | 7/2005 | Currivan et al. | |
| 2005/0220047 A1* | 10/2005 | Baey | H04W 52/267 370/315 |
| 2005/0249117 A1 | 11/2005 | Gerkins | |
| 2007/0271588 A1* | 11/2007 | Bunn | C04B 41/48 725/111 |
| 2008/0037429 A1 | 2/2008 | Lansing et al. | |
| 2008/0130589 A1 | 6/2008 | Gorokhov et al. | |
| 2008/0193137 A1 | 8/2008 | Thompson et al. | |
| 2009/0116594 A1 | 5/2009 | Abe et al. | |
| 2009/0180490 A1* | 7/2009 | Beser | H04N 21/6168 370/431 |
| 2010/0117740 A1 | 5/2010 | Hwang et al. | |
| 2010/0222003 A1 | 9/2010 | Yoshii et al. | |
| 2010/0312892 A1 | 12/2010 | Woundy et al. | |
| 2011/0045856 A1 | 2/2011 | Feng et al. | |
| 2011/0126185 A1 | 5/2011 | Waris et al. | |
| 2011/0142017 A1 | 6/2011 | Coldren | |
| 2011/0185263 A1* | 7/2011 | Chapman | H04L 12/2861 725/111 |
| 2011/0218007 A1 | 9/2011 | Kimura | |
| 2011/0267253 A1 | 11/2011 | Bit-Babik et al. | |
| 2011/0268008 A1 | 11/2011 | Kim et al. | |
| 2011/0287794 A1 | 11/2011 | Koskela et al. | |
| 2011/0299488 A1 | 12/2011 | Kim et al. | |
| 2011/0320631 A1 | 12/2011 | Finkelstein | |
| 2012/0317278 A1 | 12/2012 | Tamaki et al. | |
| 2013/0010686 A1* | 1/2013 | Shatzkamer | H04W 40/00 370/328 |
| 2013/0012249 A1 | 1/2013 | Centonza et al. | |
| 2013/0021996 A1 | 1/2013 | Wang et al. | |
| 2013/0033642 A1 | 2/2013 | Wan et al. | |
| 2013/0036175 A1 | 2/2013 | Lau | |
| 2013/0074138 A1 | 3/2013 | Chapman | |
| 2013/0251019 A1 | 9/2013 | Kolze | |
| 2013/0316750 A1 | 11/2013 | Couch | |
| 2013/0332815 A1 | 12/2013 | Gallo et al. | |
| 2014/0010269 A1* | 1/2014 | Ling | H04B 3/46 375/222 |
| 2014/0086194 A1 | 3/2014 | Sugahara | |
| 2014/0247743 A1 | 9/2014 | Seo | |
| 2014/0294052 A1 | 10/2014 | Currivan et al. | |
| 2015/0016247 A1 | 1/2015 | Hayes et al. | |
| 2015/0017999 A1 | 1/2015 | Chen et al. | |
| 2015/0139050 A1 | 5/2015 | Sun et al. | |
| 2015/0146712 A1 | 5/2015 | Jin | |
| 2015/0180784 A1 | 6/2015 | Tokutsu et al. | |
| 2015/0215790 A1 | 7/2015 | Davari et al. | |
| 2015/0327265 A1 | 11/2015 | Lee et al. | |
| 2015/0350912 A1 | 12/2015 | Head et al. | |
| 2015/0350949 A1 | 12/2015 | Wang et al. | |
| 2016/0036490 A1 | 2/2016 | Wu et al. | |
| 2016/0037511 A1 | 2/2016 | Vincze et al. | |
| 2016/0095007 A1* | 3/2016 | Tian | H04L 5/0073 370/252 |
| 2016/0198350 A1 | 7/2016 | Lou et al. | |
| 2016/0360553 A1 | 12/2016 | Cheng et al. | |
| 2017/0005740 A1 | 1/2017 | Yang et al. | |
| 2017/0006483 A1 | 1/2017 | Attanasio et al. | |
| 2017/0026819 A1 | 1/2017 | Xue et al. | |
| 2017/0086199 A1 | 3/2017 | Zhang et al. | |
| 2017/0093555 A1 | 3/2017 | Hamzeh et al. | |
| 2017/0265216 A1 | 9/2017 | Andreoli-Fang et al. | |
| 2017/0302378 A1 | 10/2017 | Mutalik et al. | |
| 2017/0359851 A1 | 12/2017 | Kakinada et al. | |
| 2018/0054740 A1 | 2/2018 | Furuichi | |
| 2018/0070296 A1 | 3/2018 | Srikanteswara et al. | |
| 2018/0146483 A1 | 5/2018 | Kobayashi et al. | |
| 2018/0160433 A1 | 6/2018 | Kim et al. | |
| 2018/0206235 A1 | 7/2018 | Zhu et al. | |
| 2018/0242340 A1* | 8/2018 | Pu | H04W 74/0816 |
| 2018/0252793 A1 | 9/2018 | Hazlewood et al. | |
| 2018/0255464 A1 | 9/2018 | Fodor et al. | |
| 2018/0270103 A1 | 9/2018 | Chapman et al. | |
| 2018/0288621 A1 | 10/2018 | Markwart et al. | |
| 2019/0028220 A1 | 1/2019 | Kecicioglu et al. | |
| 2019/0028900 A1 | 1/2019 | Furuichi | |
| 2019/0037567 A1 | 1/2019 | Zhao et al. | |
| 2019/0098640 A1 | 3/2019 | Holakouei et al. | |
| 2019/0116601 A1 | 4/2019 | Warashina | |
| 2019/0132098 A1 | 5/2019 | Wernersson | |
| 2019/0132170 A1 | 5/2019 | Si et al. | |
| 2019/0132850 A1 | 5/2019 | Sun et al. | |
| 2019/0150134 A1 | 5/2019 | Kakinada et al. | |
| 2019/0174542 A1 | 6/2019 | Lei et al. | |
| 2019/0181564 A1 | 6/2019 | Kwon et al. | |
| 2019/0261197 A1 | 8/2019 | Bellamkonda et al. | |
| 2019/0268916 A1 | 8/2019 | Guo et al. | |
| 2019/0273528 A1 | 9/2019 | Watanabe | |
| 2019/0274064 A1 | 9/2019 | Chapman et al. | |
| 2019/0349066 A1 | 11/2019 | Yang | |
| 2019/0379421 A1 | 12/2019 | Niakan et al. | |
| 2019/0387413 A1 | 12/2019 | Wong et al. | |
| 2019/0393898 A1 | 12/2019 | Kobayashi et al. | |
| 2020/0022036 A1 | 1/2020 | Lee et al. | |
| 2020/0092034 A1 | 3/2020 | Jones | |
| 2020/0092736 A1 | 3/2020 | Futaki et al. | |
| 2020/0145031 A1 | 5/2020 | Karlsson et al. | |
| 2020/0145967 A1 | 5/2020 | Park et al. | |
| 2020/0187208 A1 | 6/2020 | Hou et al. | |
| 2020/0252193 A1 | 8/2020 | Finkelstein | |
| 2020/0252933 A1 | 8/2020 | Hmimy et al. | |
| 2020/0314793 A1 | 10/2020 | Kumar et al. | |
| 2020/0351717 A1 | 11/2020 | Bernstein et al. | |
| 2020/0358470 A1 | 11/2020 | Dayan et al. | |
| 2020/0413325 A1 | 12/2020 | Meredith et al. | |
| 2021/0007033 A1 | 1/2021 | Tada et al. | |
| 2021/0058879 A1 | 2/2021 | Geng et al. | |
| 2021/0083942 A1 | 3/2021 | Finkelstein | |
| 2021/0092662 A1 | 3/2021 | Takahashi et al. | |
| 2021/0126697 A1 | 4/2021 | Kumar et al. | |
| 2021/0185541 A1 | 6/2021 | Potharaju et al. | |
| 2021/0204231 A1 | 7/2021 | Harada et al. | |
| 2021/0211889 A1 | 7/2021 | Buddhikot et al. | |
| 2021/0219340 A1 | 7/2021 | Shi et al. | |
| 2021/0320399 A1 | 10/2021 | Bisiules et al. | |
| 2021/0377960 A1 | 12/2021 | Carl et al. | |
| 2021/0385662 A1 | 12/2021 | Furuichi | |
| 2021/0400046 A1* | 12/2021 | Castinado | G06F 16/29 |
| 2022/0007198 A1 | 1/2022 | Mahalingam et al. | |
| 2022/0053491 A1 | 2/2022 | Sevindik et al. | |
| 2022/0060346 A1 | 2/2022 | Sevindik et al. | |
| 2022/0060347 A1 | 2/2022 | Sevindik et al. | |
| 2022/0061090 A1* | 2/2022 | Fehrenbach | H04W 74/0808 |
| 2022/0201778 A1 | 6/2022 | Wallburg et al. | |
| 2022/0287014 A1 | 9/2022 | Dong | |
| 2022/0287093 A1* | 9/2022 | Iyer | H04B 7/0695 |

OTHER PUBLICATIONS

CableLabs, Invention Disclosure 60436, Apr. 2014 https://www.cablelabs.com/wp-content/uploads/2014/04/60436-publish.pdf.

Chapman J.T., "Mobile Backhaul over DOCSIS", SCTE-ISBE EXPO cable-Tec, Fall Technical forum, 2017.

Deering et al., "Internet Protocol, Version 6 (Ipv6) Specification, IETF RFC 2460," Dec. 1998.

Executive Brief, "Planning Today for Next-Gen DOCSIS?", Commscope 2019.

IEEE Std. 802.11 or related standards including 802.11a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

(56) References Cited

OTHER PUBLICATIONS

Wi-Fi Direct (including inter alia, "Wi-Fi Peer-to-Peer (P2P) Specification"), Version 1.5, 2014, Wi-Fi Alliance, 90 pages.

* cited by examiner

FIG. 1 (Prior Art)

| Return split end (MHz) | Diplex Region (MHz) | Forward spectrum start (MHz) | Forward spectrum available (MHz) | Ration of downstream to upstream capacity |
|---|---|---|---|---|
| 204 | 54 | 258 | 1,536 | 7:1 |
| 300 | 78 | 378 | 1,416 | 5:1 |
| 396 | 102 | 498 | 1,296 | 3:1 |
| 492 | 120 | 612 | 1,182 | 2:1 |
| 588 | 150 | 738 | 1,056 | 1.7:1 |
| 684 | 174 | 858 | 936 | 1.3:1 |

FIG. 2C (Prior Art)

| E-UTRA Operating Band | Uplink (UL) operating band BS receive UE transmit $F_{UL\_low} - F_{UL\_high}$ | | | Downlink (DL) operating band BS transmit UE receive $F_{DL\_low} - F_{DL\_high}$ | | | Duplex Mode |
|---|---|---|---|---|---|---|---|
| 2 | 1850 MHz | – | 1910 MHz | 1930 MHz | – | 1990 MHz | FDD |
| 4 | 1710 MHz | – | 1755 MHz | 2110 MHz | – | 2155 MHz | FDD |
| 5 | 824 MHz | – | 849 MHz | 869 MHz | – | 894 MHz | FDD |
| 7 | 2500 MHz | – | 2570 MHz | 2620 MHz | – | 2690 MHz | FDD |
| 10 | 1710 MHz | – | 1770 MHz | 2110 MHz | – | 2170 MHz | FDD |
| 12 | 699 MHz | – | 716 MHz | 729 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| 18 | 815 MHz | – | 830 MHz | 860 MHz | – | 875 MHz | FDD |
| 19 | 830 MHz | – | 845 MHz | 875 MHz | – | 890 MHz | FDD |
| 23 | 2000 MHz | – | 2020 MHz | 2180 MHz | – | 2200 MHz | FDD |
| 25 | 1850 MHz | – | 1915 MHz | 1930 MHz | – | 1995 MHz | FDD |
| 26 b | 814 MHz | – | 849 MHz | 859 MHz | – | 894 MHz | FDD |
| 29 | N/A | | | 717 MHz | – | 728 MHz | FDD |
| 30 | 2305 MHz | – | 2315 MHz | 2350 MHz | – | 2360 MHz | FDD |
| 35 | 1850 MHz | – | 1910 MHz | 1850 MHz | – | 1910 MHz | TDD |
| 36 | 1930 MHz | – | 1990 MHz | 1930 MHz | – | 1990 MHz | TDD |
| 38 | 2570 MHz | – | 2620 MHz | 2570 MHz | – | 2620 MHz | TDD |
| 40 | 2300 MHz | – | 2400 MHz | 2300 MHz | – | 2400 MHz | TDD |
| 41 | 2496 MHz | – | 2690 MHz | 2496 MHz | – | 2690 MHz | TDD |
| 42 | 3400 MHz | – | 3600 MHz | 3400 MHz | – | 3600 MHz | TDD |
| 43 | 3600 MHz | – | 3800 MHz | 3600 MHz | – | 3800 MHz | TDD |
| 46 | 5150 MHz | – | 5925 MHz | 5150 MHz | – | 5925 MHz | TDD |
| 66 | 1710 MHz | – | 1780 MHz | 2110 MHz | – | 2200 MHz | FDD |
| 70 | 1695 MHz | – | 1710 MHz | 1995 MHz | – | 2020 MHz | FDD |

FIG. 6B (Prior art)

METHODS AND APPARATUS FOR WIRELESS DATA TRAFFIC MANAGEMENT IN WIRELINE BACKHAUL SYSTEMS

RELATED APPLICATIONS

This application is related to co-owned and co-pending U.S. patent application Ser. No. 16/996,496 filed Aug. 18, 2020 and entitled "METHODS AND APPARATUS FOR WIRELESS DEVICE ATTACHMENT IN A MANAGED NETWORK ARCHITECTURE," Ser. No. 16/997,776 filed Aug. 19, 2020 and entitled "METHODS AND APPARATUS FOR COORDINATION BETWEEN WIRELINE BACKHAUL AND WIRELESS SYSTEMS," and Ser. No. 16/995,407 filed Aug. 17, 2020 and entitle "METHODS AND APPARATUS FOR SPECTRUM UTILIZATION COORDINATION BETWEEN WIRELINE BACKHAUL AND WIRELESS SYSTEMS," each of which is incorporated herein by reference in its entirety.

Copyright

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless equipment, and specifically, in one or more exemplary embodiments, to methods and apparatus for wireless and wireline network infrastructure coordination including characterization of data traffic and wireless nodes, and allocation of backhaul bandwidth based thereon.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the GHz range) or other spectrum such as CBRS (3.550-3.70 GHz, 3GPP Band 48), and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., 3GPP NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Figure 1:
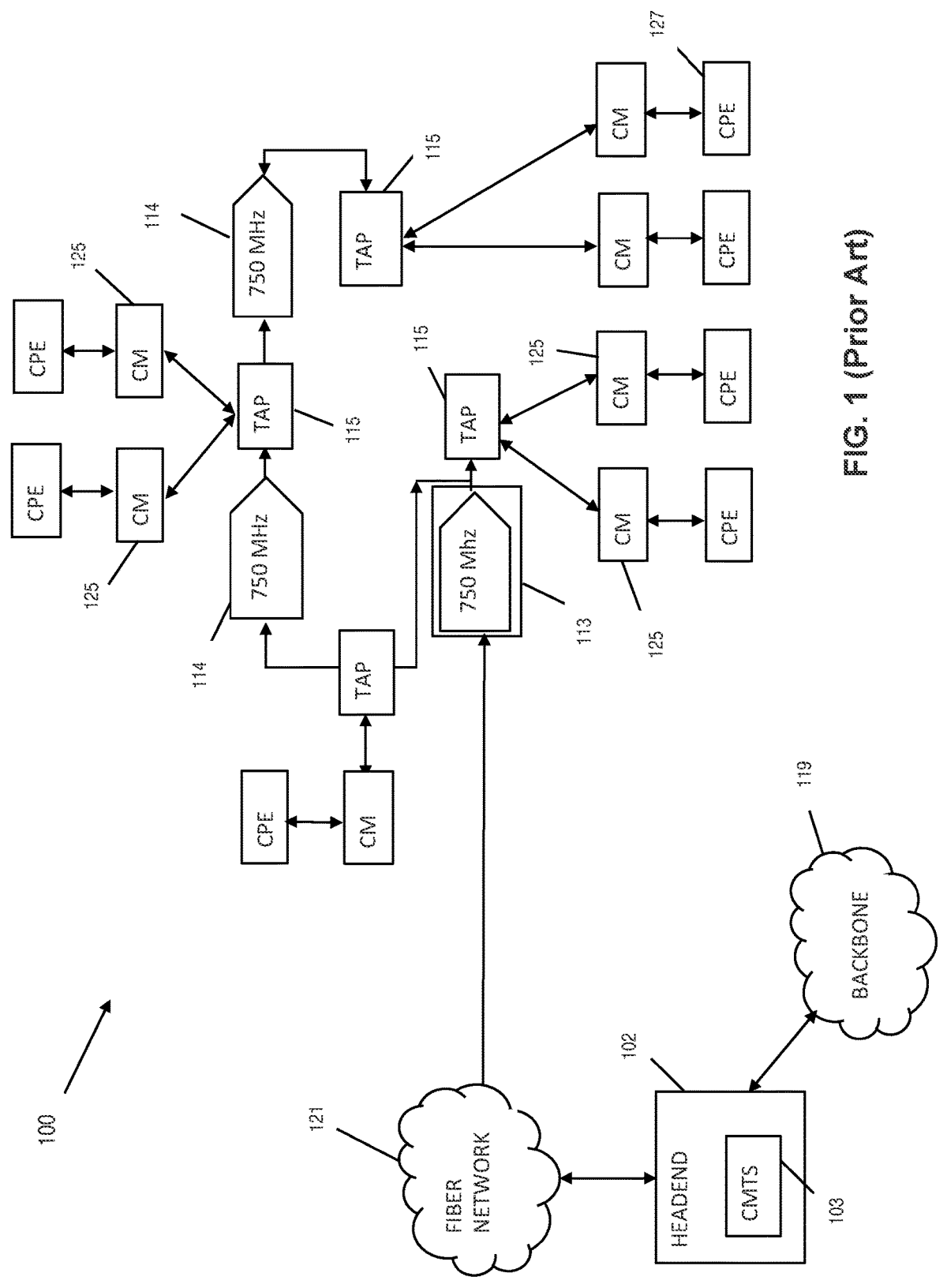

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, wireless small cells, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

DOCSIS—

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc.

Another key component in the headend 102, is the Edge QAM modulator (EQAM) 105. The EQAM receives e.g., an IP unicast or multicast MPEG transport stream packet over a GigE (Gigabit Ethernet) interface, and produces transport stream on one or more RF channels for transmission over the HFC distribution network 121. The EQAM can also perform other functions such as re-stamp of Program Clock Reference (PCR) timestamps such as for de-jitter processing. Output from the EQAM 105 is combined with video signals (e.g., SDV, analog, etc.) for downstream transmission by the combiner logic 107.

While DOCSIS 3.0 is currently the prevailing technology, DOCSIS 3.1 is rapidly being deployed as an upgrade to DOCSIS 3.0. DOCSIS 3.1 brings many fundamental changes, including Orthogonal Division Multiplexing (OFDM) as the new PHY layer modulation technology. In OFDM technology, the data is converted from serial to parallel, and transmitted on multiple orthogonal carriers simultaneously. Using the orthogonal multi-carrier concept of OFDM modulation improves the downstream and upstream throughput significantly, and reduces the receiver complexity in the CM and CMTS. Furthermore, bounding narrow band subcarriers in OFDM allows creation of wide band channels from 24 MHz to 192 MHz, moving away from legacy 6 MHz (or 8 MHz) channels of the type used in traditional DOCSIS 3.0/EuroDOCSIS deployments. See FIG. 2A, wherein the typical DOCSIS 3.0 allocation 200 includes broadband spectrum 204 at a frequency above the spectrum 202 used for broadcast television, SDV, VoD, and other traditional "video" services. Spectrum utilization is also increased in DOCSIS 3.1, up to approximately 1.2 GHz. FIG. 2B is a simplified graphical representation of DOCSIS 3.1 spectrum allocations; note that traditional DOCSIS 3.0 and QAM technology (i.e., non-OFDM-based modulation) can be used alongside the newer OFDM-based modulation schemes.

Another feature introduced in DOCSIS 3.1, is the Low Density Parity Check Code (LDPC) in upstream and downstream to optimize efficiency, provide robustness against narrow band interferers, and burst errors. The LDPC decoding efficiencies ostensibly increase the Signal-to-Noise ratio (SNR), allowing to use higher modulation for upstream and downstream. Prior to DOCSIS.31, the highest order modulation to allow reliable transmission were 64-QAM for upstream, and 256-QAM for downstream. Due to the LDPC error correcting efficiencies, the DOCSIS 3.1 standard supports 4096-QAM in downstream, and 1024-QAM in upstream, allowing the data transmission speed close to the theoretical limits.

FIG. 2C is a tabular representation of frequency bands associated with prior art cable systems including broadband (DOCSIS 4.0). DOCSIS 4.0, which is the latest specification for data transmission over cable as of the date of this writing, leverages the DOCSIS 3.1 technology to expand the downstream and upstream spectrum to use full spectrum available for cable network (5 MHz to approximately 1.8 GHz), which is about 600 MHz more than the 1.2 GHz available under DOCSIS 3.1. The Extended Spectrum DOCSIS (EDX) is designed to work over existing cable infrastructure.

DOCSIS 4.0, which is the latest specification for data transmission over cable as of the date of this writing, leverages the DOCSIS 3.1 technology to expand the downstream and upstream spectrum to use full spectrum available for cable network (0 to approximately 1.8 GHz), which is about 600 MHz more than the 1.2 GHz available under DOCSIS 3.1. See FIG. 3C. The Extended Spectrum DOCSIS (EDX) is designed to work over existing cable infrastructure.

Full Duplex (FDX), another feature introduced in DOCSIS 4.0, will allow upstream and downstream traffic to occupy the same part of spectrum, thus doubling the throughput by using the existing HFC network characteristics.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 302, (ii) Priority Access tier 304, and (iii) General Authorized Access tier 306. See FIG. 3. The three tiers are coordinated through one or more dynamic Spectrum Access Systems (SAS) 402 as shown in FIG. 4 (including e.g., Band 48 therein).

Incumbent Access (existing DOD and satellite) users 302 include authorized federal and grandfathered Fixed Satellite Service (FSS) users currently operating in the 3.5 GHz band shown in FIG. 3. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 304 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 306 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels.

The FCC's three-tiered spectrum sharing architecture of FIG. 3 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 131 (see FIG. 4) can only operate under authority of a centralized Spectrum Access System (SAS) 402. Rules are optimized for small-cell use, but also accommodate point-to-point and point-to-multipoint, especially in rural areas.

Under the FCC system, the standard SAS 402 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 4, these functions are provided for by, inter alia, an incumbent detection (i.e., environmental sensing) function 407 configured to detect use by incumbents, and an incumbent information function 409 configured to inform the incumbent when use by another user occurs. An FCC database 411 is also provided, such as for PAL license validation, CBSD registration, and other functions.

An optional Domain Proxy (DP) 408 is also provided for in the FCC architecture. Each DP 408 includes: (1) SAS interface GW including security; (2) directive translation between CBSD 131 and domain commands; (3) bulk CBSD directive processing; and (4) interference contribution reporting to the SAS.

A domain is defined is any collection of CBSDs 131 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 408 can aggregate control information flows to other SAS, such as e.g., a Commercial SAS (CSAS, not shown), and generate performance reports, channel requests, heartbeats, etc.

CBSDs 131 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 5 illustrates a typical prior art CBRS-based CPE (consumer premises equipment)/FWA architecture 500 for a served premises (e.g., user residence), wherein the CPE/FWA 503 is backhauled by a base station (e.g., eNB or gNB) 131, the latter which is backhauled by the DOCSIS network shown in FIG. 1A. A PoE (Power over Ethernet) injector system 404 is used to power the CPE/FWA 403 as well as provide Ethernet (packet connectivity for the CPE/FWA radio head to the home router 405).

Additionally, new wireless systems and small cells are being fielded, including in new frequency bands (see e.g., FIG. 6A, illustrating new Band 71 with the 600 MHz region, and FIG. 6B showing e.g., Bands 12-17 in the 700 MHz region).

Unaddressed Issues of Resource Allocation and Usage—

As described previously, the CM and CMTS are the two main components in DOCSIS backhaul systems. The CM receives/transmits the signal from/to the CMTS, and provides data services to premises. The CMTS controls and manages CMs deployed within the network. Furthermore, the CMTS specifies different service flows for different traffic types, and each service flow may be associated with a given modulation type in the downlink and uplink.

The DOCSIS MAC protocol utilizes as one option a "best efforts" request/grant mechanism to coordinate transmission between multiple CMs 125. If a CM needs to transmit anything on the upstream channels, it first must request that the CMTS allocate resources to the CM. The CMTS 103 allocates the resources for the transmission of data to the CMs in the next upstream frame(s) if bandwidth is available, such as via an upstream bandwidth allocation (MAP) message.

Furthermore, the CMTS must assign at least one service flow to each CM 125 to carry best-effort traffic. In order to support different traffic types, the CMTS may assign multiple service flows to each CM, with each flow having its own characteristics and traffic parameters.

In a typical "strand" based wireless network deployment model such as those rural and urban scenarios previously described, a base station such as a CBRS CBSD (which typically is configured to utilize 3GPP LTE or 5G NR "Node B" technology and protocols as the basis for its operation) is backhauled to the network operator core (and MNO core if required) by the MSO's DOCSIS network; i.e., via a CM 125, as shown in FIG. 1A. The CBSD/xNB communicates to the CMTS 103 to transmit and receive traffic via the interposed CM 125.

However, in this strand network deployment model, since the CBSD/xNB uses the existing backhaul for data connectivity to other networks, there can be noticeable loss of data throughput/speed and increased latency in both the downstream (DS or DL) and the upstream (US or UL), especially in highly congested areas. This results in large part from each CM 125 sharing one or more common CMTS 103 and other backhaul infrastructure, and for the UL, the foregoing request/grant cycle for obtaining upstream bandwidth.

Moreover, opportunities for congestion of the network backhauling wireless base stations and other devices are increasing due to expansion of wireless services and use of small cells such as CBSDs. This is true since, inter alia, (i) multiple base stations may be backhauled by a common CMTS (see FIG. 1B, wherein multiple different CBSD/xNB devices 131 serving heterogeneous types of users/clients are backhauled to a common CMTS); and (ii) extant DOCSIS protocols do not have higher-level visibility as to either the presence of wireless base stations as CM "clients", nor the particular aspects of user or client devices accessing such wireless base stations for their own backhaul (e.g., user smartphones/tablets, FWA devices as in FIG. 5, vehicle telematics systems, or other cellular-enabled devices). In that base stations may act as "load multipliers" from the perspective of the backhaul due to their expanded wireless coverage area and accessibility to a variety of different types of devices, as their use expands within the service provider network, the potential resulting load and congestion increases disproportionately. As discussed above, newer generations of DOCSIS systems make use of expanded frequency ranges and OFDM technology (e.g., up to 1.2 GHz for DOCSIS 3.1, and 1.8 GHz for DOCSIS 4.0); however, such advanced technologies are only being implemented incrementally, and even when fully implemented, allocation of limited DOCSIS backhaul resources may be critical due to e.g., increased pervasiveness of ultra-high bandwidth and low-latency technologies such as 5G NR (including incipient mmWave variants thereof, which can operate at tremendously high data rates).

As can be appreciated, such congestion within the DOCSIS backhaul may manifest itself as a variety of undesirable conditions or symptoms, such as increased packet loss and retransmission requests, reduced data throughput, increased data latency, inability to maintain QoE or QoS requirements, or failed timing requirements (such as e.g., failure to complete UE to EPC/5GC core attachment and setup functions due to latency). These conditions can lead to reduced user experience or satisfaction with the service provider's services.

Hence, improved apparatus and methods for coordination between the wireline (e.g., DOCSIS) backhaul and the deployed base stations (and other devices) served by that backhaul are needed, especially with regard to fair and informed allocation of backhaul bandwidth to individual devices based on their configuration and anticipated or actual requirements.

SUMMARY

The present disclosure addresses the foregoing needs by providing, inter alia, methods and apparatus for scheduling and coordination between a wireless base station and its wireline backhaul.

In a first aspect of the disclosure, a computerized method of operating a packet network infrastructure comprising a plurality of packet receiver apparatus and at least one packet transmitter apparatus is described. In one embodiment, the method includes: obtaining data at respective ones of the plurality of packet receiver apparatus from wireless equipment connected thereto, each of the obtained data comprising data relating to a plurality of configuration aspects of the wireless equipment; and causing data relating to the obtained data to be transmitted to the at least one packet transmitter apparatus, the transmitted data configured to enable the at least one transmitter apparatus to determine scheduling of radio frequency (RF) channels utilized by the packet network infrastructure for communication between the plurality of packet receiver apparatus and the at least one packet transmitter apparatus.

In one variant, the method further comprises: identifying at the at least one packet transmitter apparatus, the wireless equipment connected to one of the plurality of packet receiver apparatus; and based at least on the identifying, causing a change in a weighting assigned to the one packet receiver apparatus, the change in the weighting affecting the scheduling. In one implementation, the identifying at the at least one packet transmitter apparatus the wireless equipment comprises identifying a type or configuration of a wireless base station connected to a cable modem (CM) based at least in inspecting one or more data structures transmitted to the CM from the wireless base station.

In another variant, the packet network infrastructure comprises a DOCSIS (data over cable service specification) packet data system, the at least one packet transmitter apparatus comprises a cable modem termination system (CMTS), and the plurality of packet receiver apparatus comprises a plurality of cable modems (CMs).

In a further variant, the causing data relating to the obtained data to be transmitted to the at least one packet transmitter apparatus comprises causing transmission of data indicative of the plurality of configuration aspects, the plurality of configuration aspects comprising: (i) a number of attached user or client devices; and (ii) configuration data enabling determination of a geographic location of the wireless equipment. In one implementation, the infrastructure comprises a hybrid fiber coaxial (HFC) network infrastructure; and the determination of scheduling of radio frequency (RF) channels utilized by the packet network infrastructure for communication between the plurality of packet receiver apparatus and the at least one packet transmitter apparatus comprises determination of a respective quantity of resources to allocate to each of the plurality of packet receiver apparatus. For instance, the respective quantities of resources each may include a respective number of downlink (DL) time slots.

In another variant, the method further comprises: obtaining second data at respective ones of the plurality of packet receiver apparatus relating to at least one configuration aspect of the respective packet receive apparatus; and causing data relating to the obtained second data to be transmitted to the at least one packet transmitter apparatus, the transmitted data relating to the obtained second data for use in the scheduling of radio frequency (RF) channels utilized by the packet network infrastructure.

In one implementation, the obtaining second data at respective ones of the plurality of packet receiver apparatus relating to at least one configuration aspect of the respective packet receive apparatus comprises obtaining data relating to one or more devices in data communication with the respective packet receive apparatus and requiring backhaul by the infrastructure.

In another aspect, a computerized network apparatus for use in a network is disclosed. In one embodiment, the network apparatus includes: at least one packet data interface configured for communication with a radio frequency transceiver apparatus; processor apparatus in data communication with the at least one packet data interface; and storage apparatus in data communication with the processor apparatus, the storage apparatus comprising at least one computer program.

In one variant, the at least one program is configured to, when executed by the processor apparatus, cause the computerized network apparatus to: receive first data packets via the at least one packet data interface, the first data packets comprising data relating to at least (i) a configuration of a wireless access node, and (ii) operation of the wireless access node; evaluate the received first data packets to generate characterization data relating a plurality of operational and configuration aspects of the wireless access node; and cause transmission of at least a portion of the characterization data to the radio frequency transceiver apparatus, the transmission of the characterization data enabling allocation by the computerized network apparatus of resources for use by (i) at least a modem apparatus associated with the wireless access node, and (ii) a plurality of other modem apparatus in data communication with the radio frequency transceiver apparatus.

In one implementation, the computerized network apparatus comprises a DOCSIS cable modem termination system (CMTS), the radio frequency transceiver apparatus comprises a QAM (quadrature amplitude modulation) modulator, and the modem apparatus comprises a DOCSIS cable modem (CM) which is used to backhaul the wireless access node. In one version thereof, the at least one computer program is further configured to, when executed by the processor apparatus, cause the computerized network apparatus to transmit data to the radio frequency transceiver apparatus causing scheduling of respective pluralities of time slots on a plurality of different RF carriers for use by respective ones of a plurality of modem apparatus including the at least modem apparatus associated with the wireless access node, the plurality of modem apparatus having a common operational or configuration attribute. For example, the common operational or configuration attribute may comprise membership in at least one of (i) a common physical service group (pSG), or (ii) a common virtual service group (vSG).

In another variant, the at least one computer program is further configured to, when executed by the processor apparatus, cause the computerized network apparatus to: determine that one or more operational criteria are met within at least a portion of an infrastructure of the network; and based at least on the determination, transmit data to the radio frequency transceiver apparatus causing a temporary change in allocation of the resources to at least one of the plurality of modem apparatus.

In a further variant, the evaluation of the received first data packets to generate characterization data relating a plurality of operational and configuration aspects of the wireless access node comprises evaluation of at least: (i) a technology type used by the wireless access node; (ii) a location of the wireless access node; and (iii) a number of user or client devices in active data communication with the wireless access node. In one implementation thereof, the evaluation of the technology type used by the wireless access node comprises evaluation of whether the wireless access node is capable of wireless operation compliant with 3GPP (Third Generation Partnership Project) 5G NR (Fifth Generation New Radio) Standards; the evaluation of a location of the wireless access node comprises determination of whether the wireless access node is located within a designated hotspot or high activity area; and the evaluation of a number of user or client devices in active data communication with the wireless access node comprises determination of a number of 3GPP UE (user equipment) operating in either RRC_Idle or RRC_Connected modes.

In a further aspect of the disclosure, computerized wireless access node apparatus is described. In one embodiment, the node apparatus includes: at least one first packet data interface for interface with a radio frequency modulation/demodulation apparatus; at least one wireless interface for interface with one or more wireless user devices; processor apparatus in data communication with the at least one first packet data interface and the at least one wireless interface; and storage apparatus in data communication with the processor apparatus, the storage apparatus comprising at least one computer program.

In one variant, the at least one program is configured to, when executed by the processor apparatus, cause the computerized wireless access node apparatus to: transmit data relating to at least one of a configuration or operational state of the computerized wireless access node apparatus to a network apparatus via the radio frequency modulation/demodulation apparatus, the network apparatus and radio frequency modulation/demodulation apparatus communicative via at least one wireline radio frequency channel, the transmitted data configured to enable the network apparatus to selectively schedule data for delivery to the radio frequency modulation/demodulation apparatus using a plurality of time-frequency resources, the plurality of time-frequency resources selected as part of a scheduling algorithm configured to also schedule respective pluralities of time-frequency resources for others of a plurality of radio frequency modulation/demodulation apparatus communicative with the network apparatus based at least on respective data relating to a configuration of a computerized wireless access node apparatus associated with respective ones of others of the plurality of radio frequency modulation/demodulation apparatus.

In one implementation, the radio frequency modulation/demodulation apparatus comprises a cable modem within a hybrid fiber coax (HFC) network; the wireless access node comprises a 3GPP-compliant NodeB; and the data relating to at least one of a configuration or operational state comprises data indicative of at least: (i) a technology type used by the wireless access node; (ii) a location of the wireless access node; and (ii) a number of user or client devices in active data communication with the wireless access node.

In another implementation, the data relating to at least one of a configuration or operational state comprises data indicative of a weight or score derived by the wireless access node based at least one the configuration or operational state, and the at least one computer program is further configured to, when executed by the processor apparatus, cause the computerized wireless access node apparatus to: generate a request for grant of a temporary increase in resource allocation by the network apparatus; and transmit the request to the network apparatus via the radio frequency modulation/demodulation apparatus in data communication with the wireless access node.

In another aspect, a method of conducting, at a network modem apparatus, an evaluation to determine resource scheduling for a plurality of premises modem apparatus, is described.

In a further aspect of the disclosure, computer readable apparatus including a non-transitory storage medium, the non-transitory medium including at least one computer program having a plurality of instructions is disclosed. In one embodiment, the plurality of instructions are configured to, when executed on a processing apparatus: receive data relating to a configuration used for transmission of data between base stations connected to a modem and respective UE devices, and based on the received data, adjust a configuration of a plurality of OFDM channel between a modem termination system and respective ones of the modem so as to achieve one or more target network operational parameters.

In one variant, the storage apparatus includes a storage medium configured to store one or more computer programs, such as on a CMTS. In one embodiment, the apparatus includes a program memory or HDD or SSD and stores one or more computer programs.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a baseband processing unit (BBU) is disclosed. In one embodiment, the BBU is disposed within an HFC network infrastructure and is configured to interface with a plurality of distributed radio head units at respective served premises of the HFC network in support of, inter alia, wireline backhaul resource scheduling.

These and other aspects shall become apparent when considered in light of the disclosure provided herein.

BRIEF DESCRIPTION OF THE DRAWINGS

FIG. 1 is a block diagram illustrating a prior art hybrid fiber-coaxial (HFC) data network for delivery of data to end user devices.

FIG. 2C is a tabular representation of frequency bands associated with prior art cable systems including broadband (DOCSIS 4.0).

FIG. 6B is a tabular representation of various E-UTRA RF spectrum bands currently allocated.

Figure 1A:
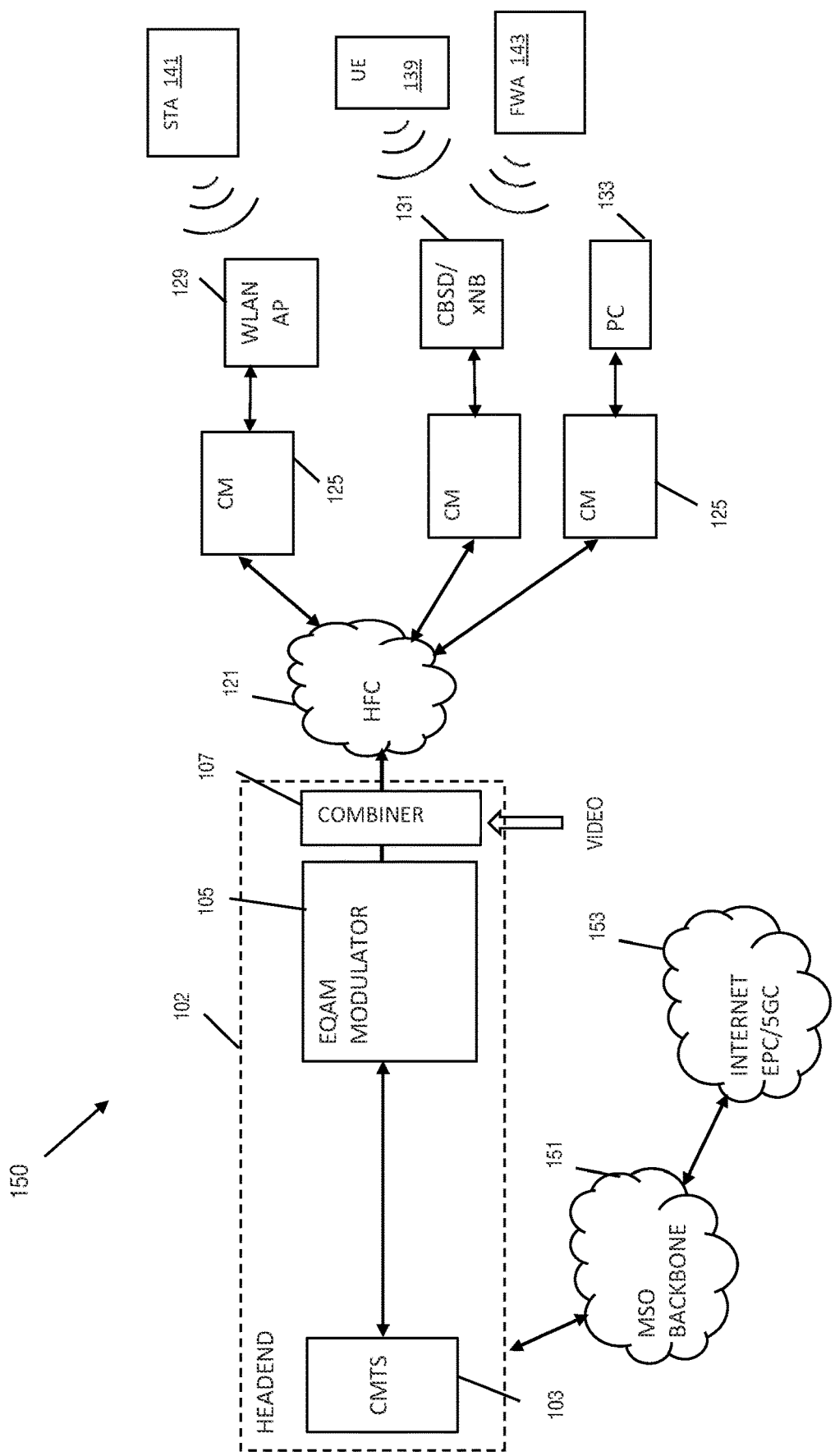
FIG. 1A is a block diagram illustrating the DOCSIS infrastructure of the HFC network of FIG. 1, and various types of backhauled premises devices.
Figure 1B:
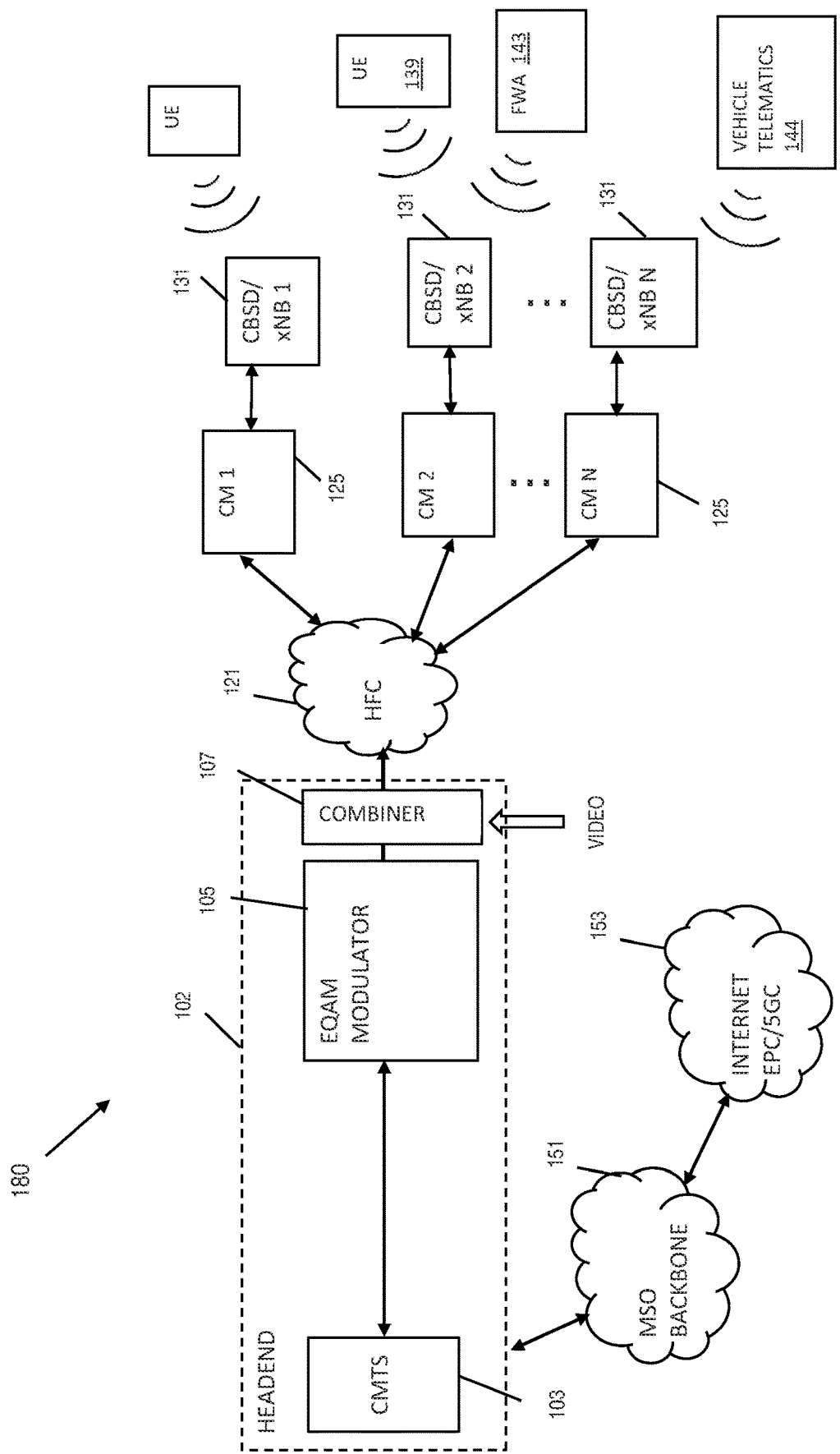
FIG. 1B is a block diagram illustrating the DOCSIS infrastructure of the HFC network of FIG. 1, wherein multiple different devices serving heterogeneous types of users/clients are backhauled to a common CMTS.
Figure 2A:
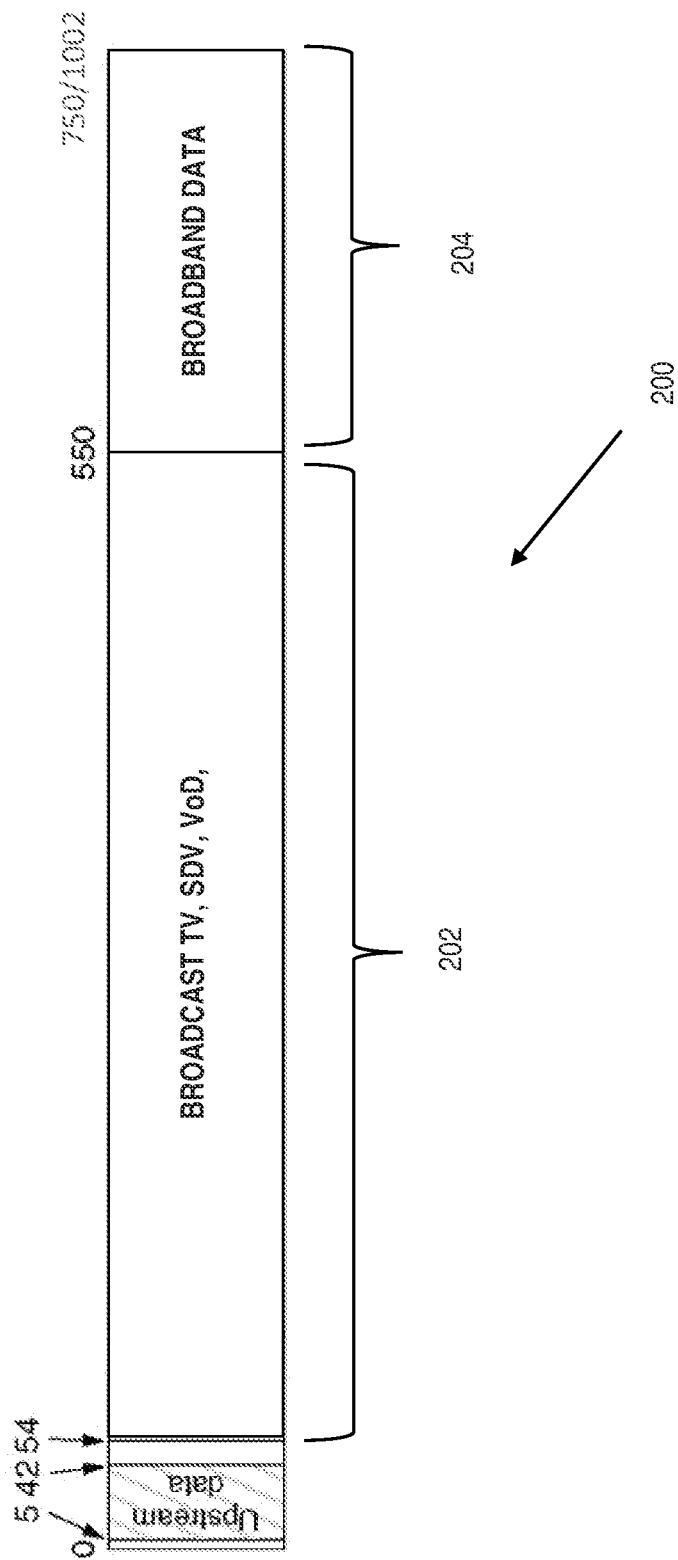
FIG. 2A is a graphical representation of frequency bands associated with prior art cable systems including broadband (DOCSIS 3.0).
Figure 2B:
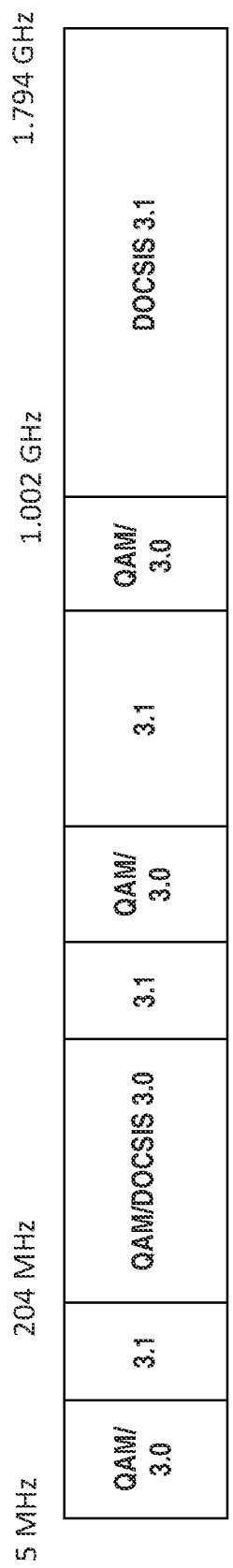
FIG. 2B is a graphical representation of frequency bands associated with prior art cable systems including broadband (DOCSIS 3.1).

All Figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in Signaling Protocols and Procedures for Citizens Broadband Radio Service (CBRS): *Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDMA, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term wireline includes electrical and optical transmission media such as, without limitation, coaxial cable, CAT-5/6 cable, and optical fiber. As used herein, the term "xNB" refers to any 3GPP-compliant node including without limitation eNBs (eUTRAN) and gNBs (5G NR).

Overview

In one exemplary aspect, the present disclosure provides methods and apparatus for enhancing bandwidth/resource scheduling with respect to base stations (e.g., xNB's or other types of small cells) that are backhauled by wireline networks such as DOCSIS cable networks. In one embodiment, enhanced communication between the base station and its backhaul network including the wireline modem components thereof such as the CMTS enable the backhaul network to better allocate resources on the backhaul (including on a base station/strand-specific basis) in effect providing a higher layer view or abstraction for resource consumption across a number of different strands collectively.

In one variant, an enhanced CMTS (CMTSe) is disclosed which has processes operative thereon that, inter alia, enable evaluation of different served strands of the backhaul, and modification of scheduling and prioritization for DOCSIS channels allocated cable modems on each strand, including those operating under incipient DOCSIS network technologies such as DOCSIS 3.1 and 4.0. In one embodiment, a priority score or schedule factor is calculated for each of the evaluated strands; this priority score/schedule factor is used to determine relative scheduling of resources via e.g., existing DOCSIS scheduling or allocation algorithms (e.g., on top of other resource allocation determined by the underlying protocols).

In one implementation, an enhanced xNB (xNBe) is configured to transmit data regarding its configuration and operation (including for instance data relating to the type of wireless technology and any specific features relating thereto used by the base station, the number of "attached" user devices (and their type), and the geographic location of the base station) to the CMTSe, so as to enable the CMTSe to dynamically adapt the scheduling of time and/or frequency resources for each of the strands served so as to most effectively allocate e.g., DS bandwidth on the wireline backhaul.

In another implementation, a base station (or its backhauling CMe) is configured to dynamically issue temporary or short-duration "surge" requests to the CMTSe in order to enable a temporary boost in allocated resources for that strand. In one variant thereof, one or more prioritized service flows are temporarily established for use by the target CMe/B Se strand.

Employing the resource scheduling adaptation techniques discussed above provides enhanced DL and UL capacity for the user device(s) connected to the xNBe (as well as other devices which may be served by the CMe, such as user PCs or WLAN APs), thereby effectively enabling addition of more services and customers to the network with a given CAPEX (capital expenditure) or existing available bandwidth.

The methods and apparatus described herein may also advantageously be extended to backhauls for base stations which operate in licensed, unlicensed or shared-access architectures, including where a given backhaul infrastructure includes heterogeneous types of cells (e.g., a licensed Band 71 or Band 12-17 cell) associated with one CMe, a quasi-licensed CBRS cell operating at 3.550-3.700 GHz associated with another CMe, and a mmWave gNB operating at say 42 GHz associated with a third CMe).

DETAILED DESCRIPTION OF EXEMPLARY EMBODIMENTS

Exemplary embodiments of the apparatus and methods of the present disclosure are now described in detail. While these exemplary embodiments are described in the context of the previously mentioned base station (e.g., 3GPP eNB or gNB), wireless access points using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Methodology—

Figure 7:
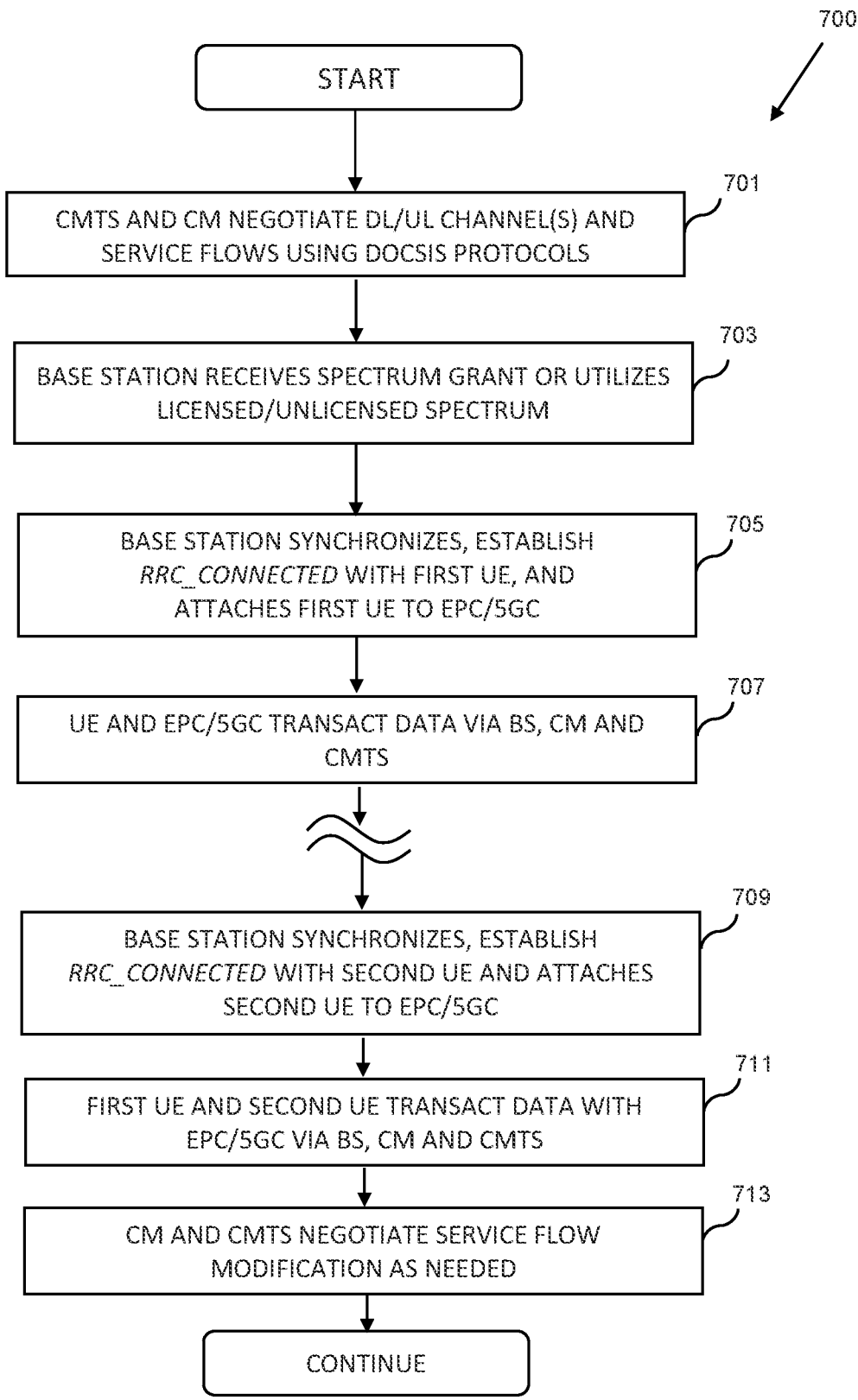
FIG. 7 is a logical flow diagram illustrating a typical prior art data operational and backhaul scenario for a wireless base station (e.g., CBSD) backhauled via the DOCSIS infrastructure of FIG. 1A.
Figure 8:
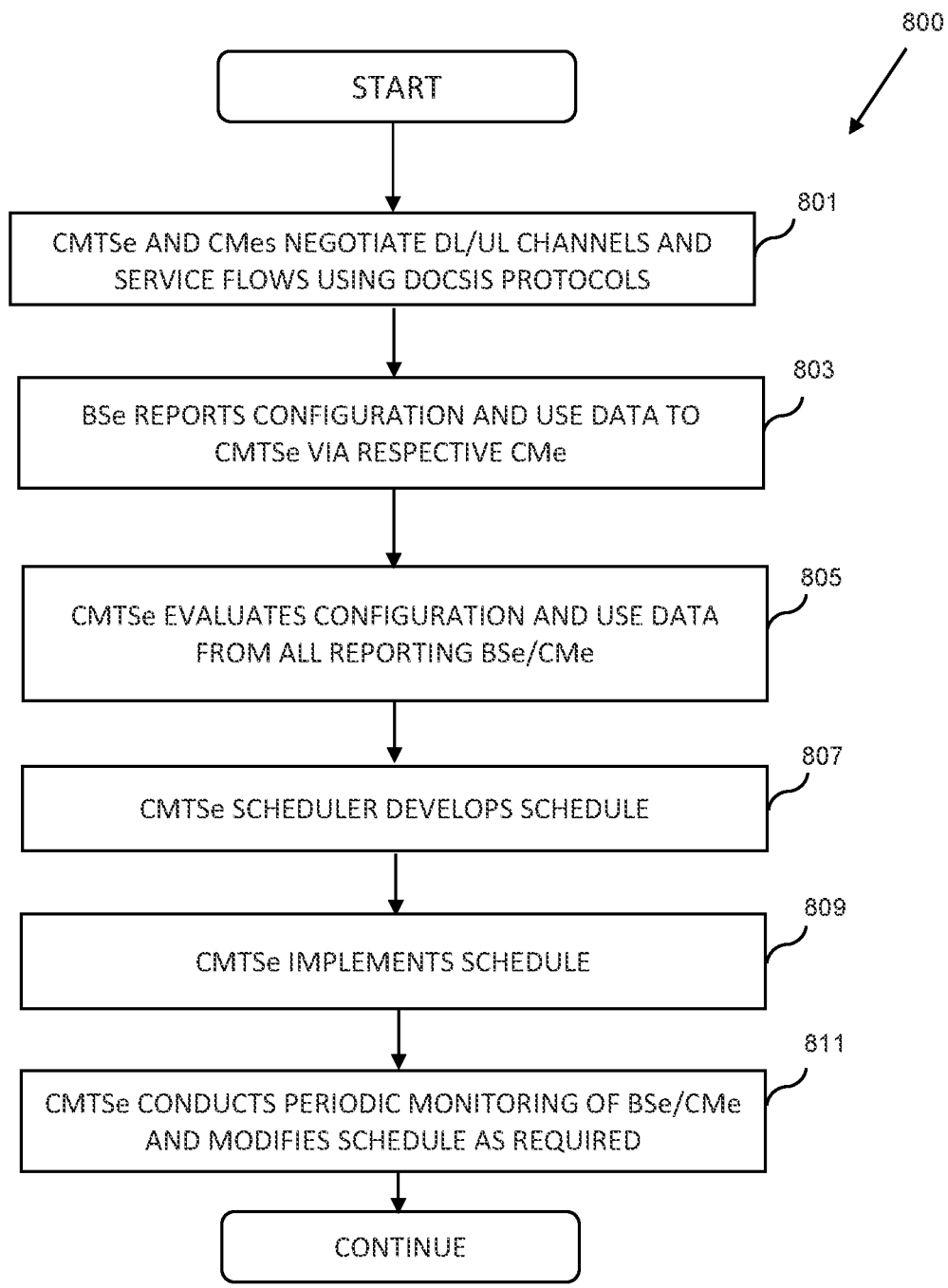
FIG. 8 is a logical flow diagram illustrating one embodiment of a generalized method for bandwidth allocation and scheduling for enhanced wireless base stations backhauled via the improved DOCSIS infrastructure of the present disclosure.
Figure 9:
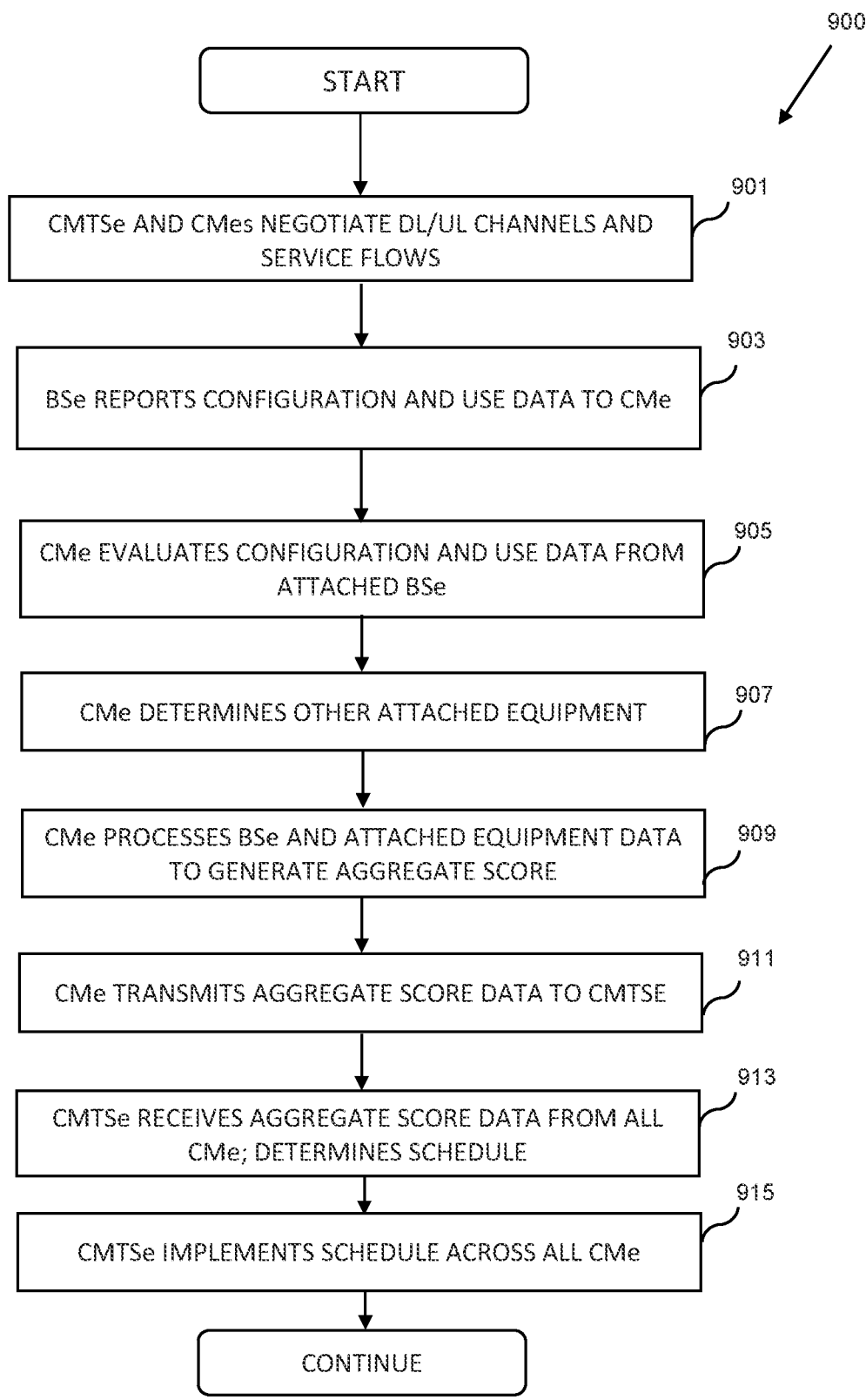
FIG. 9 is a logical flow diagram illustrating another embodiment of a generalized method for wireline bandwidth allocation and scheduling, wherein individual CMe perform collection, aggregation and evaluation of data.

Various methods and embodiments thereof for enhancing resource allocation and scheduling of a wireless device backhauled by a DOCSIS network according to the present disclosure are now described with respect to FIGS. 7-9.

However, before discussing these embodiments, it is illustrative to review in detail the operation of extant DOCSIS systems while servicing a wireless device via a base station backhauled thereby. Referring now to FIG. 7, a prior art sequence 700 for wireless device service provision is conceptually shown. At step 701, the CMTS and CM negotiate channel configuration and service flows, such as for a DL bearer and service flow as set forth in the exemplary DOCSIS protocols incorporated by reference elsewhere herein.

Per steps 703 and 705, the user device (e.g., a 3GPP UE such as a mobile device or FWA) utilizes radio frequency spectrum within which it is permitted to operate (whether natively by virtue of its chipset/architecture, or via a dynamic grant of spectrum), and implements so-called "RACH" (random access channel) procedures to synchronize with the base station (e.g., gNB or eNB, hereinafter "xNB"). Pursuant thereto, the UE also subsequently connects to the xNB to establish a radio resource layer connected state (i.e., RRC_Connected) via UL and DL shared channels and associated procedures. RACH and RRC procedures are well known, and not described further herein.

Once connected, the UE transacts its application data over the xNB, CM and CMTS backhaul with e.g., a distant networked server process, utilizing e.g., 3GPP packet data network (PDN) infrastructure. As part of such transaction, application layer or user-plane (UP) data is transacted back and forth, such as for delivery of streaming media to the connected UE. As such, the CMTS routes DL data packets destined for the UE application to the CBSD via the CM using the established service flows.

Per step 707, the UE and the core transact data via the BS (xNB) and the backhaul. The process of steps 701-707 is repeated across multiple different CM/BS strands, such as each time a UE attaches to a given base station. These steps may occur concurrently across the different CM/BS strands, in a staggered fashion, and may occur randomly.

Per step 709, a second UE synchronizes, connects and attaches to the BS/core, and per step 711, the first and second UE each transact data over the wireline backhaul including the CM and CMTS. It will be appreciated that FIG. 7 is somewhat of a simplified representation of the actual operations and steps; for instance, data is transacted multiple times between each UE and xNB during RACH and connection, and between each xNB and the core during attachment, as well as for negotiation with the network server, etc.

Per step 713 of the method 700, the CM and CMTS negotiate modifications to existing service flows as needed to support the data load from the two (or more) UEs.

As a brief aside, for DOCSIS 3.0, downstream channels employ a downstream scheduler process operative at the CMTS that manages the allocation of bandwidth across multiple 6 MHz wide channels among competing service flows (a transport service that provides unidirectional transport of packets). A DS service flow may consist for example of one or more TCP/IP connections terminating at a specific CM, and service flow traffic may be prioritized based on QoS traffic parameters associated with the flow. However, the DOCSIS 3.0 standard does not specify how a specific scheduling implementation should differentially treat data having different priority levels.

Under DOCSIS 3.0, the upstream channel is time division (TDM) multiplexed (or SC-FDMA), and the TDM mode uses transmission slots referred to as mini-slots. Permission to transmit data in a block of one or more mini-slots must be granted by a CMTS to each CM. The CMTS grants mini-slot ownership by periodically transmitting MAP frames on the downstream channel. The MAP also typically identifies some mini-slots as contention slots; for these contention slots, the CMs may bid for quantities of future resources. To minimize collisions for the contention slots, a backoff procedure is employed. Additionally, in the event that a CM has a backlog of upstream packets, it may also "piggyback" a request for mini-slots for the next packet at the end of the then-current packet.

In contrast to DOCIS 3.0, DOCSIS 3.1 DS channel bandwidth is between 24 and 192 MHz, and between 6.4 and 96 MHz in the US. The DOCSIS 3.1 physical layer uses wideband orthogonal frequency division multiplexing (OFDM) channels (downstream) and orthogonal frequency division multiple access (OFDMA) channels (upstream). Due to the use of many subcarriers in an upstream channel, multiple CMs on the same upstream channel can send data packets to the CMTS simultaneously on different subcarriers. This approach enables a very large data bandwidth through the use of only a single channel. Additionally, at the MAC layer, DOCSIS 3.1 continues to support channel bonding. This feature now allows the bonding of OFDM/OFDMA, as well as mixed bonding of legacy single-carrier channels and the OFDM/OFDMA channels (i.e., effectively treating an OFDM/OFDMA channel as a single-carrier channel). DOCSIS 3.1 also requires AQM (Active Queue Management) to reduce the buffering latency in CM and CMTS.

In addition to the "best efforts" service previously described, other services may be used for traffic service flow management (depending on the version of DOCSIS). For example, Non-real-time polling service (NRTPS) can be used for upstream service flows. In this service, the CMTS scheduler sends unicast polls to individual CMs on a fixed interval, in order to determine whether data is queued for transmission on a particular service flow. If so, the CMTS scheduler provides a transmission grant for the service flow. Associated QoS parameters for NRTPS may include Traffic priority, Request Transmission Policy, Maximum Sustained Traffic Rate, Maximum Traffic Burst, Minimum Reserved Traffic Rate, Assumed Minimum Reserved-Traffic-Rate Packet Size, and Nominal Polling Interval.

Additionally, the Real-time polling service (RTPS) may be used for upstream service flows. RTPS is generally analogous to NRTPS, except that the fixed polling interval is contracted. In RTPS, request opportunities that meet the service flows' real-time needs can be selected, and the cable modem may specify the size of the desired grant. QoS parameters for RTPS may include Request Transmission Policy, Maximum Sustained Traffic Rate, Maximum Traffic Burst, Minimum Reserved Traffic Rate, Assumed Minimum Reserved-Traffic-Rate Packet Size, Nominal Polling Interval, and Tolerated Poll Jitter.

Under the Unsolicited grant service (UGS), upstream service flows receive a fixed-size grant at fixed intervals without additional polling or interaction. Thus, UGS eliminates much of the overhead associated with the polling flow types described above. QoS parameters may include Request Transmission Policy, Unsolicited Grant Size, Grants per Interval, Nominal Grant Interval, and Tolerated Grant Jitter.

Unsolicited grant service with activity detection (UGS-AD) is hybrid of the UGS and RTPS scheduling types. When there is activity, the CMTS sends unsolicited fixed grants at fixed intervals to the CM(s). Conversely, when there is no activity, the CMTS sends unicast poll requests to the CM(s) so as to conserve bandwidth. QoS parameters for UGS-AD may include Request Transmission Policy, Nominal Polling Interval, Tolerated Poll Jitter, Unsolicited Grant Size, Grants per Interval, Nominal Grant Interval, and Tolerated Grant Jitter.

For downstream service flows, a similar set of QoS parameters that are associated with the best-effort scheduling type on upstream service flows is utilized. QoS parameters for the DS SFs may include Traffic Priority, Maximum Sustained Traffic Rate, Maximum Traffic Burst, Minimum Reserved Traffic Rate, Assumed Minimum Reserved-Traffic-Rate Packet Size, and Maximum Latency.

However, despite the foregoing existing mechanisms for service flow creation and management, there is no cognizance by the DOCSIS system scheduler of (i) the presence of wireless base stations behind each of the CMs, or (ii) each of the different CM/BS strands collectively (other than by the underlying DOCSIS service flow protocols described above). Each strand is in effect treated in isolation and allocated resources according to the aforementioned DOCSIS protocols. Stated differently, optimizations which might occur or be available to the scheduler by virtue of knowledge of the type and usage of equipment associated with each of the respective CMs are not available under existing protocols, even with all of the control "granularity" discussed above, since the CMTS has no visibility beyond each CM.

With the foregoing as a backdrop, the exemplary methods of providing enhanced communication and resource scheduling according to the present disclosure are now described with respect to FIG. 8.

At step 801 of the method 800, the enhanced CMTS (CMTSe) 803 and enhanced CM (CMe) 831 (see FIG. 8) connect and negotiate channel configuration and service flows, such as for a DL bearer and service flows as set forth in the exemplary DOCSIS protocols described above and incorporated by reference herein. As described subsequently herein, such negotiation may also include the CMTSe establishing one or more designated/dedicated "base station" service flows for transacting data destined for, or transmitted by, the xNBe.

Per step 803, the base station (e.g., xNBe) connects to the CMe (such connection which may be pre-existing, such as by virtue of e.g., IEEE Std. 802.3 or similar protocols previously executed between the MACs of the devices). This connection enables two-way transaction of data between the devices. The xNBe also communicates configuration and use data to the CMe. This data may include for instance data indicative of (i) the xNBe configuration in terms of supported technology types; (ii) the current geographic location of the xNBe (which will generally be within a prescribed proximity of the CMe, to the extent that the location of the latter is known, such as via a premises service address); and (iii) the number of connected/attached UE for the base station.

For example, data relating to the XNBe technology type may be general (e.g., highest technology capable of being supported, such as 4G or 5G NR, Release 8-13 or Release 15-17, etc.) or highly granular, such as regarding specific features of each technology (e.g., whether the xNBe supports multiple diversity channels, SM (spatial multiplexing, and hence enhanced data throughput), or whether Dynamic Spectrum Sharing or DSS (e.g., 4G and 5G "coexistence" modes where one or more carrier are shared) are supported/enabled). This data enables the CMTSe to, in one embodiment, assign a score or weight to that aspect of the associated CMe regarding expected peak bandwidth consumption by the xNBe. For example, a 5G NR gNB device with 8-MIMO antenna and SM capability enables may consume, at maximal load, many times the bandwidth of a first-generation LTE (4G) eNB. Similarly, with 5G NR low-latency requirements (1 ms roundtrip), any "congestion" encountered on the backhaul may be more deleterious to the 5G NR device as compared to the 4G device.

Another factor that can be leveraged by the CMTSe in determining individual strand or CMe scheduling is the type of spectrum employed by the wireless node connected to a given CMe. For example, some types of wireless technologies and spectrum have inherently higher (maximum) data rates associated with their air interfaces. A Release 17 5G NR mmWave system operating at e.g., 40 GHz has many times the data rate capacity of e.g., a 4G-based Band 71 interface operating at roughly 650 MHz.

Figure 3:
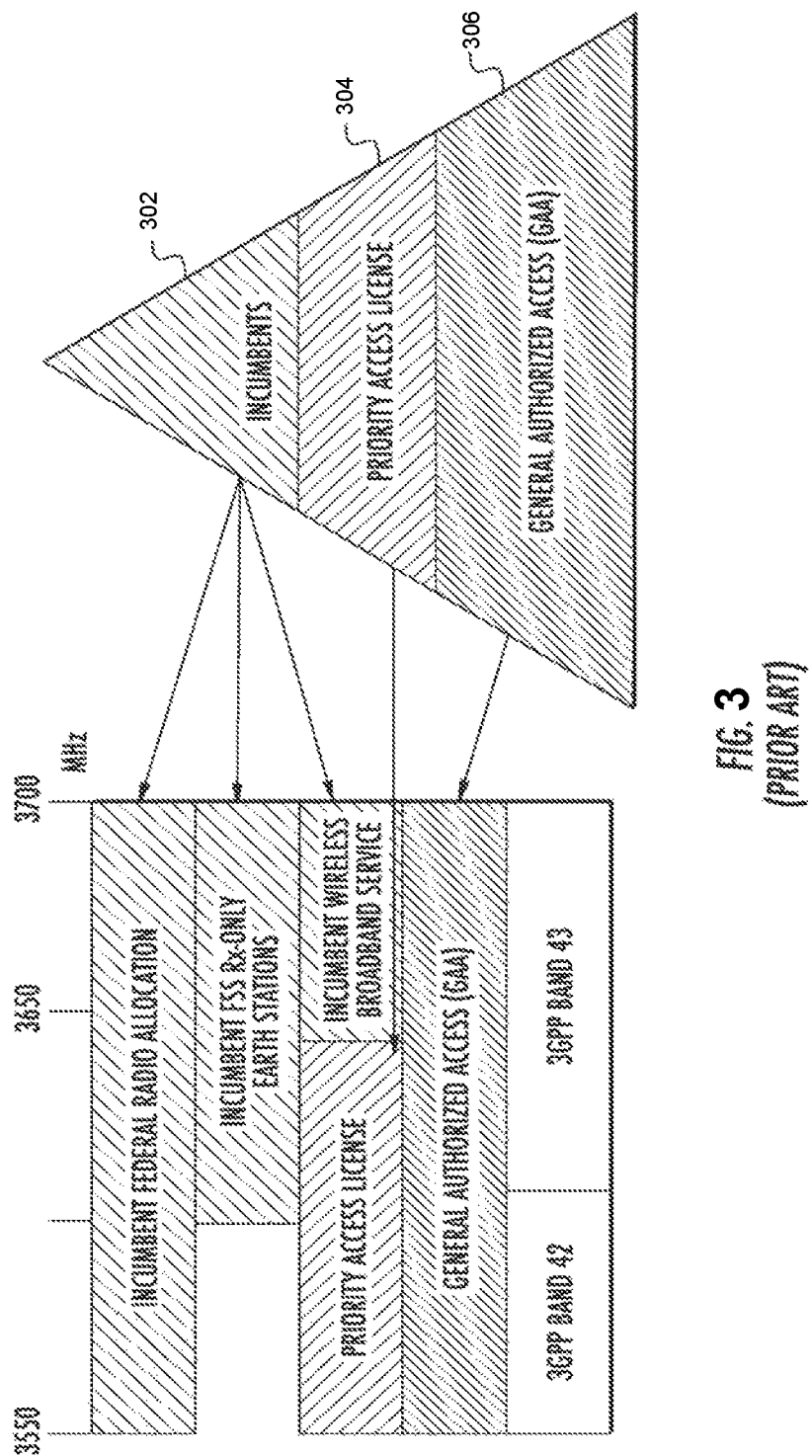
FIG. 3 is a graphical illustration of prior art CBRS (Citizens Broadband Radio Service) users and their relationship to allocated frequency spectrum in the 3.550 to 3.700 GHz band.
Figure 4:
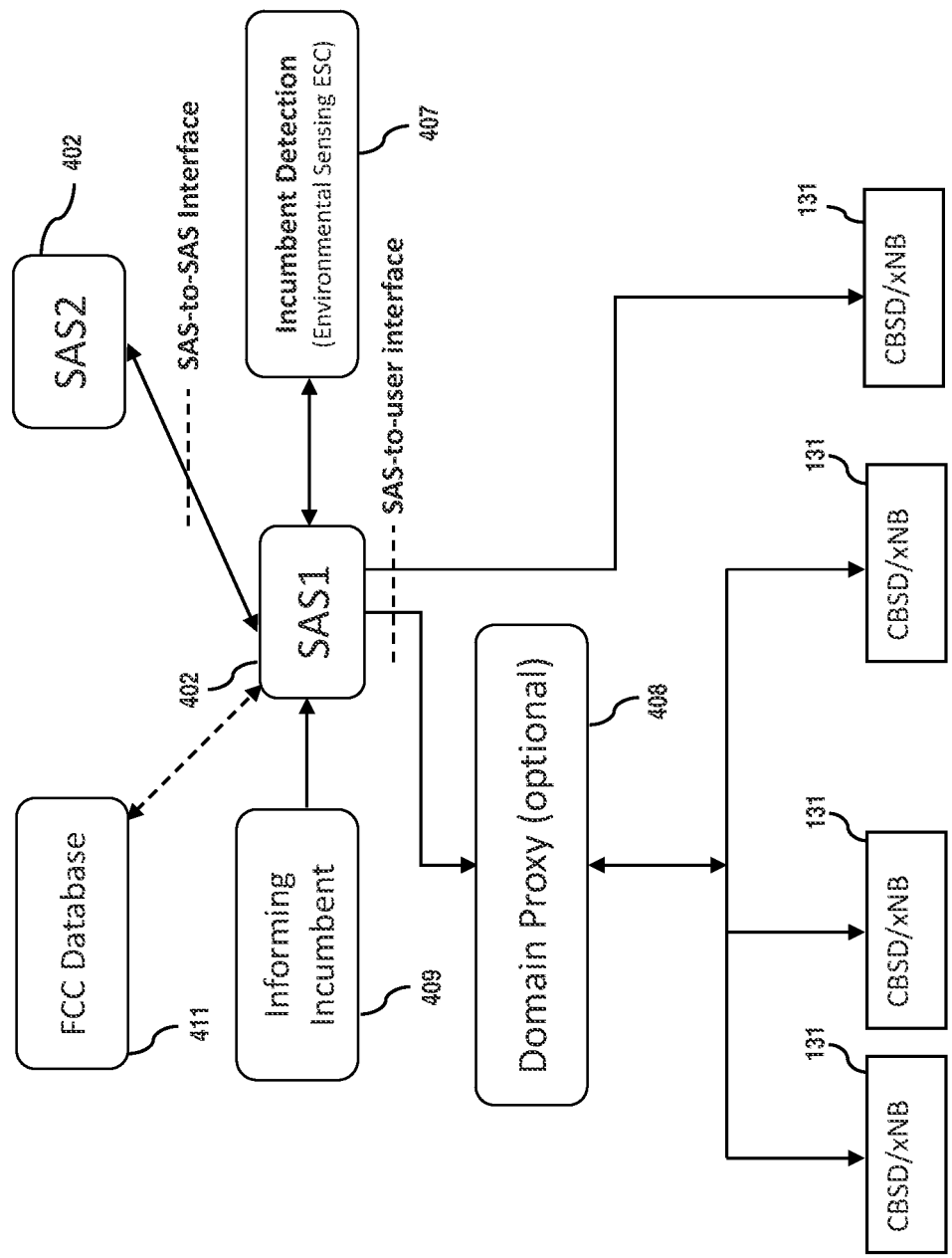
FIG. 4 is a functional block diagram illustrating a general architecture for the CBRS system of the prior art.

Likewise, aside from data rate, different classes of spectrum may have different attributes which may impact their backhaul demands. For instance, in the exemplary context of CBRS spectrum, PAL vs. GAA spectrum (see FIG. 3) have two different licensing models (with GAA being generally accessible or effectively unlicensed, and PAL being revocably licensed to a limited population of users). As such, PAL spectrum is (at least currently) far less congested, and therefore can physically sustain higher data rates due to e.g., better SINR, channel quality, availability of higher-order modulation and coding schemes (MCS), etc. From a business perspective, PAL spectrum may also be associated with higher-tier or more preferred customers.

Figure 6A:
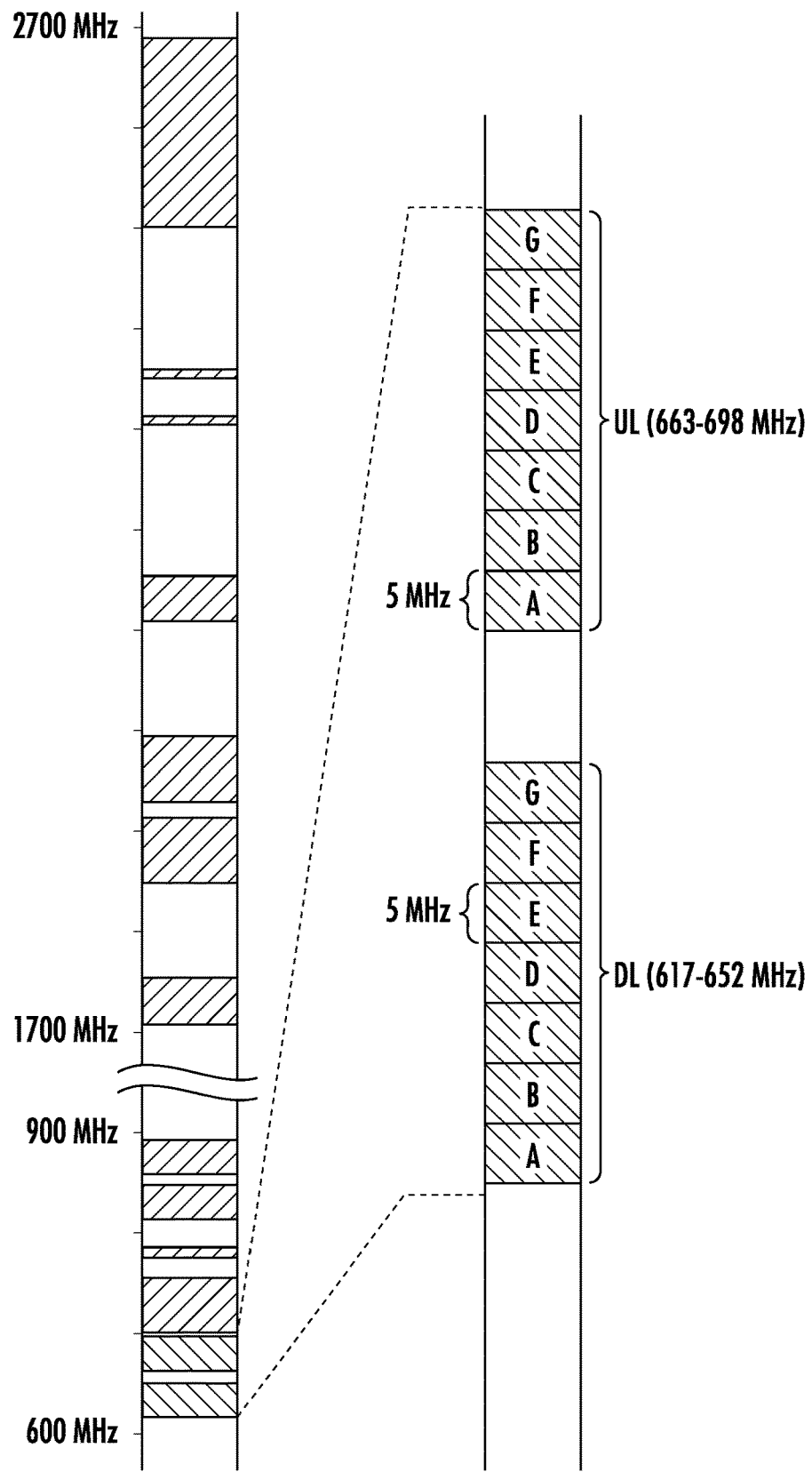
FIG. 6A is a graphical representation of Band 71 radio frequency (RF) spectrum currently allocated for use by the FCC.

Accordingly, in some embodiments of the present disclosure, the CMTSe scheduler logic is configured to utilize data obtained from the xNBe(s) relating to connected base station air interface technology and frequency, as well as type or class of spectrum allocated to each xNBe. In some cases, this description may be broadly drawn; for example, if the xNBe is configured to operate only within the range of 600-800 MHz or 3.550-3.700 MHz, this data can be communicated as such, without particular narrower definitions which may vary with time. Alternatively, if desired, the xNBe may be configured to provide narrower, more time-variant descriptions, such as when a particular frequency or band of frequencies (say 617-652 MHz on the Band 71 DL as shown in FIG. 6A) is contemplated for use for a period of time, or duration of a connection with a given UE or set of UE. While the former approach has the benefit of simplicity and reduced "hopping" or adaptation that may be needed by the CMTSe (described below), it also potentially over-allocates resources to the xNBe, thereby potentially unnecessarily resulting in preemption of use of such resources by other CMes commonly utilizing the wireline backhaul.

In terms of geographic location, different xNBe instances may or may not be located in different types of operating environments as compared to other xNBe instances. For instance, an xNBe located in a high-density urban application may have markedly different use statistics (and use cases) than say a rural installation of the same xNBe. In one such variant, the geographic data obtained by the CMTSe may be lat/lon or similar position data. This may be obtained from e.g., an indigenous GPS receiver installed within the xNBe, or from a configuration or other data file maintained by the xNBe, such as one created by an MSO installer at time of installation. The xNBe may also be configured to obtain the data (e.g., via a higher layer process operative on the xNBe) from a network or cloud process, such as an MSO customer or subscriber database. This location data, once received by the scheduler logic of the CMTSe, can be used to determine whether the xNBe is located within a designated "hostpot", low-use area, or other such region which allows for differentiation in terms of resource scheduling. For instance, in one variant, the CMTSe logic may access a historical or current "heat map" indicating usage as a function of geographic location. Depending on the level of usage for the xNBe location, the scheduler may categorize the xNBe as e.g., "high/medium/low" expected use category or other such fuzzy variable, rank it on a numerical scale or using a scoring/weighting system, etc.

Other data which may be useful to the CMTSe in scheduling decisions is the number of (then) current user devices attached to the xNBe. For example, in one embodiment, the xNBe is configured to operate using 3GPP protocols, and the number of "attached" users is determined by enumerating the user devices in RRC_Connected state. Users in RRC_Idle or other states may also be included if desired, or added to another category (e.g., "incipient" or "potential" users). By knowing the number of active users actually connected to each xNBe, the CMTSe scheduler can more accurately project usage of a given base station for at least the near term. For instance, even if the base station is within a known or designated "hotspot" region, it may simply have few users due to simple statistical variation, weather events, time of day/day of week, etc. These factors can also be folded into the data obtained by the CMTSe described above (i.e., the location lookup); the heat map or database may also include data which indicates e.g., historical temporal variations or correlations, such as for time of day, day of week/year, etc. However, such variations may also be highly anecdotal and uncorrelated, such as where a (typically) very low use xNBe in a rural location has very high traffic on one day due to e.g., an event such as a fair, concert, etc.

Figure 5:
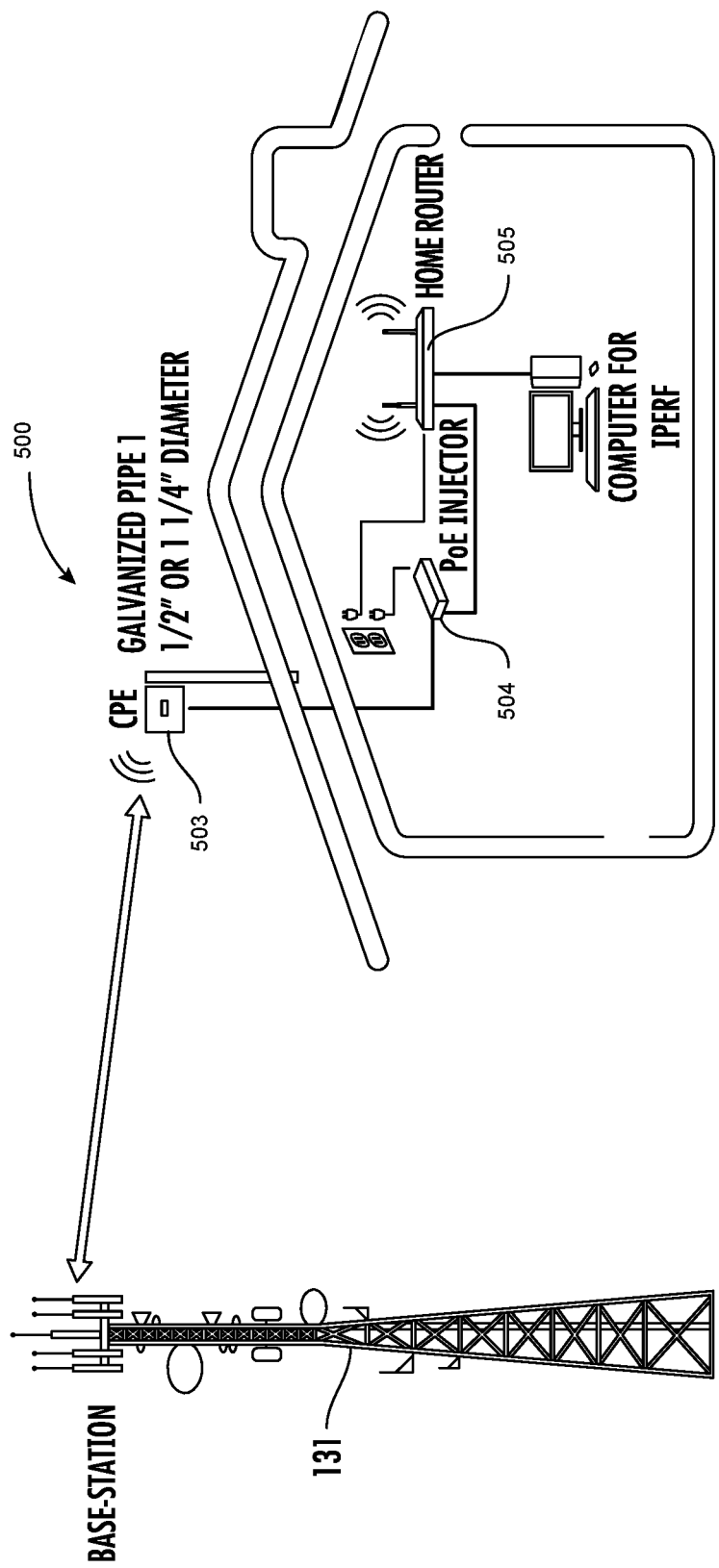
FIG. 5 is a graphical illustration of a prior art configuration for delivery of data from a base station to an end-user device (CPE/FWA) within the wireless coverage area of the base station.

Yet another factor which may be included in the CMTSe evaluation logic is the type of client or user device being served by the base station (and hence its' associated CMe and backhaul). For instance, a CBSDe served by a wireline backhaul might operate as either a Category A or Category B CBSD, depending on its configuration and grants from the cognizant SAS. As such, the higher transmit power may in some cases be correlated to expected higher data loading. For instance, a Category B CBSD could be used as a wireless backhaul for multiple FWA devices 503 (see FIG. 5), each of the FWA devices backhauling multiple devices such as PCs, WLAN APs, and even UEs at the served premises. In contrast, a Category A CBSD might only serve a much more limited service area (and scope of possible users), and hence may at least statistically represent a lower expected backhaul load on the wireline network. Even with such classes (e.g., Category A and B CBSDs), differentiation may be possible, such as where a Category B CBSD may have no FWA client devices (only e.g., mobile smartphone UEs), and hence may be categorized in a lower putative backhaul tier based thereon.

Per step 803, the CMe transmits the received data to the CMTSe using e.g., an established upstream bearer. It will be appreciated that various different schemes for such transmission are contemplated, including e.g., (i) a "pass through" such as where the data packets containing the above-referenced configuration and use data are addressed to a recipient port/socket or process on the CMTSe, or (ii) the data packets are addressed to a socket/port or process on the CMe, which upon receipt de-encapsulates them, performs any additional processing required, and then re-encapsulates them and addresses them for transmission to the target CMTSe process. For example, in some cases, the CMe may be configured to add further data to that received from the xNBe, which may be useful to the CMTSe in performing the evaluations/analysis described subsequently herein, such as e.g., data regarding ancillary or non-BS devices also connected to the CMe (such as Wi-Fi APs, PCs, etc.), channel statistics or estimation data, prioritization or classification data (such as by adding data to the IP packet header(s) indicating that the data is associated with a wireless base station or other class of device which merits inclusion in scheduler calculations performed by the CMTSe).

Per step 805, the CMTSe receives the transmitted data (whether passed-through or appended, as previously described) from the different CMe devices and evaluates the configuration/use data contained therein relating to each particular device, as described in greater detail subsequently herein. In one variant, the data is associated with a base station or other unique identifier which allows the CMTSe to maintain a correlation table (e.g., LUT) or other data structure which enables the CMTSe to determine characteristics/use versus specific base station at any given point in time. The serving/connected CMe may also be identified therein, such that the CMTSe can, if desired, form larger-scale relationships between individual base station-equipped "strands" served by the CMTSe (such as identification of common physical service groups (pSGs) or "virtual" service groups (vSGs), examples of the latter described in co-owned and co-pending U.S. patent application Ser. No. 16/986,131 filed Aug. 5, 2020 and entitled "APPARATUS AND METHODS FOR OPTIMIZING CAPACITY IN WIRELINE CABLE NETWORKS WITH VIRTUAL SERVICE GROUPS," which is incorporated herein by reference in its entirety).

The CMe (as opposed to the BSe) may also be used as the basis of final scheduling decisions made by the CMTSe scheduler (step 807), such as where the additional connected devices associated with a given CMe are included in scheduling evaluations, as well as the type of CM device (e.g., whether DOCSIS 3.0 or 3.1 compliant, which affect the DS and US PHY and multiple access scheme (US) used). As described in greater detail below, the present disclosure explicitly contemplates embodiments of the CMTSe scheduler which can differentiate treatment/scheduling for "strands" having DOCSIS 3.1-capable CM devices (with OFDM/OFDMA in the DS/US PHY) from DOCSIS 3.0 compliant devices (which do not utilize OFDM).

Per step 809, the CMTSe applies the developed schedule to the various "scheduled" CMe/BSe. It will be appreciated that the pool of CMe/BSe which the scheduler considers in its schedule development may include only those CMe which have BSe attached (as identified by the aforementioned BS identifier value or other designation mechanism), those within a given pSG or vSG, or a more expansive set (such as all CMe served by the CMTSe).

Lastly, per step 811, the CMTSe conducts periodic monitoring of all CMe/BSe (as applicable) within the designated scheduling pool, and the schedule generated in step 807 is modified by the CMTSe scheduler accordingly. This monitoring may be e.g., periodic polling-based, event-driven (such as on a status change), pushed by logic on the CMe/BSe, or other approach.

Figure 8A:
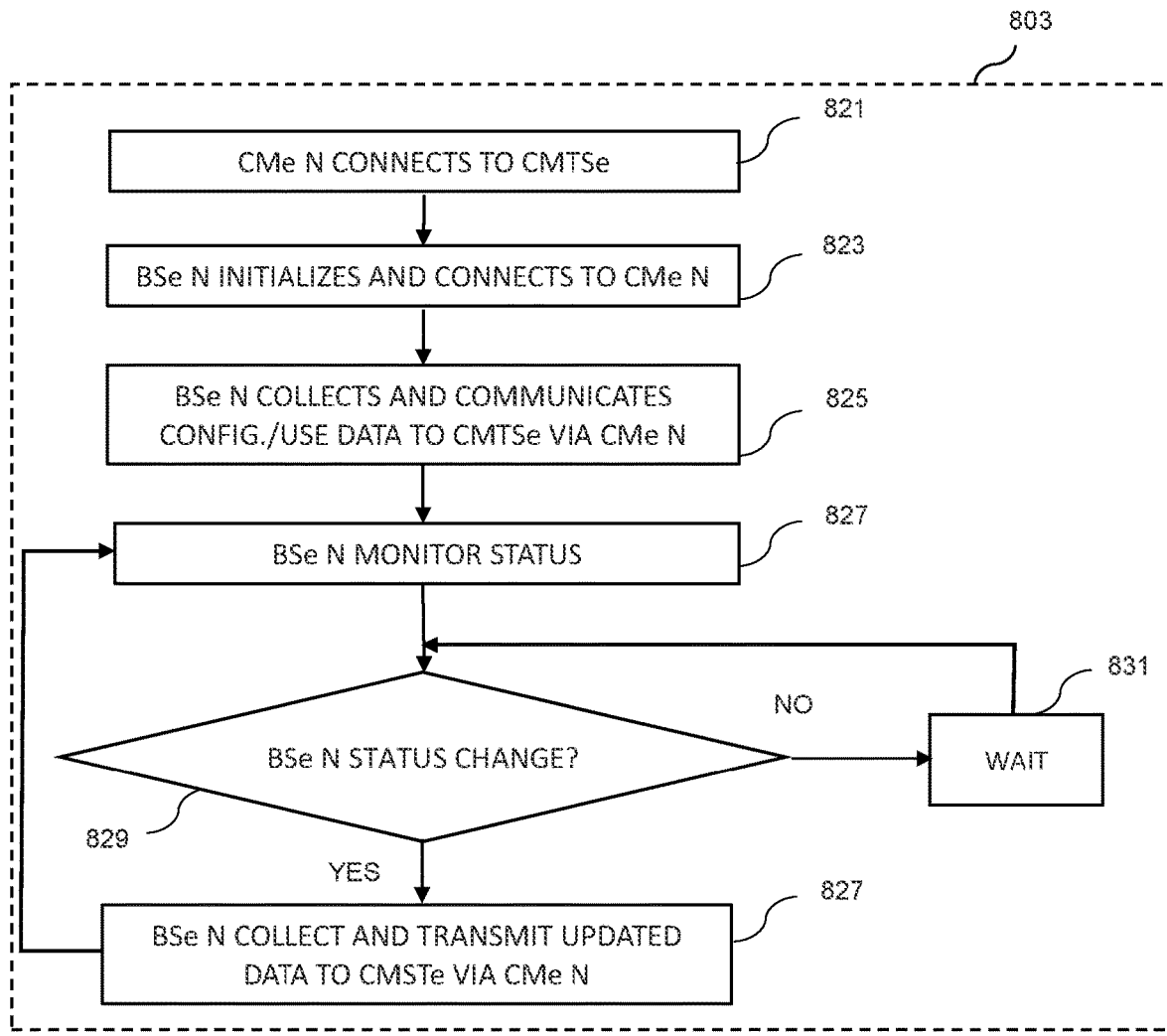
FIG. 8A is a logical flow diagram illustrating one implementation of the base station configuration data collection process of the method of FIG. 8.

FIG. 8A is a logical flow diagram illustrating one implementation of the base station configuration data collection process (step 803) of the method of FIG. 8. As shown, per step 821, a given CMe ("N") connects to the CMTSe using normal DOCSIS protocols. Per step 823, the BSe ("N") associated with CMe N initializes, and connects to CMe N (e.g., via 802.3 or other wireline MAC protocols).

Per step 825, BSe N cillects and communicates its specific configuration and use data to the CMTSe (via CMe N). As previously described, transmission may be direct or indirect.

Per step 827, BSe N monitors its own status (e.g., via one or more manager processes thereon) and where a change occurs which requires update to its previously transmitted data—such as a new UE synchronization/connection and attachment request—the BSe (N) collects the (new) data and transmits it to the CMTSe via the CMe (N). Otherwise, the BSe logic enters a wait state 831.

It will be appreciated that the data may be transmitted as a complete new data set (e.g., an update to all relevant data regardless of change), or as a "differential" or update only of the data which has in fact changed since the prior update. Again, such updates may be event-driven, according to a prescribed schedule, "pulled" by the CMTSe via polling, or pushed to the CMTSe by the BSe based on a schedule.

Figure 8B:
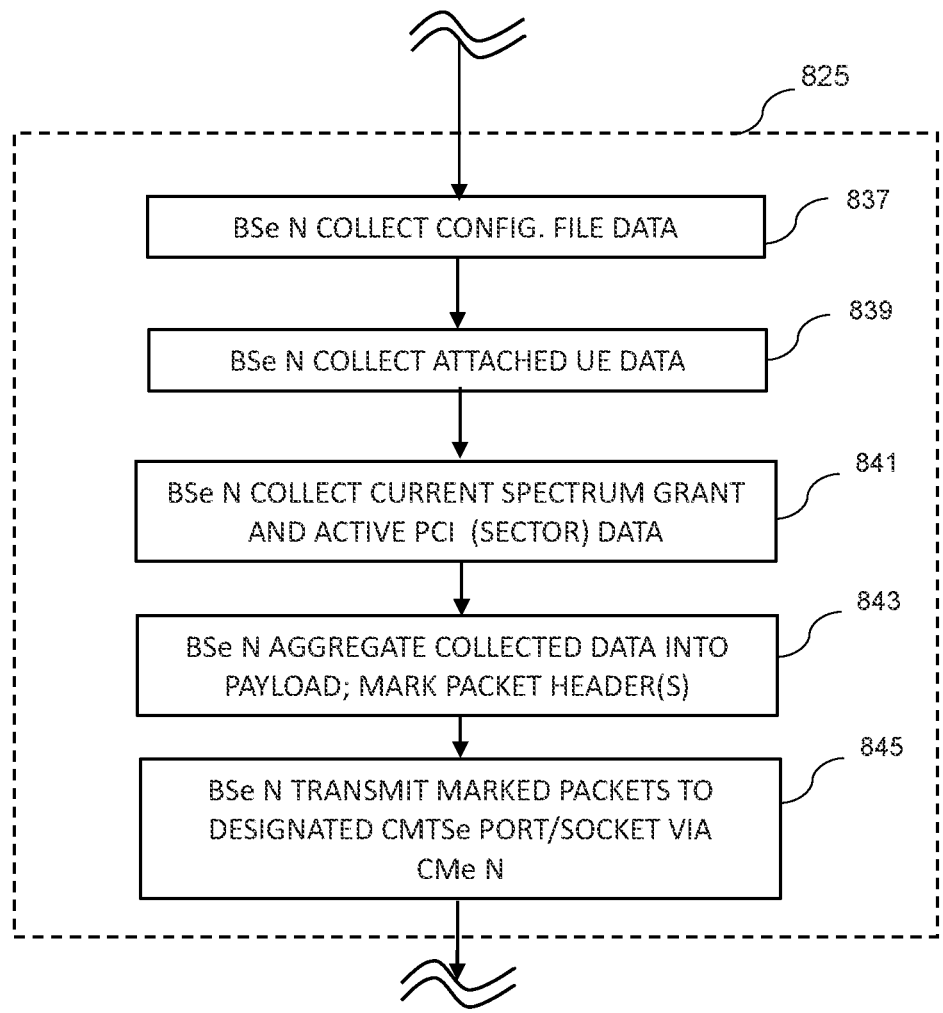
FIG. 8B is a logical flow diagram illustrating one variant of the process of FIG. 8A.

FIG. 8B is a logical flow diagram illustrating one variant of the process of FIG. 8A (step 825 for collecting data). Specifically, as shown, the BSe N first collects configuration file data, such as that with "nameplate" data such as model number, serial number, MAC address, as well as installation date, installation location, number of antenna sectors, steering/azimuth data, and/or other salient data of utility to the CMTSe scheduler (step 837).

Per step 839, the BSe then collects "dynamic" data, such as number of currently attached UE. This data may also be granular in terms of e.g., UE per sector/PCI, or other attributes if desired.

Per step 841, the BSe N also collects current spectrum grant and active PCI data (such as where the BSe is a CBSD that has received a PAL or GAA grant for a given PCI from a network SAE such as a SAS).

Per step 843, the BSe then aggregates the necessary portions of the collected data (which in one variant can be dynamically specified to the particular BSe N by e.g., the CMTSe via downstream signaling or packets akin to MAP frames). Notably, the CMTSe may desire or request targeted or heterogeneous data/types of data from different CMe/BSe (such as to minimize upstream reporting bandwidth consumed by the CMe in the aggregate, by obtaining only needed data), or use a "broadcast" approach where the requested data is homogeneous (and potentially over-inclusive, yet which is less overhead intensive on the CMTSe).

Lastly, per step 845, the BSe transmits the collected data to the CMTSe, such as via transmission of Layer 2 or 3 packets marked in their header as originating from a base station to a target port/socket of the CMTSe.

FIGS. 8C-8F are logical flow diagrams illustrating one implementation of the base station and CMe evaluation process (step 805) of FIG. 8.

Figure 8C:
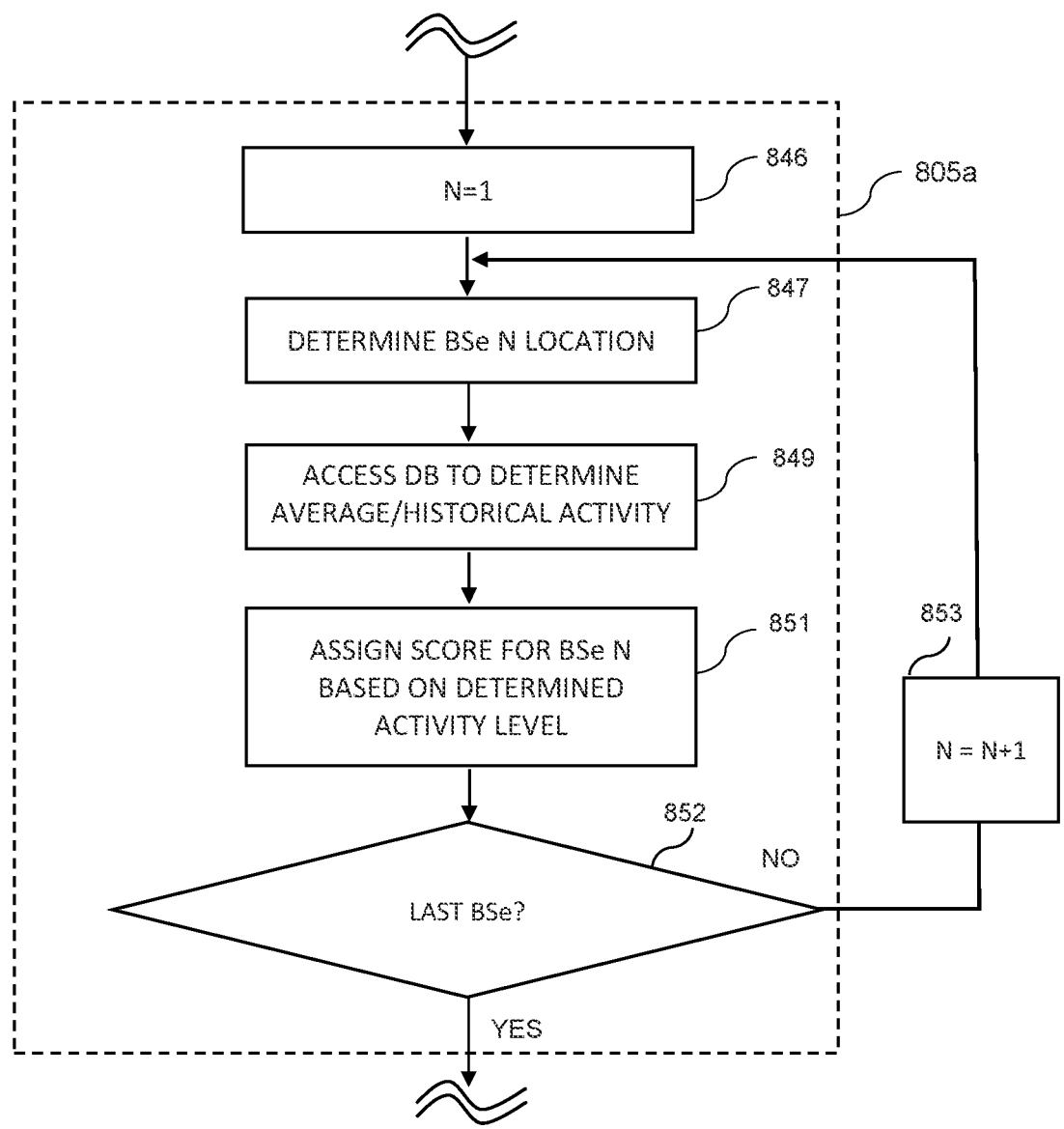
FIGS. 8C-8F are logical flow diagrams illustrating one implementation of the base station and CMe evaluation process of FIG. 8.

In FIG. 8C, the evaluation process 805 shown begins with a counter (N) set to an initialization value (e.g., 1) per step 846. Next, for Bse N, its location is determined per step 847, and a database is accessed to determine average/historical activity of that BSe where such data is available per step 849. For example, as discussed elsewhere herein, a heat map or similar data structure may be algorithmically accessed based on the determined BSe location, such as by the CMTSe receiving the location data (or by the BSe itself as in other embodiments described herein). Based on the determined activity level (which e.g., may be an average over a period of time), a score is assigned for that BSe per step 851. For instance, in one implementation, the score comprises a value from 1 to 10, or a fraction/percentage (e.g., 0.70 out of possible 1.0), with higher scores indicating higher (putative) activity levels.

Per step 852, if the last BSe in the pool under consideration by the CMTSe scheduler has not been evaluated for location/activity, then per step 853 the counter (N) is incremented and the data of the next base station evaluated. Otherwise, the method proceeds to step 805b in FIG. 8D.

Figure 8D:
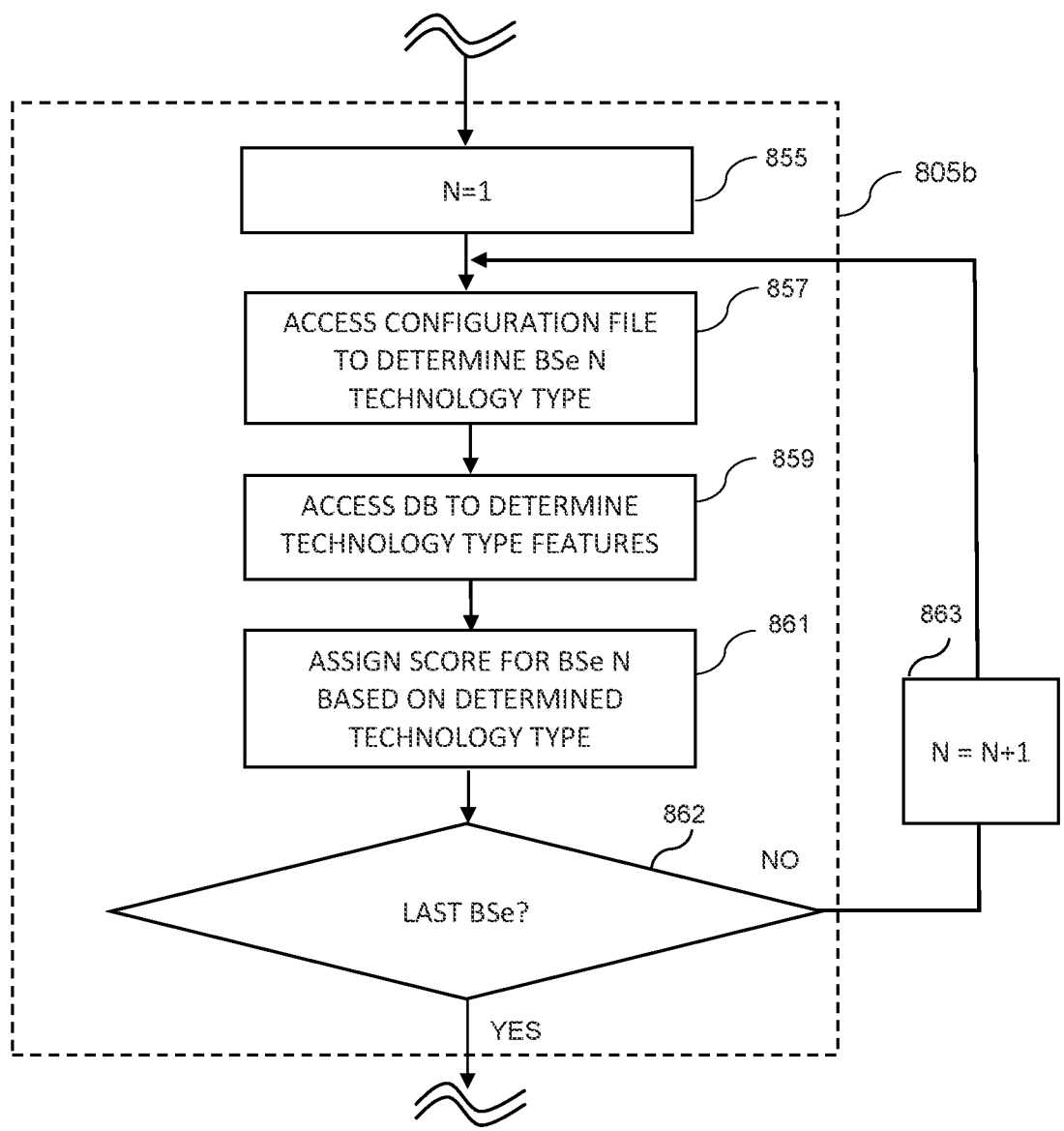

As shown in steps 855-863 of FIG. 8D, logic similar to that of FIG. 8C is applied to the BSe data, yet this time to the technology type data via access of the configuration file associated with the BSe (step 857). Based on the configuration file data, a database is accessed in step 859 to determine particular features of the e.g., generic technology type, such as for example presence of spatial multiplexing capability, maximum data rates, modulation orders/MCS schemes, and other data which may assist the scheduler in characterizing or rating the technology type. Note that this data may also simply be provided by the configuration file (e.g., as extracted by the BSe when configuring the data for transmission to the CMTSe), although this may consume more bandwidth and overhead then merely "indexing" the technology type so that the CMTSe can access aa back-end database for the detailed data.

Again, as in FIG. 8C, the technology data is used to generate a score for the BSe being evaluated, such as using the aforementioned 1-10 numerical or fractional scale, with higher values indicating high maximum data rates of the technology. For example, a BSe that is 5G NR Release 17 capable and operates with mmWave frequencies and SM may receive a score of "10", whereas a legacy 4G eNB operating at 1.8 GHz may receive a much lower score, such as "4."

Figure 8E:
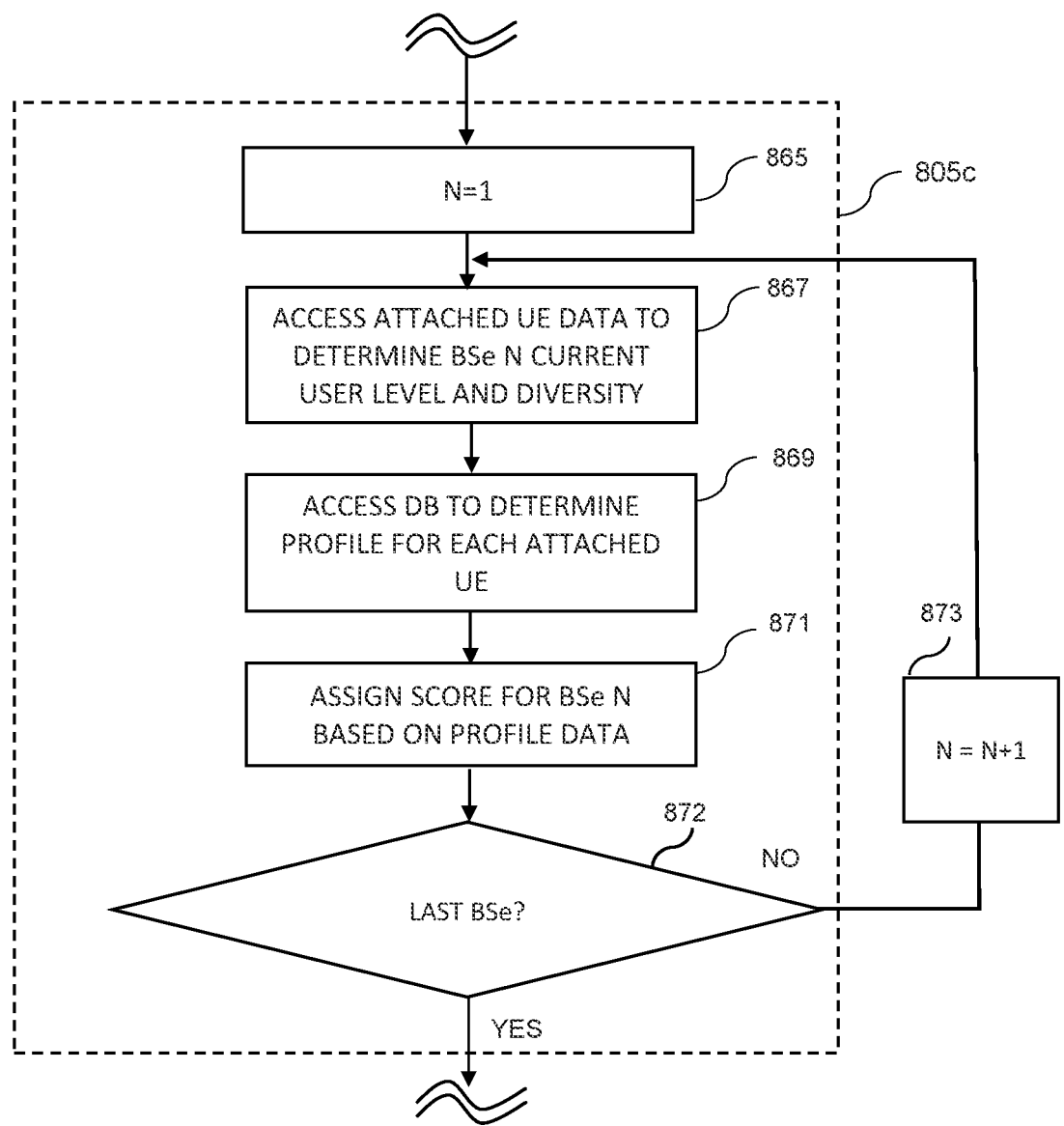

When the last BSe of the pool has been evaluated, the method proceeds to step 805c in FIG. 8E.

As shown in steps 865-873 of FIG. 8E, logic similar to that of FIGS. 8C and 8D is applied to the BSe data, yet this time to the user activity level and diversity, via access of attached UE data maintained within the BSe (step 867). For instance, in one variant, the BSe maintains a list of actively attached (e.g., RRC_Connected) UE based on a unique identifier such as an IMEI or MAC address or similar data. Based on the accessed data, a database is accessed in step 869 to determine particular features of the UE, such as for example maximum technology capability (e.g., 4G or 5G NR), spatial multiplexing capability, device type (e.g., mobile device, fixed device such as FWA, or other), available modulation orders/MCS schemes, and other data which may assist the scheduler in characterizing or rating the attached UE(s).

Again, as in FIGS. 8C and 8D, the UE number and characterizing data is used to generate a score or weight for the BSe being evaluated, such as using the aforementioned 1-10 numerical or fractional scale, with higher values indicating high loading of the BSe. Multiple UE connected and each comprising a 5G NR-capable FWA (which itself is backhaul for yet additional downstream devices) might be scored a "10" of 10, while a lesser number of 4G only mobile UE such as smartphones might be given a lesser score. As such, the score assigned per step 871 is in one embodiment a composite score, istelf which may be weighted based on attributes. For example, the number of UE attached may be the predominant feature which determines bandwidth consumption, and as such that aspect may be weighted as e.g., "0.7", while the UE technology/device type may be weighted "0.3" such that the total weight calculated per step 871 is 1.0, such as in Eqn. (1):

$$W_{UE} = [(W_1 * S_1) + (W_2 * S_2)]/(W_1 + W_2) \qquad \text{Eqn. (1)}$$

where;

$W_{UE}$=effective UE score
$W_n$=weight of factor n
$S_n$=score of factor n

It will be noted that the presence of both BSe technology data and connected UE data in the illustrated embodiment advantageously provides for enhanced accuracy in terms of modeling demand for a BSe. Specifically, while a given BSe may have a certain maximum capability (e.g., on a per-UE basis), such as 5G NR Release 17 mmWave capability with a high degree of SM, that does not mean the BSe is (or will) actually use that capability. If all UE attached to the BSe are currently 4G-enabled only, then even with several UE, the aggregate bandwidth consumed by the BSe on the backhaul will be far less than the maximum that might be determined using steps 855-861 of FIG. 8D alone, and as such using both metrics allows the CMSTe scheduler to avoid "over-allocations" of resources to such BSe. Conversely, in the case where a 5G NR-capable UE is attached to a 4G-only legacy BSe, the BSe in that instance acts as the bottleneck, and the higher-capability UE(s) cannot "force" more capacity on the BSe or its backhaul. As such, the BSe limitation will act as a limit for anything downstream.

Figure 8F:
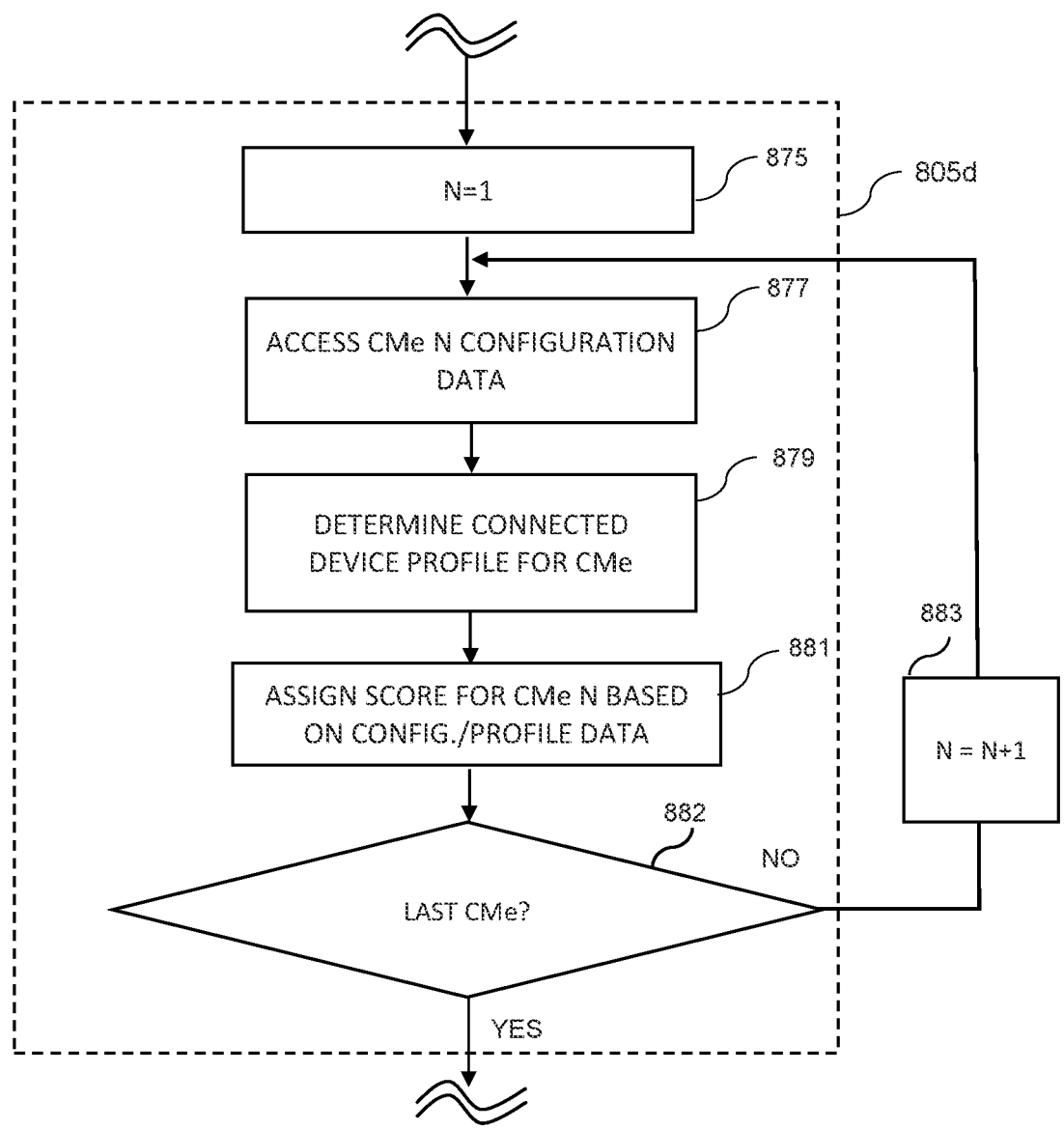

When the last BSe of the pool has been evaluated, the method proceeds to step 805d in FIG. 8F. As shown in steps 875-883 of FIG. 8F, logic similar to that of FIGS. 8C-8E is applied, yet this time to other ancillary equipment which may be connected to and backhauled by the same CMe as the BSe. In the typical CMe configuration, a number of backed or DS ports (such as RJ-45 jacks supporting 802.3-based GbE or similar communication between devices) are used to enable the CMe to provide backaul and switching functionality for a premises. For instance, a CMe (see FIG. 15) may support the BSe, as well as a user's PC, a WLAN router, an IoT gateway, or other such devices, all of which are backhauled by the MSO HFC network. As such, underestimation of CMe bandwidth requirements may result if only the BSe is evaluated as previously described. Hence, in FIG. 8F, the CMe logic and configuration data is accessed (whether indigenously by its own resident software/firmware processes, or by polling or other request mechanism of the CMTSe) in order to determine (i) the configuration of the CMe itself (e.g., whether DOCSIS 3.0 or 3.1 compatible), and (ii) the configuration and/or identity of devices connected to the CMe as their backhaul (step 877). It will be recognized that as of the date of this writing, both DOCSIS 3.0 and 3.1 enabled CMs are prevalent within a typical MSO network; however, as time goes on and upgrades proceed, DOCSIS 3.0 devices will slowly be retired in favor of 3.1 devices (and even 4.0 and DOCSIS ES devices). In that each of the exemplary 3.0 and 3.1 technologies utilize different PHY and other features (including service flow and QoS features) as well as channel bonding capabilities, their respective scheduling by the scheduler is on one embodiment treated heterogeneously based on this differentiation (as well as the other data relating to the connected devices and base stations served by each given strand).

Based on the accessed data, a connected device "profile" is constructed (such as via database access by the CMTSe) in step 879 to determine particular characterization of the other loads on the given CMe. For example, a WLAN MAC address reported to the CMTSe by the CMe may be used by the CMTSe logic to assign a score or weight for ancillary or other connected devices, and weight this result akin to the processes described above for the BSe. In another approach, an "iPerf" or similar software-based data throughput tool can be used for such purposes.

Again, as in FIGS. 8C-8E, the profile/characterizing data is used to generate a score or weight for the CMe being evaluated, such as using the aforementioned 1-10 numerical or fractional scale, with higher values indicating high loading of the CMe by one or more ancillary data consumers. A WLAN AP (which itself is backhaul for yet additional downstream devices) might prompt a scored a "10" of 10, while a lesser device such as a PC might be given a lesser score. As in prior embodiments, the score assigned per step 881 is in one embodiment a composite score, itself which may be weighted based on attributes. For example, the presence of one or more WLAN APs may be a determinative factor which determines bandwidth consumption, and as such that aspect may be weighted as e.g., "0.7", while the presence of other devices such as PCs, home security devices, IoT gateways, etc. may be weighted in progressively lower values. An IoT gateway, even when servicing multiple IoT "clients" such as via a BLE or PAN interface, has comparatively very low bandwidth consumption as compared to a PC, which generally will have less consumption than a WLAN AP.

Figure 8G:
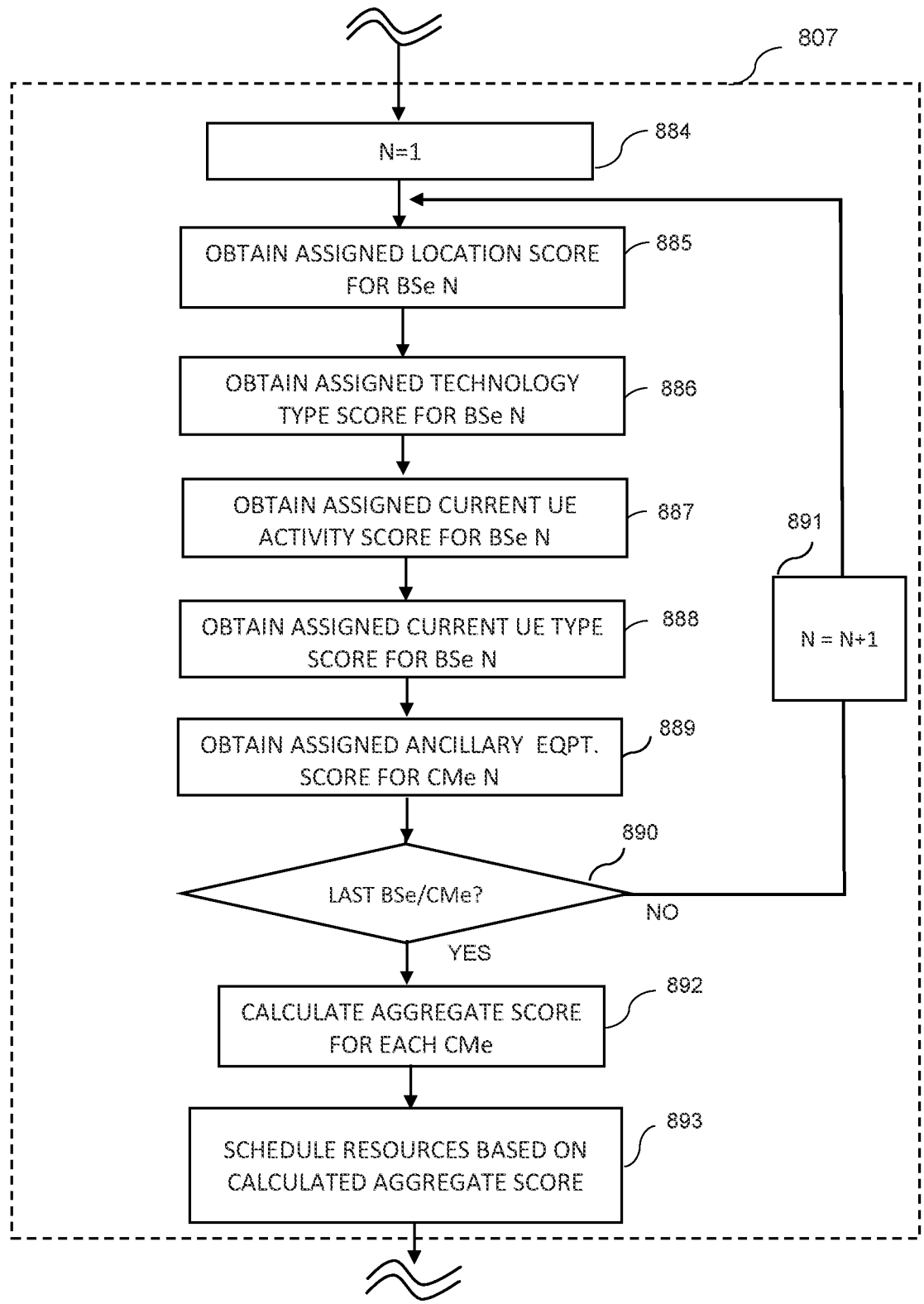
FIG. 8G is a logical flow diagram illustrating one implementation of the CMe schedule determination process of FIG. 8.

FIG. 8G is a logical flow diagram illustrating one implementation of the CMe schedule determination process (step 807) of FIG. 8. As shown, the method 807 includes first initializing a counter (e.g., "N") per step 884. Next, per step 885, the assigned location score for BSe N (from FIG. 8C above) is obtained, such as from a memory location of the CMTSe (or relevant BSe). Similarly, in steps 886, 887, and 888, the respective technology type score, UE activity score, UE type score are obtained for BSe N, and the ancillary connected equipment score obtained for CMe N (i.e., the CMe backhauling BSe N). The method 807 proceeds through all N BSe/CMe per steps 890 and 891 until such score data has been obtained for all devices in the pool being scheduled by the CMTSe.

Per step 892, the CMTSe then utilizes the collected data to calculate an aggregate score for each CMe. It is noted that since the CMTSe is establishing service flows and scheduling resources for each CMe in the pool (as opposed to the BSe or other equipment behind the CMe), this calculation is performed on a per-CMe basis in the illustrated embodiment for simplicity.

In one embodiment, a weighted score is calculated for each CMe, such as in Eqn. (2):

$$W_{CME} = [(W_1 * S_1) + (W_2 * S_2) + (W_3 * S_3) + (W_4 * S_4) + (W_5 * S_5) + (W_6 * S_6)]/(W_1 \pm W_2 \pm W_3 \pm W_4 \pm W_5 \pm W_6)$$ Eqn. (2)

where;

$W_{CME}$=effective CMe score $W_n$=weight of factor n $S_n$=score of factor n

In one variant, the weights (Wn) in Eqn. (2) above are generated a priori based on modeling performed by the network operator (e.g., MSO) based on historical data. For instance, data can be gathered by the MSO during operation on service flow allocations performed by the CMTS/CMTSe for known base station installations and other types of CMe configurations (e.g., with attached WLAN, PC, etc. as described above), and weights assigned based on e.g., statistical averages or other such quantities. Alternatively (or concurrently), a deep learning (DL) or machine-learning based approach can be employed, such as where data on CMTSe allocations for various types of premises installations is fed to a DLA (deep learning accelerator) function, including one operated by a third party cloud service provider. The DL approach allows for adaptive weight modification over time; as the DL algorithms are fed new data during operation, the weights Wn can be changed to reflect the then-prevailing best model of the pool of modeled network consumers (CMe).

Such weights may vary significantly as a function of time or other factors, such as time of day, day of week/year, occurrence of events (e.g., pandemics which force workers to work at home and hence ostensibly consume more bandwidth of certain types, or natural disasters, etc.), network component failure or maintenance, etc. As such, the CMTSe in one embodiment uses a series of operational profiles which may be changed dynamically for allocation based on such factors (e.g., a "weekday" profile, "holiday" profile). It will be appreciated, however, so as to avoid the system "hunting" and to enable greater stability, changes in the resource allocations based on changes in score may be throttled or limited to a certain minimum interval (e.g., once per minute, hourly, daily, etc.).

Lastly, per step 893, the determined scores are used to schedule resources for the various CMe in the pool. In one embodiment, the CMTSe scheduler uses the expression shown in Eqn. (3) below in order to determine scheduling (e.g., an order of priority) for the various CMe/strands being managed:

CMTSe Schedule Factor(SF)=(Weight Factor for Traffic Load)*(Weight Factor for Base Station Location)*(Weight Factor for Base Station Technology Type)*(Weight Factor for User Devices Served by Base Station)*(Weight Factor for User Devices Served by CMe)*(Number of Assigned Time Slots)  Eqn. (3)

Each of the weight factors for each different assessed parameter in Eqn. (3) above may be dimensionless factors ranging from 1-10, while the number of time slots may also be a dimensionless value (N), thereby generating an overall dimensionless Scheduler Factor (SF) for each CMe/strand (or for each BSe where only that assessment is desired). In one model, each CMe/BSe being scheduled is assigned a same number of time slots, but with prioritization of service based on its generated score (e.g., a CMe serving base station with mmWave 5G capability and multiple UE attached will be prioritized over another less resource-intensive CMe/BSe strand due to its higher CMTSe Scheduler Factor from Eqn. (3) above). In this case, the number of time slots may be determined by the extant DOCSIS scheduler, with the disclosed scheduler logic herein "overlaid" in order to prioritize resource utilization for each particular CMe relative to the others based on the Scheduler Factor. Stated differently, resource allocation, and prioritization of use of those allocated resources, may in one embodiment be determined by two different processes (e.g., the existing DOCSIS scheduler and inventive scheduler disclosed herein, respectively). As a simple example, resources may be allocated to three different CMe equally, yet with a first CMe having head-of-the-line privileges for utilizing its allocated resources, and a second CMe always second-in-line privileges.

For instance, in one variant, data packets associated with streams of higher prioritized CMe/BSe may be queued and transmitted before those of other lower-ranked CMe/BSe. Such prioritization may also be applied in a more "fair" manner in cases of contention, however, so as to avoid e.g., one highly prioritized CMe/BSe starving others of resources or monopolizing bandwidth. For example, allocated resources may only be consumed up to a given limit or threshold, after which other lower priority users will be serviced in order of descending priority for their allocated resources.

In other embodiments, the resources allocated to each CMe/BSe are different, proportionate (or at least related) to their score In one such embodiment, the CMTSe scheduler merely allocates resources relative to the score for each CMe, using a lowest (scored) CMe as a baseline as shown in the simplified example of Table 1 (a pool of 5 CMe only):

TABLE 1

| CMe | Score | Resource Allocation |
| --- | --- | --- |
| 1 | 10 | 10X |
| 2 | 6 | 6X |
| 3 | 7 | 7X |
| 4 | 1 | X |
| 5 | 8 | 8X |

For instance, the smallest allocable increment of resources may be used to baseline what other CMe are allocated relative thereto. Alternatively, if the total resource allocation is known (e.g., a known value of Mbps based on actual or estimated total CMTSe throughput), then the resources may be allocated as percentages of the available total at any given time, as shown in Table 2:

TABLE 2

| CMe | Score | Resource Allocation |
| --- | --- | --- |
| 1 | 10 | 31.25% |
| 2 | 6 | 18.75% |
| 3 | 7 | 21.88% |
| 4 | 1 | 3.13% |
| 5 | 8 | 25.00% |

In terms of actual resources allocated by the CMTSe scheduler, a variety of different approaches may also be used. In some embodiments, the scheduler creates a schedule or allocation of available resources which functions as an overlay (i.e., at a higher layer of abstraction) than extant CMTS DOCSIS scheduler routines as previously described. Stated differently, the particular mechanics of allocating resources (whether time slots in the TDM uplink of a TDMA DOCSIS 3.0 interface, or OFDM time-frequency resources for the downlink of a DOCSIS 3.1 system, and the various service flow management techniques described previously herein such as RTPS) are left to the existing DOCSIS protocols for the particular installation; however, they are guided or governed by inputs from the CMTSe scheduler process. For instance, in one variant, a time slot schedule is developed by the scheduler which allocates resources according to an allocation schedule, with the number of slots assigned to each CMe (e.g., in the DS) is "proportional" to its score, such as using the schemes of Table 1 or 2 above. Likewise, time-frequency resource blocks (RBs) may be used as the basis of the scheduler in OFDM-based embodiments such as the DL or UL in DOCSIS 3.1 systems described above. For instance, DOCSIS 3.1 uses an OFDM data transmission scheme, and each OFDM subcarrier/channel is between 20 KHz and 50 KHz. Hence, one time-frequency resource may be comprised of an OFDM subcarrier may be e.g., 20 KHz in the frequency domain, and 0.05 msec. in the time domain. By combining multiple such OFDM subcarriers, a CMTSe node can send a high amount of data in downstream. Accordingly, in one model, a first number (n) of OFDM subcarriers are assigned to individual CMe, and additional 20 KHz carriers can be combined consistent with the 0.05 msec. time duration of those subcarriers already assigned. Moreover, each OFDM subcarrier can carry a different amount of data symbols depending on the modulation scheme used (64 QAM, 128 QAM, 256 QAM, 512 QAM, 1024 QAM, 2048 QAM, 4096 QAM), which may vary. Hence, "prioritization" by the inventive scheduler in a DOCSIS 3.1 context may include prioritizing the highest scoring CMe(s) with subcarrier allocations (and any channel bonding available) first, followed by allocations to lower scoring CMe as available.

Myriad other approaches to resource allocation may be used consistent with the present disclosure, the foregoing being only a few examples.

FIG. 9 is a logical flow diagram illustrating another embodiment of a generalized method for wireline bandwidth allocation and scheduling, wherein individual CMe perform collection, aggregation and evaluation of data.

As shown in FIG. 9, the method 900 includes first negotiating US/DS channels and service flows between the CMTSe and various CMe per step 901, such as according to existing DOCSIS protocols previously described.

Per step 903, each BSe within the monitored pool reports its configuration and use data to its corresponding CMe, such as via an interposed Layer 2/3 communication protocol (e.g., MAC to MAC via 802.3 protocols).

Per step 905, each CMe evaluates the configuration and use data from its respective BSe, including generation of scoring data based thereon.

Per step 907, the CMe then also identifies other attached equipment (e.g., PC or WLAN APs) that is using the CMe as a backhaul. This detection may be accomplished based on similar 802.3 protocols and MAC communication between the devices, or other approaches such as port activity. Similar to the scoring for the BSe data, the CMe may also score the various attached non-BSe devices using e.g., a weighted algorithm scheme similar to that described above.

Per step 909, the CMe logic then utilizes the processed BSe and attached equipment data (e.g., scores) to generate a composite or aggregate score for the CMe. This score reflects the total estimated (and to some degree actual) bandwidth consumption associated with the CMe during then-current operation.

Per step 913, the aggregate score data is then sent to the CMTSe scheduler process, wherein the CMTSe uses this data (and corresponding data from other CMe within the scheduled pool of devices) to generate and implement scheduling of the type described above (step 915).

It will be recognized that while the methodology of FIG. 9 requires increased processing logic on each CMe (i.e., to acquire the relevant data, and generate scores), it also may significantly reduce signaling/overhead between the CMe devices and the CMTSe that otherwise would be necessary using e.g., the approach of FIGS. 8-8G. In effect, each CMe acts a distributed evaluator for its own connected BSe and other equipment. In one variant, each CMe in the pool is configured with effectively identical or standardized scoring algorithms and logic including weights, such that any output (e.g., scores) can be utilized by the CMTSe scheduler process on an "apples to apples" basis. However, the present disclosure also contemplates that application-specific scoring/weighting algorithms may also be utilized, including those configured for specific types of connected BSe or other equipment being backhauled by each CMe.

Additionally, depending on the technology of the backhaul interface used (e.g., DOCSIS 3.0 vs. 3.1), different scoring weights and constructs may be applied which are more specifically adapted to the underlying protocol. For instance, the TDMA-based UL request/grant mechanism of DOCSIS 3.0 may require different algorithms for weight determination, scoring and scheduling than the OFDMA-based UL of DOCSIS 3.1 systems.

Network Architectures—

Figure 10:
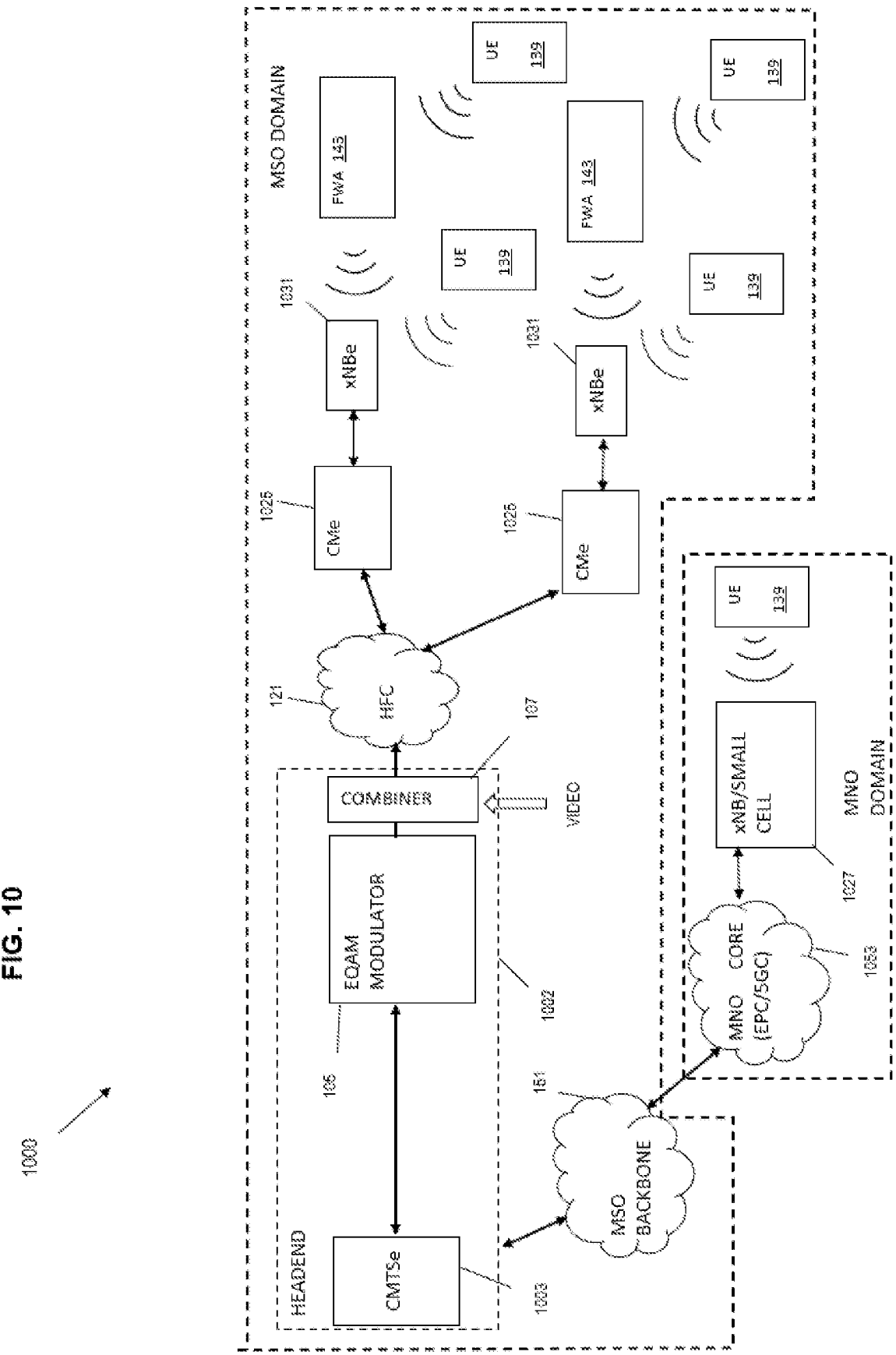
FIG. 10 is a block diagram illustrating one exemplary embodiment of network configuration with enhanced backhaul scheduling functionality according to the present disclosure.

FIG. 10 is a block diagram illustrating one exemplary embodiment of network configuration with enhanced backhaul scheduling functionality according to the present disclosure.

As a brief aside, the so-called modular headend architecture (MHA; see e.g. CableLabs Technical Report CM-TR-MHA-V02-081209, which is incorporated herein by reference in its entirety) essentially separates the downstream PHY layer out of the CMTS, and move it to a separate EQAM device. In this architecture, the CMTS transmits data to the EQAM via the Downstream External PHY Interface (DEPI). This architecture was introduced in order to reuse EQAM to modulate both the data bits as MPEG video bits. The upstream receiver is kept in the CMTS in the MHA.

In contrast, another architecture used in implementing headend platforms is the Converged Cable Access Platform (CCAP). In order to increase efficiency, the CCAP integrates the EQAM and CMTS into one platform. In addition, in the CCAP, all the downstream traffic, including DOCSIS and video QAMs are transmitted in a single port. The CCAP unifies the CMTS, switching, routing, and QAM modulator in one unit, so that all data and video are converted in IP packets before conversion to RF signals.

The Remote PHY technology, also known as Modular Headend Architecture Version 2 (MHAV2), removes the PHY from the CMTS/CCAP platform and places it in a separate access point that is interconnected with an IP network. One common location to place the remote PHY is the optical node that is located at the junction of the fiber and coax cable networks.

In the MHAV2 architecture, the CCAP includes two separate components, CCAP core and the Remote PHY Device (RPD). The CCAP core contains a CMTS core for DOCSIS, and an EQAM core for video. The CMTS core contains the DOCSIS MAC, upper layer DOCSIS protocols, all signaling functions, downstream and upstream scheduling. The EQAM core processes all the video processing. Similarly, an RMD (generally analogous to the RPD, but containing the DOCSIS MAC, also colloquially referred to as a "Flex MAC") is also specified; see e.g., CableLabs Technical Report CM-TR-R-MACPHY-V01-150730, which is incorporated herein by reference in its entirety.

The RPD/RMD processes all the PHY related function, such as downstream QAM modulators, upstream QAM demodulators, upstream coders, downstream decoders, filtering, time and frequency synchronization, as well as the logic to connect to the CCAP core. One motivation for using such approaches as RPD/RMD is the ability to obviate analog fiber components between the headend and optical nodes, and rather utilize digital optical PHY and interfaces thereby enhancing quality at the nodes.

Hence, it will be appreciated by one of ordinary skill given the present disclosure that the exemplary network architectures described below with respect to FIGS. 10-12 may be readily adapted to any of the foregoing models or paradigms (e.g., MHA, MHAv2, etc.), and yet other configurations are possible, those of FIGS. 10-12 being merely non-limiting examples.

Referring again to FIG. 10, a functional block diagram illustrating a first exemplary configuration of an HFC network architecture apparatus according to the present disclosure is shown, with enhanced CMTS (CMTSe) and EQAMs located at a cable system headend 1002. This embodiment leverages existing architectures which utilize a headend-based CMTS and EQAM, yet with further expansion of CMTS capabilities. Specifically, as described in detail subsequently herein, the enhanced CMTSe 1003 shown includes additional logic which supports base station service flow establishment and resource scheduling (and subsequent adaptation/modification functions), as well as others described herein. It will be appreciated that the various aspects of the disclosure may be implemented such that some aspects of the CMTSe 1003 is not required; i.e., a CMTSe without base station service flow designation capability may be used, such as where a prioritized or dedicated service flow for the base station(s) served by the CMTSe (and associated CMe) is not desired or required.

As shown, the architecture 1000 of FIG. 10 includes the CMTSe 1003, as well as switch logic that interfaces the CMTSe with one (or more) EQAMs 105. Output of the EQAMs is combined with video and other signals, and the combined (optical domain) signal transmitted downstream via optical fiber to one or more nodes within the HFC topology (not shown in FIG. 10) for ultimate delivery to CMe devices 1025 for use by premises CPE (such as e.g., BSe such as 3GPP-enabled xNBe devices 1031, Wi-Fi-enabled routers, PCs, gateways, or other devices) within the served premises. UE 139 and FWA 143 may be served by the xNBe devices at each premises as shown. For instance, in one model, the xNBe 1031 is disposed on a building rooftop or facade, and mobile users can access the xNBe via e.g., CBRS spectrum, or Band 71 or Band 12-17 spectrum. In another model, the xNBe is a high power device which is used as a wireless backhaul for a number of FWA devices 143 (effectively fixed 3GPP UE that service e.g., residential premises). Many other service models are possible.

In the embodiment of FIG. 10, the MSO domain is interfaced with an external MNO domain via the MSO backbone 151, such as where an MNO-operated EPC/5GC 1053 which also services MNO cells (cellular xNBs) and small cells 1027 is the cognizant core for the MSO domain users.

Figure 11:
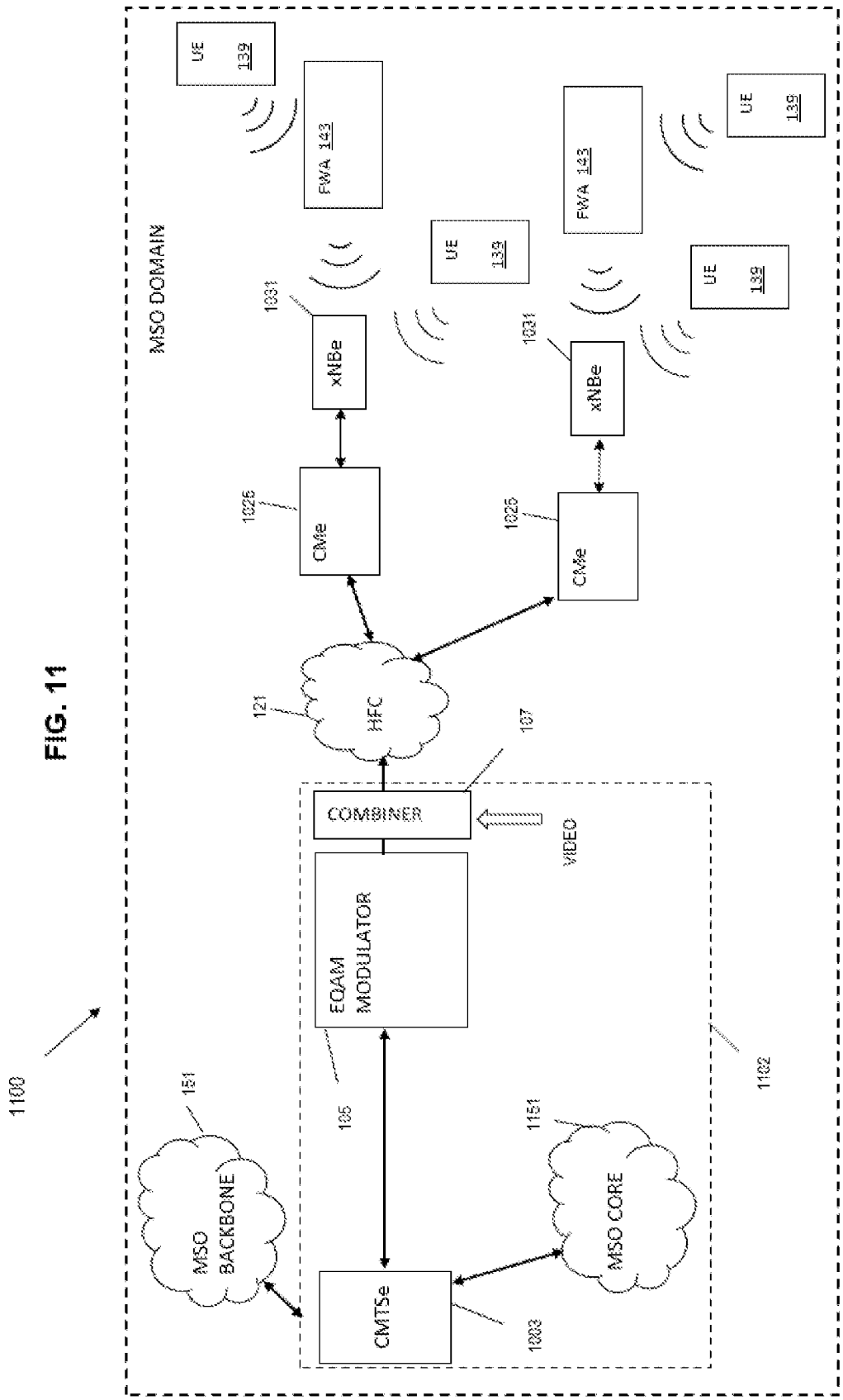
FIG. 11 is a block diagram illustrating another exemplary embodiment of network configuration with enhanced backhaul scheduling functionality according to the present disclosure.

FIG. 11 is a functional block diagram illustrating a second exemplary configuration of an HFC network architecture apparatus according to the present disclosure, with enhanced CMTS (CMTSe) 1003 co-located (at least topologically) with an MSO-based core 1151. In this model, the MSO domain contains all necessary components for e.g., UE attach procedures and packet session establishment, and any MNO based networks and their EPC/5GC infrastructure (not shown) are considered external. In that the UE's 139 are associated with MSO subscriber premises and subscriptions, and the core infrastructure is part of this "home" network, significant economies can be realized, as well as enhanced resource scheduling functionality, since the MSO maintains control of all relevant processes (including data necessary to support CPE and UE characterization, heat maps for different service areas, wireline service profiles or templates of the type previously described, etc.).

In contrast, in the embodiment of FIG. 10 previously discussed, the architecture 1000 is divided among two or more entities, such as an MNO and an MSO. As shown, the MSO service domain extends only to the xNBe and served premises and the MSO core functions, while other functions such as 3GPP EPC/E-UTRAN or 5GC and NG-RAN functionality is provided by one or more MNO networks operated by MNOs with which the MSO has a service agreement.

Figure 12:
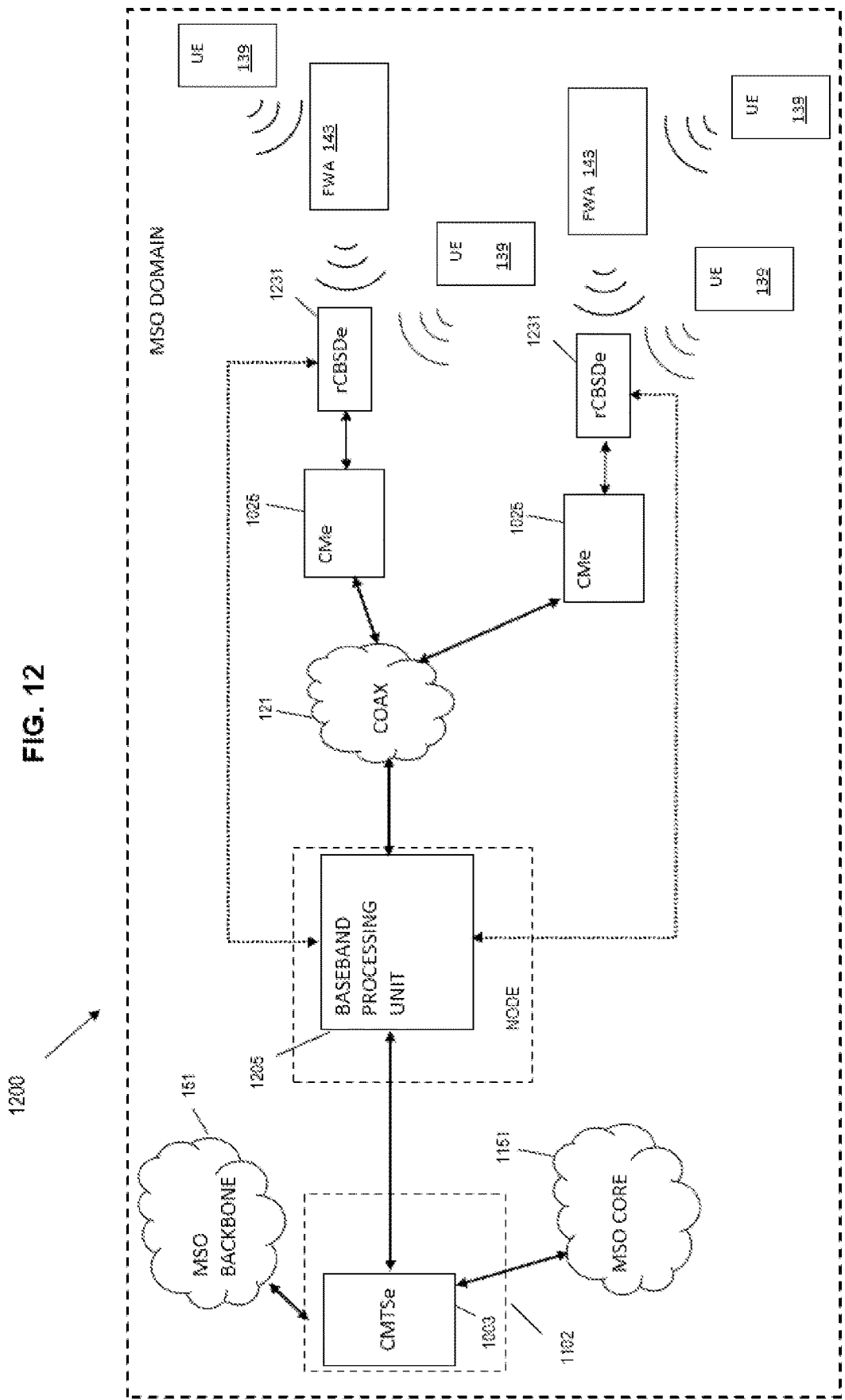
FIG. 12 is a block diagram illustrating yet another exemplary embodiment of network configuration with enhanced backhaul scheduling functionality according to the present disclosure, wherein a network-based baseband processing functionality is utilized.

FIG. 12 is a block diagram illustrating yet another exemplary embodiment of network configuration with enhanced backhaul scheduling functionality according to the present disclosure, wherein a network-based baseband processing functionality is utilized.

In this architecture 1200, the xNBe/CBSDe functionality is partitioned into an rCBSDe (reduced-profile CBSDe) 1231 and a BBU (baseband processing unit) 805 as shown. The rCBSDe devices include antennae and RF front end processing (as well as packet generation and encapsulation functions), while the BBU 1205 is configured to perform baseband processing of the packetized data for two or more rCBSDes 1231 in support of e.g., the wireless protocols used by the rCBSDe(s) 1231.

The BBU 1205 is in the illustrated embodiment disposed at a network distribution node of the HFC infrastructure, although it can be located at other points in the network as well (such as at the headend, and co-located with the CMTSe 1003).

In one implementation, the BBU 1205 operates to receive data originated by the rCBSDe devices 1231 and transmitted over the wireline PHY between the CMe and the CMTSe. For instance, in one such approach, each rCBSDe 1231 includes sufficient processing to receive wireless signals from a UE or FWA (i.e., according to 3GPP protocols) such as relating to control plane functions including synchronization and/or RRC connection and attachment by a UE, and packetize the control plane data into Layer 2/3 packets for transmission to the BBU 1205 via the wireline backhaul. For example, the rCBSDe can generate IP packets which can be designated as previously described (e.g., explicitly as base station-originated packets, or those specifically relating to BSe configuration and use), and passed to the BBU 1205 via a prioritized service flow between the CMTSe and the CMe associated with the rCBSDe, with the CMe queuing the packets in the appropriate service flow buffer(s) based on the detected type in e.g., the IP header. Likewise, in another variant, the 3GPP control plane data can be encapsulated in Ethernet or MAC frames, designated or marked, and routed according to such protocols, including to the BBU 1205.

In one variant, the BBU 1205 includes necessary modem(s) for communication on the wireline PHY (e.g., DOCSIS compatible modem capability in US and DS directions), and can be a logical endpoint for the packets generated by the rCBSDe(s) 1231. For instance, the BBU may act effectively as a pass-through for data packets between the CMTSe and the CMe, with the exception of packets addressed to the BBU as an endpoint (i.e., in the US direction), or for the rCBSDe or a UE attached thereto (in the DS direction).

CMTSe Apparatus

Figure 13:
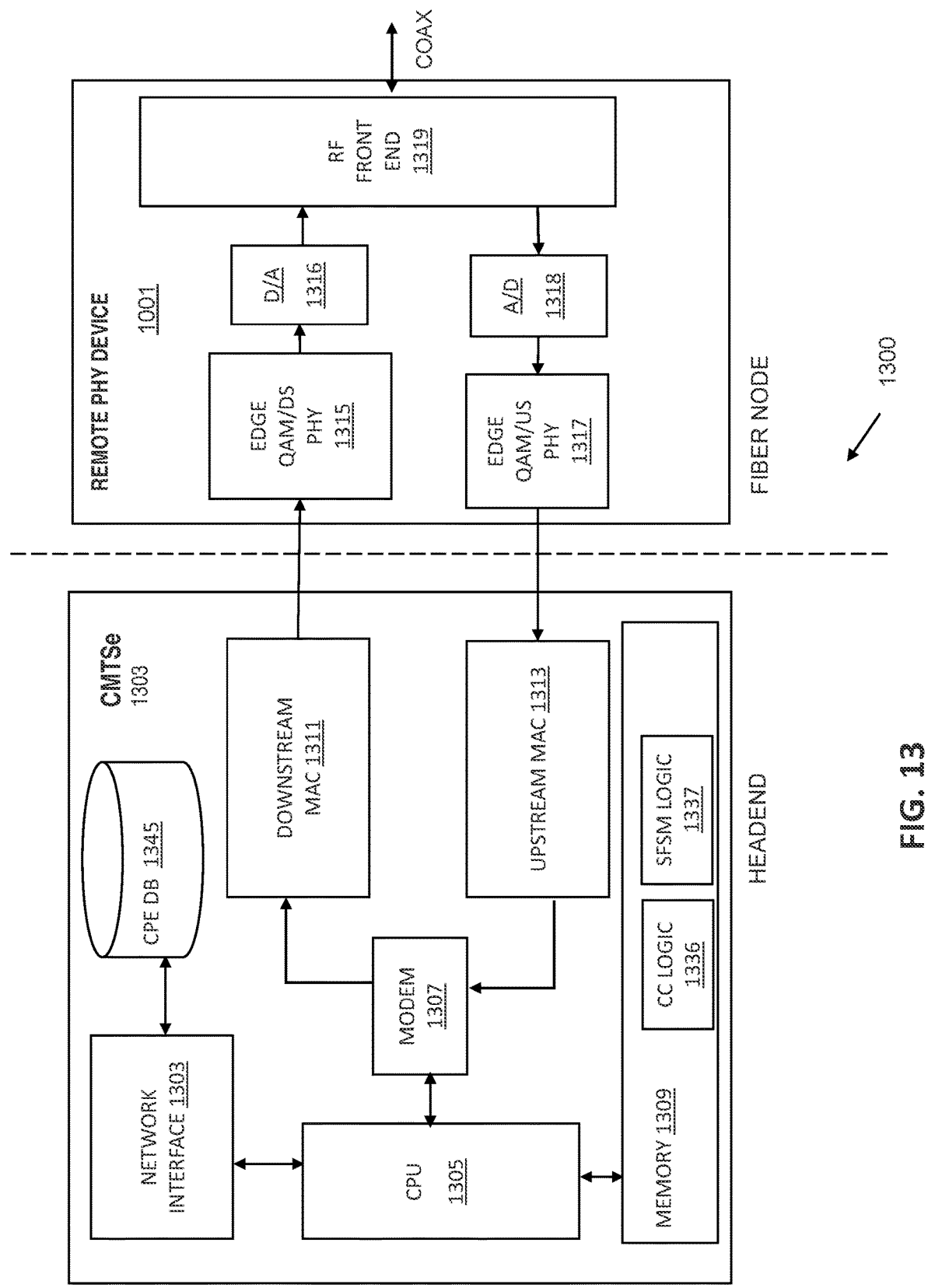
FIG. 13 is a block diagram illustrating one exemplary embodiment of network converged headend and remote PHY device (RPD) configuration with enhanced scheduling functionality according to the present disclosure.

FIG. 13 is a block diagram illustrating one exemplary embodiment of network converged headend and remote PHY device (RPD) configuration with enhanced scheduling functionality according to the present disclosure.

In the Remote PHY (R-PHY) architecture, which is a distributed access architecture, the PHY layer is moved from CMTSe (headend) to the fiber nodes within the HFC network. By decreasing the distance to client device, the R-PHY can achieve higher bandwidth and throughput than a modular or integrated CCAP architecture, and hence it can provide higher bandwidth and throughput. It will be appreciated however that non RPD/RMD based variants may be used as well consistent with the present disclosure, such as via the modular CCAP or integrated CCAP architectures. In such architectures, the PHY and MAC layers are implemented in the headend.

As illustrated, the architecture 1300 includes one CMTSe module 1303 physically located at the headend, and one or more R-PHY modules physically located at fiber nodes. The CMTSe device 1303 includes a processor 1305, modem 1307 (which may be integrated in the CPU 1305, or implemented as a separate processor or ASIC as shown), RF front end 1319, downstream MAC 1311, upstream MAC 1313, upstream PHY 1317, RF front end 1318, memory 1309, CPE characterization logic 1336, and service flow & scheduling management (SFSM) logic 1337, each integrated in memory module 1309. Additionally, the exemplary embodiment 1300 includes a network interface 1303 that interfaces CMTSe 1303 to connect to a data network (e.g., MSO backbone and/or other network as described in FIGS. 10-12).

The illustrated architecture 1300 also includes a CPE database 1345, which in one embodiment is configured to store data regarding CPE which may be "scored" or otherwise evaluated by the CMTSe logic. For example, such CPE might include: (i) CMe, (ii) BSe associated with each CMe, (ii) UE, (iv) WLAN APs, (v) PCs, and other types of premises devices. Each of these devices may be uniquely identified (e.g., by MAC address, IMEI, or other such unique identifier) and associated with a given CMe (and its served premises), which may also utilize subscriber account data access to maintain this information for use by the CMTSe logic. For example, when a new CMe is installed at a new service location, and a small cell (e.g., BSe) is installed, the installer may transmit this data to the subscriber database portal of the MSO network, such that the network maintains all identifying and installation data for that subscriber premises/account, which can then be made accessible (or synchronized with) the CMTSe CPE DB 1345.

The components of the CMTSe device 1303 shown in FIG. 13 may be individually or partially implemented in software, firmware or hardware.

In the exemplary embodiment, the processor(s) 1305, 1307 may include one or more of a digital signal processor, microprocessor, field-programmable gate array, GPU, or plurality of processing components mounted on one or more substrates. The processor may also comprise an internal cache memory, and is in communication with a memory subsystem 1309, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor(s) 1305, 1307.

The downstream MAC 1311 adds overhead (e.g., MAC address, Automatic Repeat request (ARQ)) to data, and divides the data stream into MAC frames. Likewise, an US MAC 1313 is provided for data traffic sent from e.g., the CMe(s).

The SFSM logic 1337, among other functions, identifies the transmitted packets from the xNBe 1031 (via the CMe 1025) where so implemented, reads the header fields to determine the packet type (e.g., BS associated), and allocates any required service flows to the serving CMe if such functionality is utilized. Also, depending on the type of the received packet from the CMe, the CMTSe 1003 extract data from the packets relating to xNBe configuration and use. As described previously, in one embodiment, the data identified as associated with the xNBe (such as by IP packet header inspection) can be allocated to an xNBe-specific service flow established between the CMTSe and CMe, although this is not a requirement of practicing the various other aspects of the invention.

In the RPD, the Edge QAM/Downstream PHY module 1315 receives the MAC data from the module 10811, adds redundancy (e.g., Forward Error Control Coding (FEC)) to the data, and converts the data to PHY layer data and video signals (e.g., 16-QAM, 256-QAM). The D/A device 1316 converts the digital received signal from module 1315, and converts it to analog signal to be converted to RF signals by RF front end unit 1319. The A/D module 1318 receives the analog baseband signals from RF front end unit 1319, and converts it to digital signal. The upstream PHY module 1317 converts the received base baseband signal constellation to data bits. The data bits from PHY module 1317 are divided in MAC frames by upstream MAC module 1313, and decoded by modem IM 1307.

The RF front end 1319 includes RF circuits to operate in e.g. DOCSIS 3.1 or 4.0 supported frequency spectrum (5-42 MHz upstream, 43-366 MHz VOD, SVD, broadcast channels, 367-750 MHz, 751 MHz –1.2 GHz downstream). The modem 1307 generates the upstream and downstream PHY/MACH control and data, timing, and synchronization signals. The CPU 1305 is the main processing component in the CMTSe device 1003; it generates the signal to control other components in the CMTSe 1003 and the network (including the various CMe to which it is connected), fetches and stores data from memory 1309, and generates the signals and commands for the network interface 1303.

Base Station Apparatus—

Figure 14:
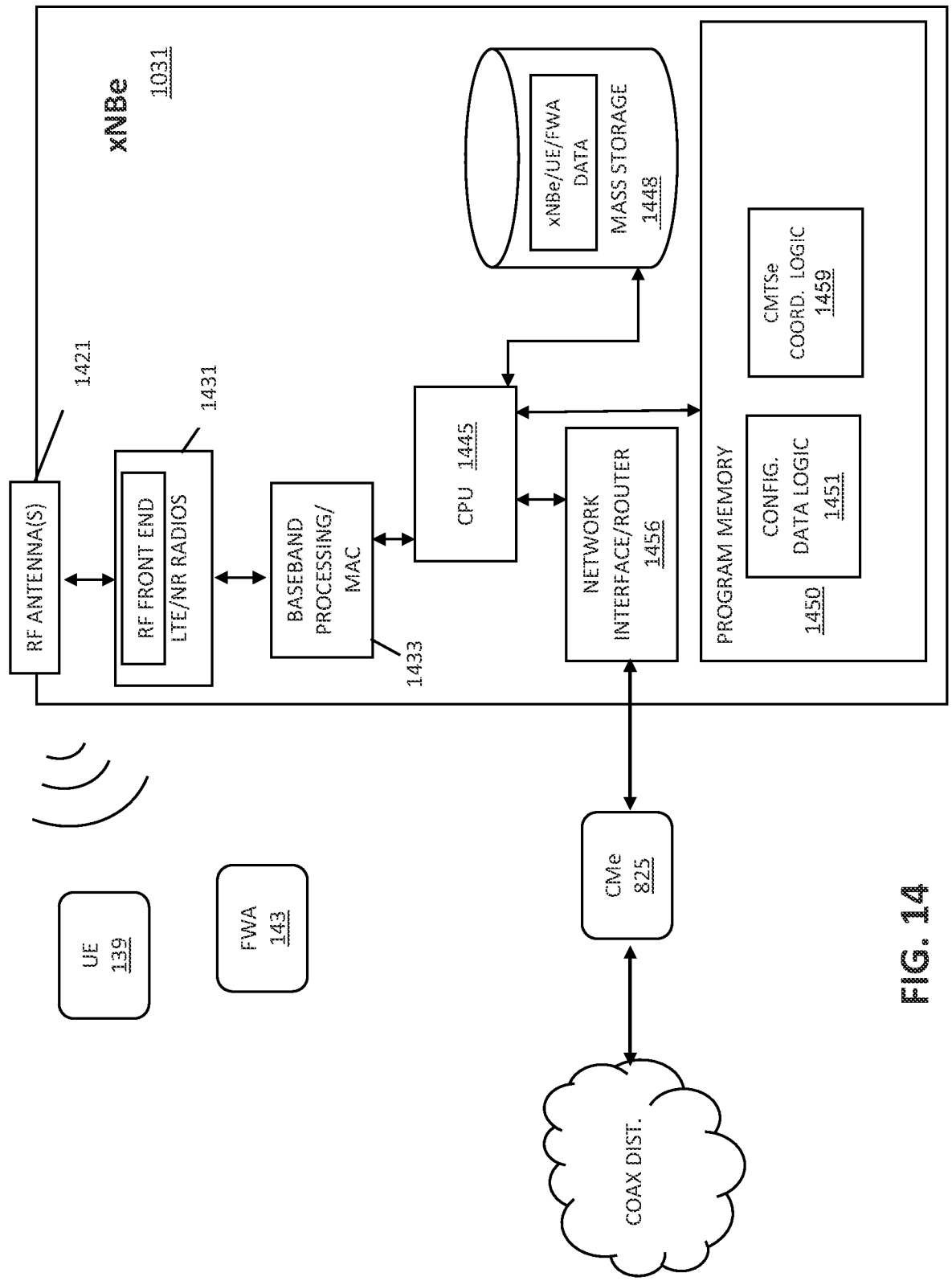
FIG. 14 is a block diagram illustrating one exemplary embodiment of base station (e.g., xNBe) apparatus configured for provision of enhanced wireline scheduling functions according to the present disclosure.

FIG. 14 is a block diagram illustrating one exemplary embodiment of enhances base station (e.g., xNBe) apparatus configured for provision of enhanced wireline scheduling functions according to the present disclosure.

As shown, the xNBe 1031 includes, inter alia, a processor apparatus or subsystem 1445, a program memory module 1450, mass storage 1448, one or more network interfaces 1456, as well as one or more radio frequency (RF) devices 1431 having, inter alia, antenna(e) 1421 and one or more 4G/5G radio(s).

At a high level, the xNBe maintains a 3GPP-compliant LTE/LTE-A/5G NR "stack" (acting as a EUTRAN eNB or 5G gNB) communications with 3GPP-compliant UEs (mobile devices 139), as well as any other protocols which may be required for use of the designated frequency bands such as e.g., CBRS GAA or PAL band, C-Band, or Band 71.

As illustrated, the xNBe device 1031 includes configuration data logic 1451, and CMTSe coordination logic 1459.

The configuration data logic 1451 includes a variety of functions including assembly of configuration and use data relating to the XNBe for transmission to the CMTSe 1003 via the CMe 1025 as previously described. xNBe identifier data may also be generated an processed by the logic 1451. In this latter process, the configuration logic 1451 adds a base station "identifier" or other designator in the IP packet header that denotes the packet type and the base station identity (either generically or specifically as desired). In some embodiments, the logic 1451 may be configured to add additional marking or identifiers to certain packets, so as to e.g., associate them with a particular function or service flow established within the CMe. Alternatively, the logic 1451 may simply address certain packets to certain sockets or ports within the CMe.

The CMTSe coordination logic 1459 performs CMTSe coordination functions, such as those described previously herein with respect to FIGS. 8-9. For example, the xNBe may be configured to receive commands from the CMTSe (via the logic 1457) and implement one or more tasks or routines which help the CMTSe evaluate the xNBe (and CMe), and/or other devices, for configuration and usage by UE. For instance, a CMTSe may poll the BSe 1031 via the coordination logic, and the BSe may reply with data in response to the request, such as via Layer 2/3 communications on the upstream. Similarly, the CMTSe may direct individual BSe to perform other tasks or testing, such as issuing broadcast or "probe" messaging (e.g., to determine the presence of nearby but unattached UE), iPerf-based data throughput tests between the CMTSe and the BSe, changes in configuration (e.g., suppression or suspension of SM, DSS, or other modes of operation which may consume additional bandwidth on the backhaul, use of certain sectors, etc.), changes in modulator order or MCS, etc.).

In the exemplary embodiment, the processor 1445 may include one or more of a digital signal processor, microprocessor, field-programmable gate array, GPU or plurality of processing components mounted on one or more substrates. The processor 1405 may also comprise an internal cache memory, and is in communication with a memory subsystem 1450, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 1421 are configured to detect and transceive signals from radio access technologies (RATs) in the service area or venue with which the xNBe 1031 is associated. For example, LTE (including, e.g., LTE, LTE-A, LTE-U, LTE-LAA) signals may be used as the basis of communication between the CBSD/xNBe 1031 and the various mobile devices (e.g., UEs 139) or FWA 143. The antenna(s) 1421 may include multiple spatially diverse individual elements in e.g., a MIMO- or MISO-type configuration, such that spatial diversity of the transceived signals can be utilized for e.g., increase in coverage area.

In the exemplary embodiment, the radio interface(s) 1431 comprise one or more LTE/5G-based radios compliant with 3GPP. Additional unlicensed, licensed, or quasi-licensed air interfaces may also be used within the XNBe, including e.g., Wi-Fi, non-CBRS band LTE or 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The RF radios 1431 in one embodiment comprises a digitally controlled RF tuner capable of reception of signals via the RF front end (receive chain) of the RF radio(s) in the aforementioned bands, including in one variant simultaneous reception (e.g., both CBRS and 2.300 to 2.500, bands, CBRS and 600 to 800 MHz bands, or Band 71 and Band 12/17 in another configuration).

Figure 14A:
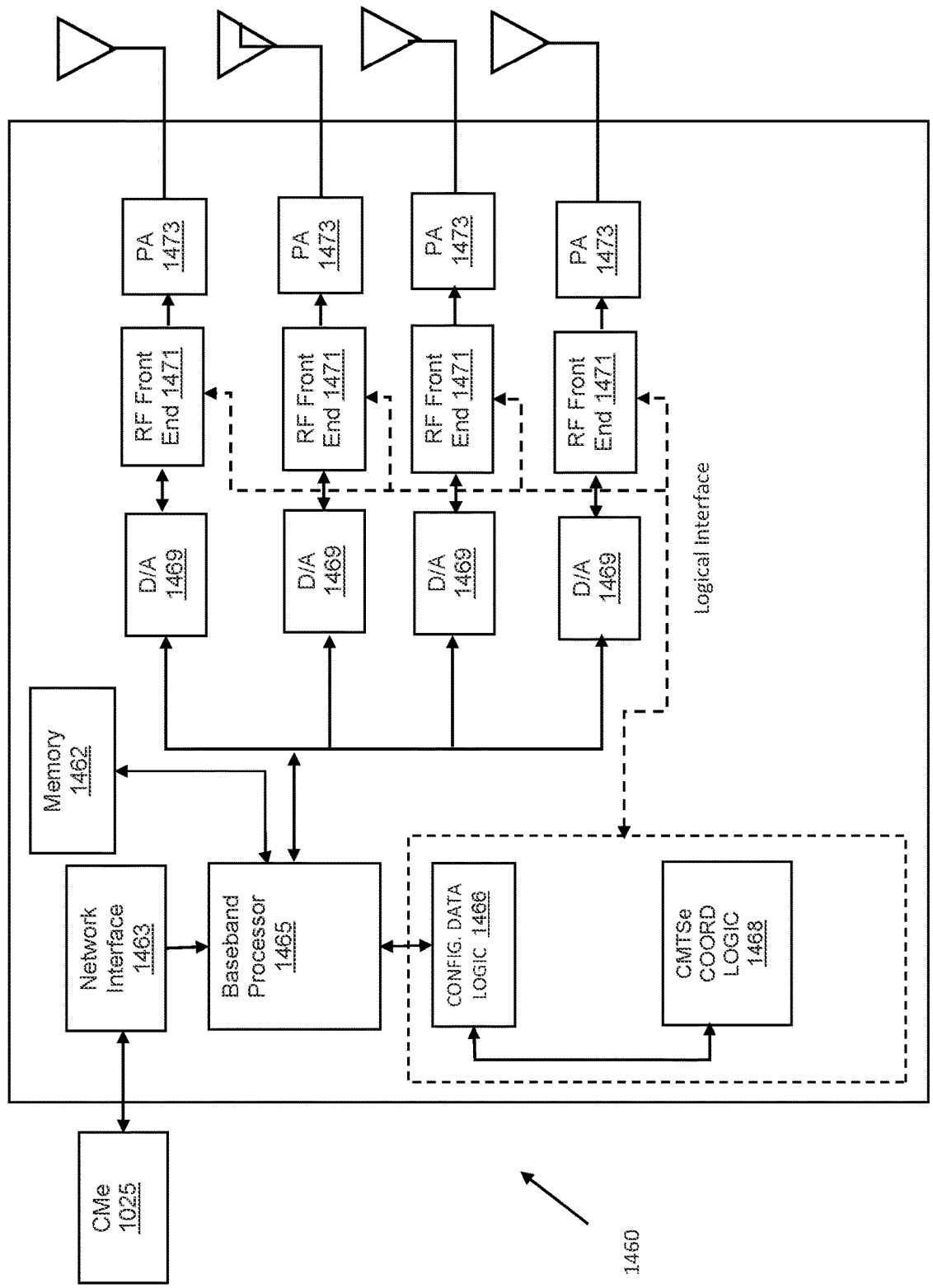
FIG. 14A is a block diagram illustrating one exemplary implementation of the base station (e.g., xNBe) of FIG. 14, illustrating different antenna and transmit/receive chains thereof.

FIG. 14A is a block diagram illustrating one exemplary implementation of the base station (e.g., xNBe) of FIG. 14, illustrating different antenna and transmit/receive chains thereof.

As illustrated, the device 1460 includes baseband processor 1465, one or more D/A 1469, one or more RF front ends 1471, one or more power amplifiers 1473, configuration data logic 1466, and CMTSe coordination logic 1468. Additionally, the exemplary embodiment includes a network interface 1463 that interfaces the xNBe to connect to a data network via e.g., a CMe 1025.

The components of xNBe 1460 shown in FIG. 14A may be individually or partially implemented in software, firmware or hardware. The RF front end 1471 includes RF circuits to operate in e.g., licensed, quasi-licensed or unlicensed spectrum (e.g., Band 71, Bands 12-17, NR-U, C-Band, CBRS bands, etc.). The digital baseband signals generated by the baseband processor 1405 are converted from digital to analog by D/As 1469. The front-end modules 1413 convert the analog baseband signals radio received from D/As 1469 to RF signals to be transmitted on the antennas. The baseband processor 1465 includes baseband signal processing and radio control functions, including in one variant physical layer and Layer 2 functions such as media access control (MAC). The Power Amplifiers (PA) 1473 receives the RF signal from RF front ends 1411, and amplify the power high enough to compensate for path loss in the propagation environment.

CMe Apparatus—

Figure 15:
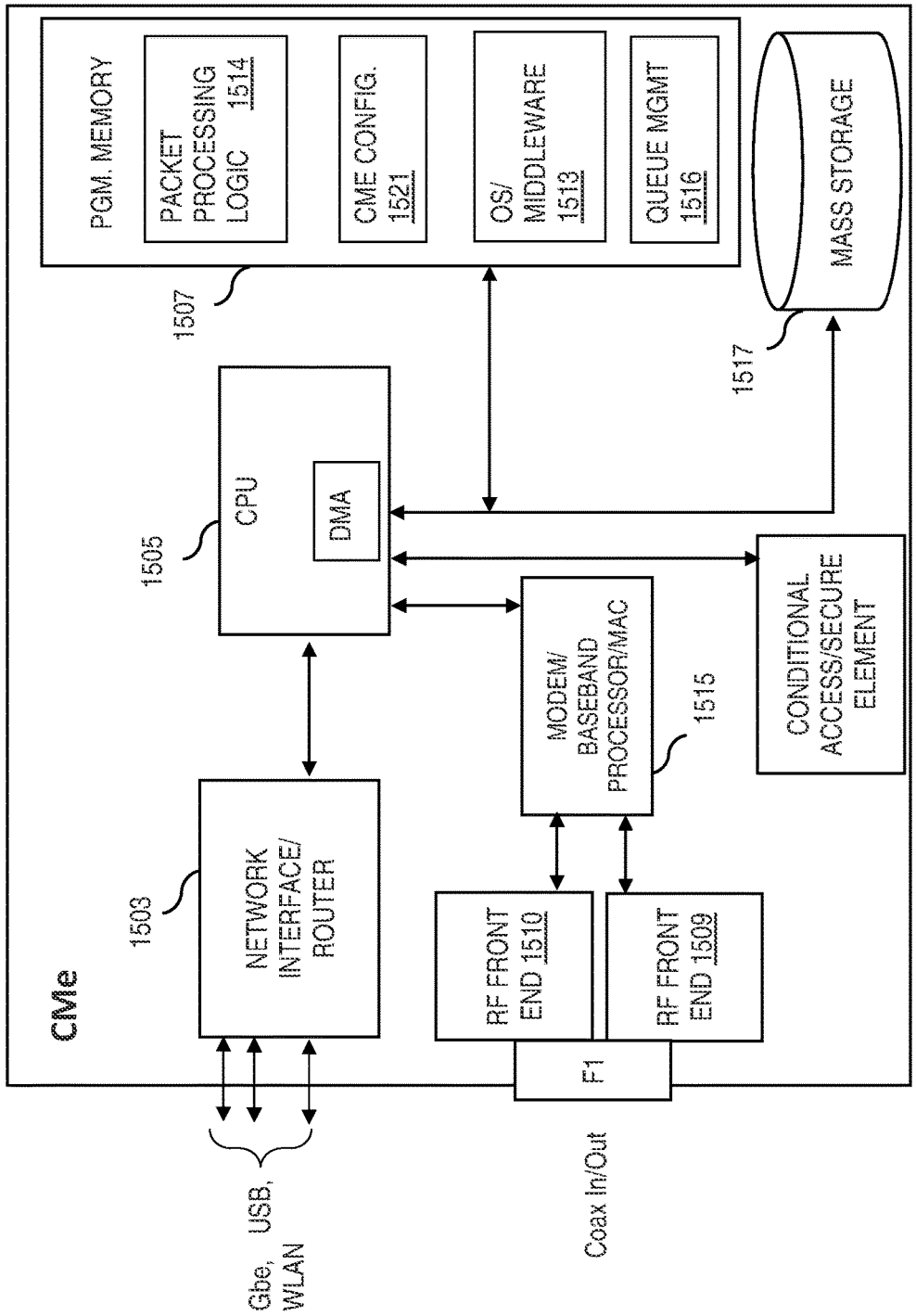
FIG. 15 is a block diagram illustrating one exemplary embodiment of a cable modem (CMe) apparatus configured for enhanced wireline scheduling functions according to the present disclosure.

FIG. 15 is a block diagram illustrating one exemplary embodiment of a cable modem (CMe) apparatus configured for enhanced wireline scheduling functions according to the present disclosure.

At high level, the CMe apparatus 1025 includes, inter alia, a processor apparatus 1505, a program memory module 1507, mass storage 1517, one or more RF front ends 1509, 1510 for processing RF signals received and transmitted over the coaxial "last mile" network, baseband processor/modem chipset 1515, as well as one or more network interfaces 1503 such as, Gigabit Ethernet or other LAN/WLAN connectivity, support of home or premises gateways, DSTBs, 3GPP small cells, etc. within the premises, etc.

The RF modules 1509, 1510 include a heterodyne-based transmitter/receiver architecture generally symmetrical to the transmitter/receiver of the enhanced CMTSe/node discussed previously; i.e., impedance matching circuitry, diplexer, synchronization circuit, tilt, etc. are used as part of the CMe RF front ends, as well as RF tuner apparatus. The RF front ends are used to convert the received signal from frequency bands (366-750 MHz and 750 MHz-1.2 GHz, or to 1.8 GHz for DOCSIS 4.0, or higher for so-called "Extended Spectrum DOCSIS" up to e.g., several GHz) to baseband, and the inverse for transmission. A common F1-type connector for interface between the coaxial network and RF front end(s) is shown, although other approaches may be used as well.

Moreover, while two separate RF front ends 1510, 1509 are shown in this embodiment, a single device covering the entirety of the desired frequency range may be used with generally equal success.

The network interface module 1503 may include for example GbE Ethernet/WLAN/USB ports, which allows interface between the CMe module and premises devices such as xNBe devices 1031, WLAN routers, DSTB devices, computers, etc., to support data interchange between the CMe and the device.

In the exemplary embodiment, the host processor (CPU) 1505 may include one or more of a digital signal processor, microprocessor, GPU, field-programmable gate array, or plurality of processing components mounted on one or more substrates. The processor 1505 may also comprise an internal cache memory, and is in communication with a memory subsystem 1507, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1505, including the OS and middleware 1513 (e.g., executing a Linux or other kernel).

The processor 1505 is configured to execute at least one computer program stored in memory 1507 (e.g., a non-transitory computer readable storage medium); in the illustrated embodiment, such programs include logic to implement the prioritized or dedicated service flow management functionality described previously herein (including packet processing logic 1514 for passing xNBe configuration data to the CMTSe, as well as coordinating with CMTSe logic for implementation and utilization of any prioritized service flows if established. Other embodiments may implement such functionality within dedicated hardware, logic, and/or specialized co-processors or ASICs (not shown).

The CMe may also further be configured with queue management (QM) logic 1516, which is used to monitor and maintain service flow queue levels (e.g., for UL data queues where the CMe is equipped to perform upstream data queue metric monitoring/analysis) such as in support of QoS or other parameter evaluations, as previously referenced herein. For instance, the queue logic may be used to gather data on rising buffer levels, indicative of reduced data rates or throughputs caused by e.g., interference with a DL or UL channel on the wireline interface.

The CMe logic may also include CMe configuration logic 1521, which is used by the CMe (and any polling or accessing process such as the CMTSe) to gather and evaluate data relating to CMe connected equipment, including that other than the BSe.

Additionally, the CMe logic may include algorithms and related logic (not shown) for performing data evaluation on the acquired or accessed data (as well as that obtained from the BSe when so configured) in order to implement the scoring and weighting algorithms previously described.

The CMe logic also includes a hierarchy of software layers and communication protocols to enable RF carrier detection, reporting and synchronization, communication with the CMTSe 1003, interaction with PHY layer and hardware, routing data from/to the HFC network, Layer 2/3 functions, etc.

Exemplary Communications Flow—

Figure 16:
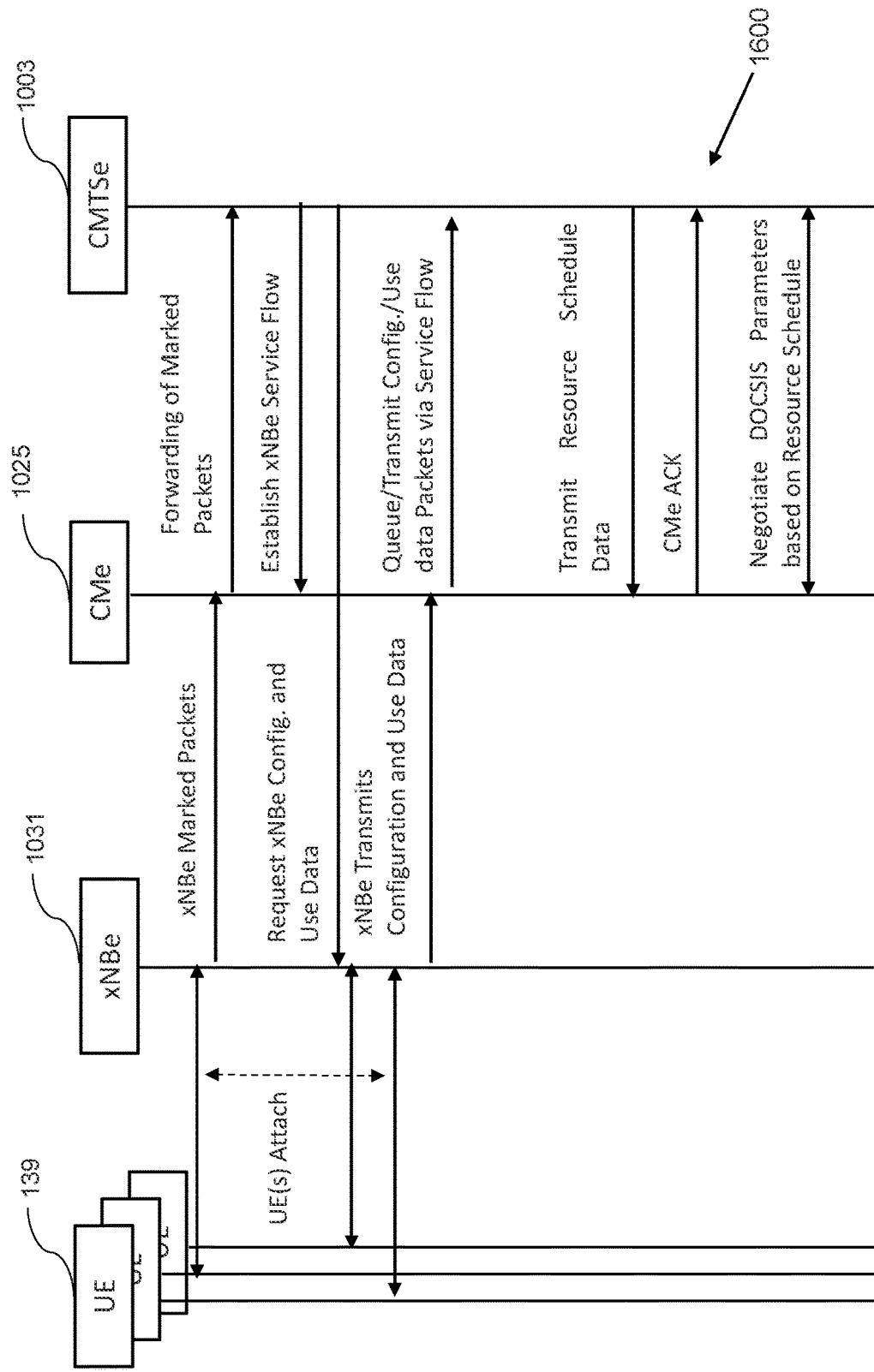
FIG. 16 is a ladder diagram illustrating communication and data flow between UE(s), xNBe, CMe, and CMTSe, according to one embodiment of the present disclosure.

FIG. 16 is a ladder diagram illustrating communication and flow between UE, xNBe, CMe, and CMTSe according to one embodiment of the present disclosure. In the illustrated ladder diagram of FIG. 16, a UE first attaches (e.g., synchronization and RACH) and authenticates to the network core via the xNBe and CMe (and CMTSe). Packets sent from the xNBe to the CMe are marked in this embodiment, which enables the CMTSe to establish one or more new service flows dedicated to the xNBe (and its clients), including for configuration and use data to be transacted between the xNBe and the CMTS (i.e., between the xNBe configuration data logic and the CMTSe scheduler logic). In one approach, the methods and apparatus for establishing prioritized UE connection described in co-owned and co-pending U.S. patent application Ser. No. 16/966,496 filed Aug. 18, 2020 and entitled "METHODS AND APPARATUS FOR WIRELESS DEVICE ATTACHMENT IN A MANAGED NETWORK ARCHITECTURE," previously incorporated herein may be used consistent with the present disclosure.

Once the CMTSe and CMe negotiate the initial DL (and UL) channels and the service flow(s) is/are established, the configuration data is requested by the CMTSe, and responsively passed from the xNBe to the CMTSe (via the CMe), which then uses the data as necessary to evaluate and implement the scheduling and resource allocations for all CMe in the pool (only one shown for simplicity), and for necessary modifications to the wireline interface. As shown, existing DOCSIS protocols are used to implement the service flows and associated QoS requirements needed to implement the higher-layer resource scheduling generated by the CMTSe scheduler.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of providing enhanced communication and resource scheduling, the computerized method comprising:
    establishing, via at least a computerized network apparatus, data communication with one or more packet receiver apparatus, the data communication to negotiate at least one of a channel configuration or service flow;
    receiving first data via the one or more packet receiver apparatus, the first data comprising a plurality of data respectively from a plurality of base station apparatus, the receiving of the first data comprising:
        (i) determining that data from a last base station apparatus of the plurality of base station apparatus has not been received; and
        (ii) based on the determining that the data from the last base station apparatus of the plurality of base station apparatus has not been received, causing incrementation of a counter (N) to receive data from a next base station apparatus of the plurality of base station apparatus;
    evaluating the first data to generate a schedule relating to an allocation of resources for at least one of (i) at least one base station apparatus of the plurality of base station apparatuses, or (ii) the one or more packet receiver apparatus;
    implementing the schedule, the implementing comprising applying the schedule to the at least one of (i) the at least one base station apparatus, or (ii) the one or more packet receiver apparatus;
    monitoring the at least one of (i) the at least one base station apparatus or (ii) the one or more packet receiver apparatus; and
    based at least on the monitoring, determining whether to modify the schedule.

2. The computerized method of claim 1, wherein the first data further comprises data relating to at least one of respective configurations of the at least one base station apparatus, or (ii) a use of the at least one base station apparatus.

3. Computerized network apparatus for use in a network, comprising:
    at least one packet data interface configured for communication with a radio frequency transceiver apparatus;
    processor apparatus in data communication with the at least one packet data interface; and
    storage apparatus in data communication with the processor apparatus, the storage apparatus comprising at least one computer program configured to, when executed by the processor apparatus, cause the computerized network apparatus to:
        receive first data packets via the at least one packet data interface, the first data packets comprising data relating to at least (i) a configuration of a wireless access node, and (ii) operation of the wireless access node;
        evaluate the first data packets to generate characterization data relating a plurality of operational and configuration aspects of the wireless access node, wherein the evaluation of the first data packets comprises an evaluation of data relating toa number of 3rd Generation Partnership Project (3GPP) user equipment (UE) operating in one of an RRC_Idle mode or an RRC_Connected mode to determine a number of client devices in active data communication with the wireless access node; and
        cause transmission of at least a portion of the characterization data to the radio frequency transceiver apparatus, the transmission of the characterization data enabling allocation by the computerized network apparatus of resources for use by (i) at least a modem apparatus associated with the wireless access node, and (ii) a plurality of other modem apparatus in data communication with the radio frequency transceiver apparatus.

4. The computerized network apparatus of claim 3, wherein:
    the computerized network apparatus comprises a DOCSIS (Data Over Cable Service Interface Specification) cable modem termination system (CMTS), the radio frequency transceiver apparatus comprises a QAM (quadrature amplitude modulation) modulator, and the modem apparatus comprises a DOCSIS cable modem (CM) which is used to backhaul the wireless access node.

5. The computerized network apparatus of claim 4, wherein the at least one computer program is further configured to, when executed by the processor apparatus, cause the computerized network apparatus to transmit data to the radio frequency transceiver apparatus causing scheduling of respective pluralities of time slots on a plurality of different RF carriers for use by respective ones of a plurality of modem apparatus including the modem apparatus associated with the wireless access node, the plurality of modem apparatus having a common operational or configuration attribute.

6. The computerized network apparatus of claim 5, wherein the common operational or configuration attribute comprises membership in at least one of (i) a common physical service group (pSG), or (ii) a common virtual service group (vSG).

7. The computerized network apparatus of claim 3, wherein the at least one computer program is further configured to, when executed by the processor apparatus, cause the computerized network apparatus to:
 determine that one or more operational criteria are met within at least a portion of an infrastructure of the network; and
 based at least on the determination, transmit data to the radio frequency transceiver apparatus causing a temporary change in the allocation of the resources to at least one of the plurality of other modem apparatus.

8. The computerized network apparatus of claim 3, wherein the evaluation of the first data packets further comprises (i) evaluation of data relating to at least a technology type used by the wireless access node to determine whether the wireless access node is capable of wireless operation compliant with at least one 3GPP (Third Generation Partnership Project) 5G NR (Fifth Generation New Radio) standard, and (ii) an evaluation of data indicative of a location of the wireless access node to determine whether the wireless access node is located within at least one of a designated hotspot or high activity area.

9. Computerized network apparatus for use in a network, comprising:
 at least one packet data interface configured for communication with a radio frequency transceiver apparatus;
 processor apparatus in data communication with the at least one packet data interface; and
 storage apparatus in data communication with the processor apparatus, the storage apparatus comprising at least one computer program configured to, when executed by the processor apparatus, cause the computerized network apparatus to:
  receive first data packets via the at least one packet data interface, the first data packets comprising data relating to at least (i) a configuration of a wireless access node, and (ii) operation of the wireless access node;
  evaluate the first data packets to generate characterization data relating a plurality of operational and configuration aspects of the wireless access node, the evaluation of the first data packets to generate the characterization data relating the plurality of operational and configuration aspects of the wireless access node comprising evaluation of at least a technology type used by the wireless access node, wherein the technology type used by the wireless access node is a factor in a determination of a strand of a backhaul portion of the network and associated with the wireless access node; and
  cause transmission of at least a portion of the characterization data to the radio frequency transceiver apparatus, the transmission of the characterization data enabling allocation by the computerized network apparatus of resources for use by (i) at least a modem apparatus associated with the wireless access node, and (ii) a plurality of other modem apparatus in data communication with the radio frequency transceiver apparatus.

10. Computerized network apparatus for use in a network, comprising:
 at least one packet data interface configured for communication with a radio frequency transceiver apparatus;
 processor apparatus in data communication with the at least one packet data interface; and
 storage apparatus in data communication with the processor apparatus, the storage apparatus comprising at least one computer program configured to, when executed by the processor apparatus, cause the computerized network apparatus to:
  receive first data packets via the at least one packet data interface, the first data packets comprising data relating to at least (i) a configuration of a wireless access node, and (ii) operation of the wireless access node;
  evaluate the first data packets to generate characterization data relating a plurality of operational and configuration aspects of the wireless access node;
  cause transmission of at least a portion of the characterization data to the radio frequency transceiver apparatus, the transmission of the characterization data enabling allocation by the computerized network apparatus of resources for use by (i) at least a modem apparatus associated with the wireless access node, and (ii) a plurality of other modem apparatus in data communication with the radio frequency transceiver apparatus, the transmission of at least the portion of the characterization data to the radio frequency transceiver apparatus comprises transmission of data representative of a schedule;
  monitor at least one of (i) the radio frequency transceiver apparatus or (ii) the wireless access node; and
  based at least on the monitoring, determine to modify the schedule, the modification configured to grant of a temporary increase in resource allocation use by (i) the modem apparatus associated with the wireless access node, and (ii) the plurality of other modem apparatus in data communication with the radio frequency transceiver apparatus.

11. The computerized network apparatus of claim 10, wherein the evaluation of the first data packets to generate the characterization data relating the plurality of operational and configuration aspects of the wireless access node comprises an evaluation of at least a technology type used by the wireless access node, the technology type used by the wireless access node is a factor in a determination of a strand of a backhaul portion of the network and associated with the wireless access node.

12. The computerized network apparatus of claim 10, wherein evaluation of the first data packets further comprises an evaluation of a location of the wireless access node to determine whether the wireless access node is located within at least one of a designated hotspot or high activity area.

13. A computerized method of providing enhanced communication and resource scheduling, the computerized method comprising:
 establishing, via at least a computerized network apparatus, data communication with one or more packet receiver apparatus, the data communication to negotiate at least one of a channel configuration or service flow;

receiving first data from at least one base station apparatus via the one or more packet receiver apparatus, the receiving of the first data comprising receiving data relating a number of 3GPP UE operating in one of an RRC_Idle mode or an RRC_Connected mode and data relating to at least one of (i) a configuration of the at least one base station apparatus, or (ii) a use of the at least one base station apparatus;

evaluating the first data to generate a schedule relating to an allocation of resources for at least one of (i) the at least one base station apparatus, or (ii) the one or more packet receiver apparatus, the evaluating of the first data comprising determining, based on the data relating to the number of 3GPP UE operating in one of the RRC_Idle mode or the RRC_Connected mode, a number of active UE in data communication with the at least one base station apparatus;

implementing the schedule, the implementing comprising applying the schedule to the at least one of (i) the at least one base station apparatus, or (ii) the one or more packet receiver apparatus;

monitoring at least one of (i) the at least one base station apparatus or (ii) the one or more packet receiver apparatus; and based at least on the monitoring, determining whether to modify the schedule.

14. The computerized method of claim 13, wherein the receiving of the first data comprises receiving data indicative of the configuration of the at least one base station apparatus in terms of one or more supported technology types.

15. The computerized method of claim 14, wherein the receiving of the data indicative of the configuration of the at least one base station apparatus in terms of the one or more supported technology types comprises receiving data indicative of at least one of (i) air interface technology and frequency of the at least one base station apparatus, or (ii) type of spectrum allocated to the at least one base station apparatus.

16. The computerized method of claim 13, wherein:
the receiving of the first data further comprises receiving data indicative of a then-current geographic location of the at least one base station apparatus which allows for differentiation as part of resource scheduling; and
the computerized method further comprises accessing at least one of (i) historical data or (ii) then-current heat-mapping data to determine expected resource usage as a function of the then-current geographic location.

17. The computerized method of claim 13, further comprising utilizing the first data to assign a weighted value to at least one aspect of the one or more packet receiver apparatus regarding expected peak bandwidth consumption by the at least one base station apparatus.

18. The computerized method of claim 13, wherein the first data comprises data added by the one or more packet receiver apparatus, to the data relating to the at least one of (i) the configuration or (ii) the use of the at least one base station apparatus, the added data comprising data indicative of at least one of: (i) one or more devices in data communication with the one or more packet receiver apparatus, or (ii) channel statistic data.

19. The computerized method of claim 13, further comprising maintaining a correlation data structure by at least associating the first data with at least one respective unique identifier of the at least one base station apparatus, the correlation data structure enabling the computerized network apparatus to determine at least one of (i) characteristics or (ii) use, of a specific base station apparatus at a given point in time.

20. Computer readable apparatus comprising a non-transitory storage medium, the non-transitory storage medium comprising at least one computer program having a plurality of instructions, the plurality of instructions configured to, when executed on a processing apparatus, cause a computerized network apparatus to:

establish data communication with one or more packet receiver apparatus, the data communication to negotiate at least one of a channel configuration or service flow;

receive first data from at least one base station apparatus via the one or more packet receiver apparatus, the first data comprising data relating to a number of user equipment (UE) in data communication with the at least one base station apparatus and relating to at least one of (i) a configuration of the at least one base station apparatus, or (ii) a use of the at least one base station apparatus, wherein the receipt of the first data from the at least one base station apparatus comprises receiving a plurality of data respectively from a plurality of base station apparatus;

determine that data from a last base station apparatus of the plurality of base station apparatus has not been received;

based on the determination that the data from the last base station apparatus of the plurality of base station apparatus has not been received, causing incrementation of a counter (N) to receive data from a next base station apparatus of the plurality of base station apparatus;

based on a determination that data from the last base station apparatus of the plurality of base station apparatus has been received, evaluate the first data to generate a schedule relating to an allocation of resources for at least one of (i) the at least one base station apparatus, or (ii) the one or more packet receiver apparatus; and cause implementation of the schedule, the implementation comprising application of the schedule to the at least one of (i) the at least one base station apparatus, or (ii) the one or more packet receiver apparatus.

\* \* \* \* \*